(12) United States Patent
Ferrer Herrera et al.

(10) Patent No.: US 9,693,510 B2
(45) Date of Patent: Jul. 4, 2017

(54) VOLTAGE COMPENSATION IN AN IRRIGATION CONTROL DEVICE

(71) Applicant: Rain Bird Corporation, Azusa, CA (US)

(72) Inventors: Manuel J. Ferrer Herrera, West Bend, WI (US); Steven M. Lurcott, Deerfield Beach, FL (US); Todd K. Roper, Phoenix, AZ (US)

(73) Assignee: Rain Bird Corporation, Azusa, CA (US)

( * ) Notice: Subject to any disclaimer, the term of this patent is extended or adjusted under 35 U.S.C. 154(b) by 757 days.

(21) Appl. No.: 14/133,598

(22) Filed: Dec. 18, 2013

(65) Prior Publication Data

US 2015/0164008 A1   Jun. 18, 2015

(51) Int. Cl.
| | | |
|---|---|---|
| H01H 47/00 | (2006.01) | |
| A01G 25/16 | (2006.01) | |
| H02M 3/337 | (2006.01) | |
| H02J 7/00 | (2006.01) | |

(52) U.S. Cl.
CPC .......... *A01G 25/16* (2013.01); *H02M 3/3376* (2013.01); *B60L 2210/14* (2013.01); *F23N 2035/18* (2013.01); *H02J 2007/004* (2013.01); *Y02T 10/44* (2013.01)

(58) Field of Classification Search
USPC .......................................... 361/18, 152, 156
See application file for complete search history.

(56) References Cited

U.S. PATENT DOCUMENTS

| | | | |
|---|---|---|---|
| 4,007,458 A | | 2/1977 | Hollabaugh |
| 4,131,882 A | | 12/1978 | Hollabaugh |
| 4,176,395 A | | 11/1979 | Evelyn-Veere |
| 4,950,985 A | | 8/1990 | Voss |
| 5,583,434 A | | 12/1996 | Moyers |
| 5,850,136 A | * | 12/1998 | Kaneko ................. H02J 7/0016 320/119 |
| 5,914,847 A | | 6/1999 | Alexanian |
| 5,975,057 A | | 11/1999 | Repplinger |
| 5,976,056 A | | 11/1999 | Matsumoto |
| 6,017,017 A | | 1/2000 | Lutz |
| 6,257,264 B1 | | 7/2001 | Sturman |
| 6,314,340 B1 | | 11/2001 | Mecham |

(Continued)

OTHER PUBLICATIONS

U.S. Appl. No. 14/133,595, filed Dec. 18, 2013.

(Continued)

*Primary Examiner* — Danny Nguyen
(74) *Attorney, Agent, or Firm* — Fitch, Even, Tabin & Flannery LLP

(57) ABSTRACT

Some embodiments provide irrigation valve control apparatuses comprising: multiple terminals coupled with a multi-wire path; a first charge storage circuitry electrically coupled with at least one of the multiple terminals, wherein the first charge storage circuitry is configured to be charged by a voltage on the multi-wire path; a control circuitry configured to determine the voltage on the multi-wire path; and a boost circuitry controlled by the control circuitry, wherein the control circuitry in response to determining that the voltage on the multi-wire path is below a threshold activates the boost circuitry to increase a voltage stored by the first charge storage circuitry.

22 Claims, 21 Drawing Sheets

(56) References Cited

U.S. PATENT DOCUMENTS

| | | | |
|---|---|---|---|
| 6,386,229 B1 | 5/2002 | Morikawa | |
| 6,766,221 B1 | 7/2004 | Christiansen | |
| 6,993,416 B2 | 1/2006 | Christiansen | |
| 7,058,478 B2 | 6/2006 | Alexanian | |
| 7,146,255 B2 | 12/2006 | Christiansen | |
| 7,206,669 B2 | 4/2007 | Christiansen | |
| 7,266,428 B2 | 9/2007 | Alexanian | |
| 7,405,683 B1 | 7/2008 | Perrin | |
| 7,406,363 B2 | 7/2008 | Doering | |
| 7,408,325 B2 * | 8/2008 | Yamamoto | H02J 7/0016 320/118 |
| 7,412,303 B1 | 8/2008 | Porter | |
| 7,421,317 B2 | 9/2008 | Christiansen | |
| 7,768,257 B2 | 8/2010 | Lueck | |
| 7,826,931 B2 | 11/2010 | Lorenz | |
| 7,844,368 B2 | 11/2010 | Alexanian | |
| 7,853,363 B1 | 12/2010 | Porter | |
| 7,877,168 B1 | 1/2011 | Porter | |
| 7,962,244 B2 | 6/2011 | Alexanian | |
| 8,055,389 B2 | 11/2011 | Holindrake | |
| 8,108,078 B2 | 1/2012 | Lorenz | |
| 8,183,719 B2 | 5/2012 | Scripca | |
| 8,274,171 B2 | 9/2012 | Korol | |
| 8,295,985 B2 | 10/2012 | Crist | |
| 8,352,088 B2 | 1/2013 | Christiansen | |
| 8,374,726 B2 | 2/2013 | Holindrake | |
| 8,396,603 B2 | 3/2013 | Savelle, Jr. | |
| 8,401,705 B2 | 3/2013 | Alexanian | |
| 8,497,597 B2 | 7/2013 | Korol | |
| 8,548,632 B1 | 10/2013 | Porter | |
| 8,796,879 B2 | 8/2014 | Korol | |
| 2005/0199842 A1 | 9/2005 | Parsons | |
| 2008/0058995 A1* | 3/2008 | Holindrake | A01G 25/16 700/284 |
| 2009/0222140 A1 | 9/2009 | Christiansen | |
| 2009/0316324 A1 | 12/2009 | Scripca | |
| 2010/0023173 A1 | 1/2010 | Wu | |
| 2010/0094472 A1 | 4/2010 | Woytowitz | |
| 2011/0093123 A1 | 4/2011 | Alexanian | |
| 2011/0238229 A1 | 9/2011 | Woytowitz | |
| 2011/0301767 A1 | 12/2011 | Alexanian | |
| 2012/0095604 A1 | 4/2012 | Alexanian | |
| 2012/0261600 A1 | 10/2012 | Scripca | |
| 2013/0190934 A1 | 7/2013 | Holindrake | |

OTHER PUBLICATIONS

EPO; App. No. 14198735.4; European Search Report Mailed May 15, 2015.

U.S. Appl. No. 14/133,595; Office Action mailed May 27, 2016.

EPO; App. No. 14198735.4; European Examination Report Mailed Oct. 11, 2016.

* cited by examiner

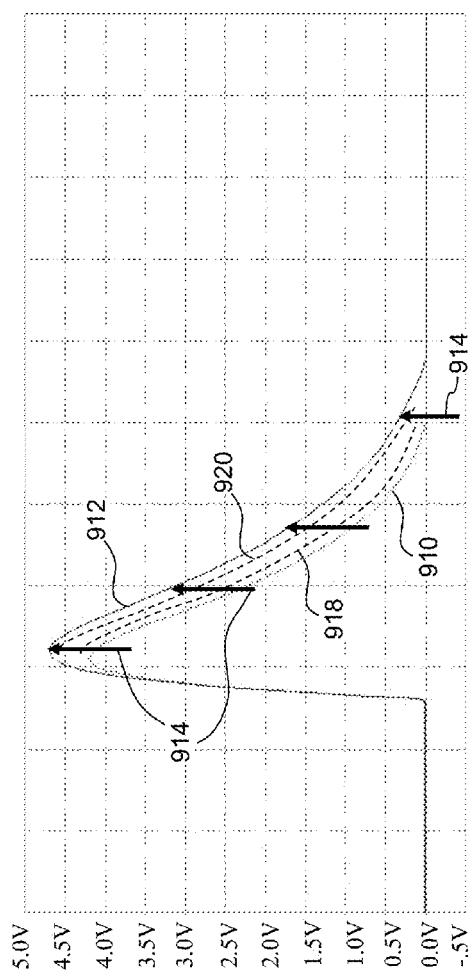
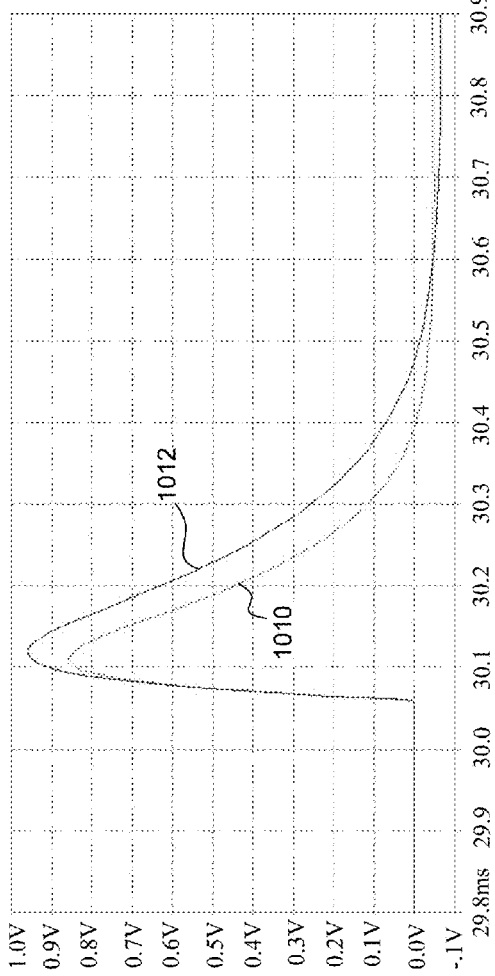
FIG. 9
FIG. 10

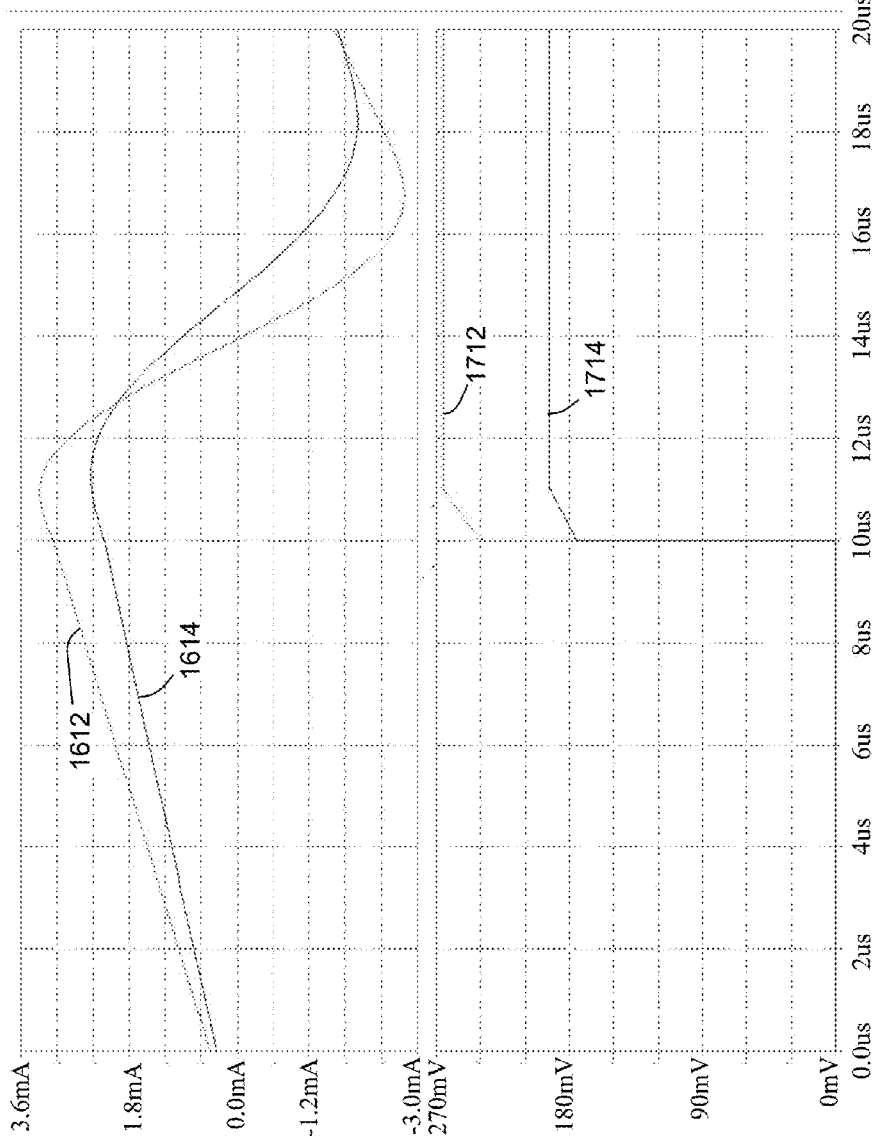

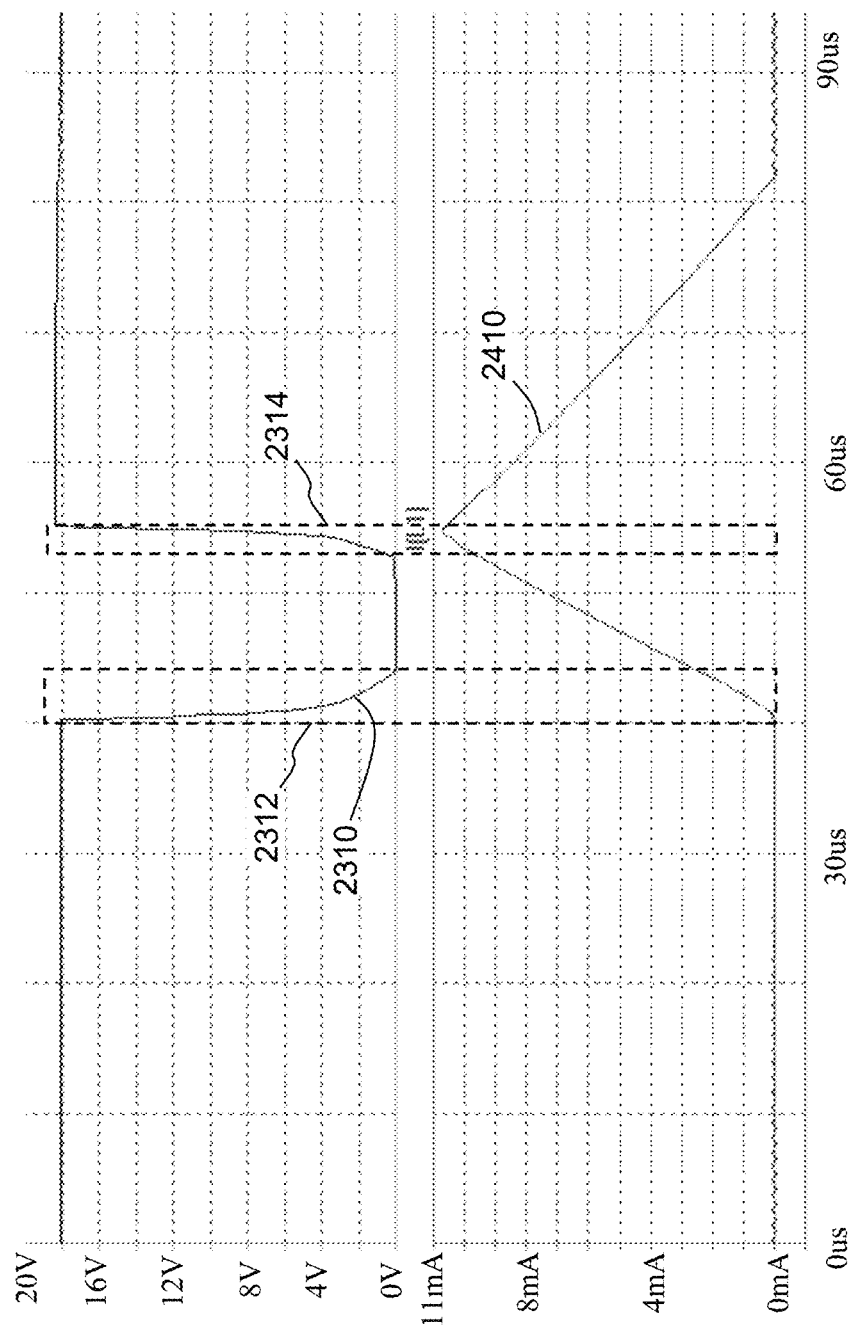

VOLTAGE COMPENSATION IN AN IRRIGATION CONTROL DEVICE

This application is related to U.S. patent application Ser. No. 14/133,595 (entitled "DETECTION OF A PLUNGER POSITION IN AN IRRIGATION CONTROL DEVICE"), filed concurrently herewith and which is incorporated in its entirety herein by reference.

BACKGROUND

1. Field of the Invention

The present invention relates generally to irrigation, and more specifically to apparatus and methods of controlling and implementing irrigation.

2. Discussion of the Related Art

Typical irrigation control systems cooperate with water valves and pumps to control the flow of irrigation water through a variety of water dispensing devices, including sprinklers, rotors, drip-lines, and other water delivery devices. These control systems are used in a wide variety of irrigation applications, from residential and commercial landscapes to golf course and agricultural irrigation.

Many irrigation systems and electronics are powered by 50/60 Hz AC voltage signals. Some systems further modulate this power source to provide data communication, for example, by selectively clipping the positive half of a cycle of the AC voltage signal. Data and power sent in this manner are often over a two-wire transmission line and are often referred to as a two-wire interface. Irrigation devices variously located in the field couple to the two-wire interface and derive their operational power therefrom. Some irrigation devices can demodulate the data by monitoring the received power signal. These irrigation devices can control water flow through valves based on received signaling, for example, by actuating one or more solenoid control valves.

SUMMARY OF THE INVENTION

Some embodiments provide irrigation valve control apparatuses comprising: a solenoid configured to cooperate with a plunger and to receive a plunger drive signal from plunger activation circuitry wherein the plunger drive signal is configured to induce a magnetic field relative to the solenoid that causes the plunger to change positions between open and closed positions; an input stimulus source coupled with the solenoid and configured to apply an input stimulus into the solenoid at a time while the plunger drive signal is not being applied to the solenoid, wherein the input stimulus is sufficiently small that the input stimulus applied to the solenoid does not cause the plunger to move from a current position; sampling circuitry configured to measure one or more voltage measurements corresponding to one or more voltages across the solenoid, wherein the one or more voltage measurements are dependent upon the current position of the plunger relative to the solenoid in response to applying the input stimulus to the solenoid; and control circuitry cooperated with the sampling circuitry to receive the one or more voltage measurements from the sampling circuitry, wherein the control circuitry is configured to determine whether the plunger is in one of the open and closed positions based on the one or more voltage measurements.

Other embodiments provide irrigation apparatuses comprising: a solenoid configured to cooperate with a plunger and to receive a plunger drive signal from plunger activation circuitry wherein the plunger drive signal is configured to induce a magnetic field relative to the solenoid that causes the plunger to change positions between open and closed positions causing an opening and closing of an irrigation valve; first switching circuitry cooperated with the solenoid, wherein the first switching circuitry is configured, upon activation, to dictate a direction of electrical current flow through the solenoid, wherein the direction of current flow while the plunger drive signal is applied controls a direction of movement of the plunger in response to the application of the plunger drive signal; an input stimulus source cooperated with the solenoid, wherein the input stimulus source is configured to generate an input stimulus that is applied to a first terminal of the solenoid at a time while the plunger drive signal is not being applied to the solenoid, and wherein the input stimulus does not cause the plunger to change from a current position; a resistive load cooperated with a second terminal of the solenoid; sampling circuitry coupled with the resistive load, wherein the sampling circuitry is configured to measure one or more voltage measurements across the resistive load in response to the input stimulus; and control circuitry coupled with the sampling circuitry, wherein the control circuitry is configured to receive the one or more voltage measurements, determine a current passing through the resistive load as a function of the one or more voltage measurements, determine an inductance of the solenoid as a function of the determined current and a timing of the input stimulus, and determine whether the plunger is in one of the open and closed positions as a function of the determined inductance of the solenoid.

Additionally, some embodiments provide irrigation valve control apparatuses comprising: a solenoid configured to cooperate with a plunger and to receive a plunger drive signal from plunger activation circuitry wherein the plunger drive signal is configured to induce a magnetic field relative to the solenoid that causes the plunger to change positions between open and closed positions resulting in opening or closing a valve such that water is allowed to pass through the valve when the plunger is in the open position and water is prevented from passing the valve when the plunger is in the closed position; control circuitry cooperated with the solenoid and configured to direct the plunger drive signal into the solenoid to induce movement of the plunger; an input stimulus source cooperated with the solenoid and configured to apply an input stimulus into the solenoid at a time while the plunger drive signal is not being applied to the solenoid, wherein the input stimulus that is sufficiently small that the input stimulus does not cause the plunger to move from a current position; and a resonant circuit comprising the solenoid, wherein the resonant circuit is coupled with the input stimulus source and configured to be excited by the input stimulus to generate a resonant response that resonates when the plunger is in one of the open position and the closed positions; wherein the control circuitry is configured to determine whether the resonant response is generated in response to the input stimulus, and to determine whether the plunger is in one of the open and closed positions in response to whether the resonant response is generated.

In some embodiments, methods of controlling an irrigation device are provided. These methods can comprise: causing an input stimulus to be applied to a solenoid at a time while a plunger drive signal is not being applied to the solenoid, wherein the solenoid is configured to cooperate with a plunger and to receive the plunger drive signal that induces a magnetic field relative to the solenoid that causes the plunger to change positions between open and closed positions, and wherein the input stimulus does not cause the plunger to change a position; taking one or more voltage measurements across the solenoid in response to the input stimulus being applied to the solenoid, wherein the voltage of the one or more voltage measurements are dependent upon the position of the plunger relative to the solenoid in response to the input stimulus applied to the solenoid; evaluating the one or more voltage measurements; and determining whether the plunger is in one of the open and closed positions based on the one or more voltage measurements.

Further, some embodiments provide methods of controlling an irrigation device, comprising: causing an input stimulus to be generated and applied to a first terminal of a solenoid, wherein the solenoid is cooperated with a plunger that is configured to be movable between open and closed positions in response to a magnetic field generated by the solenoid in response to a plunger drive signal causing an opening and closing of an irrigation valve, and wherein the input stimulus does not cause the plunger to change positions and the input stimulus is applied to the solenoid while the plunger drive signal is not being applied to the solenoid; causing one or more voltage measurements to be taken across a resistive load cooperated with a second terminal of the solenoid in response to the input stimulus; determining a current through the resistive load as a function of the one or more voltage measurements; determining an inductance of the solenoid as a function of the determined current and a timing of the input stimulus; evaluating the determined inductance relative to a first inductance threshold; and determining whether the plunger is in one of the open and closed positions as a function of a first relationship between the determined inductance of the solenoid and the first inductance threshold.

Still further, some embodiments provide methods of controlling an irrigation device, comprising: injecting an input stimulus into a resonant circuit comprising a solenoid, wherein the solenoid is configured to cooperate with a plunger and to receive a plunger drive signal from plunger activation circuitry wherein the plunger drive signal configured to induce a magnetic field relative to the solenoid that causes the plunger to change positions between open and closed positions resulting in opening or closing a valve such that water is allowed to pass through the valve when the plunger is in the open position and water is prevented from passing the valve when the plunger is in the closed position, and wherein the input stimulus will not cause the plunger to move from a current position and the input stimulus is injected while the plunger drive signal is not being applied to the solenoid; wherein the resonant circuit is configured to be excited by the input stimulus to generate a resonant response that resonates when the plunger is in one of the open position and the closed positions; determining whether the resonant response is generated in response to the input stimulus; and determining, through control circuitry, whether the plunger is in one of the open position and closed positions in response to whether the resonant response is generated.

Some embodiments provide irrigation valve control apparatuses comprising: multiple terminals coupled with a multi-wire path; a first charge storage circuitry electrically coupled with at least one of the multiple terminals, wherein the first charge storage circuitry is configured to be charged by a voltage on the multi-wire path; a control circuitry configured to determine the voltage on the multi-wire path; and a boost circuitry controlled by the control circuitry, wherein the control circuitry in response to determining that the voltage on the multi-wire path is below a threshold activates the boost circuitry to increase a voltage stored by the first charge storage circuitry.

Furthermore, some embodiments provide methods of controlling irrigation valves comprising: determining, at an irrigation valve control circuitry, whether a voltage on a multi-wire path is less than a first threshold, wherein the irrigation valve control circuitry is coupled with the multi-wire path obtains power from the multi-wire path to open and close an irrigation valve; activating a boost circuitry in response to determining that the voltage on the multi-wire path is less than the first threshold; generating a boost voltage, through the boost circuitry, that is greater than the voltage on the multi-wire path when the voltage on the multi-wire path is less than the first threshold; charging, through the boost voltage, a first charge storage circuitry to a first voltage that is greater than the voltage on the multi-wire path in response to the boost voltage; and discharging the first charge storage circuitry to drive a current through a solenoid controlling movement of a plunger to change positions to one of the open and closed position, wherein moving the plunger controls the irrigation valve such that water is allowed to pass through the valve when the plunger is in an open position and water is prevented from passing the valve when the plunger is in a closed position.

Further, some embodiments provide an irrigation control apparatus comprising: charge storage circuitry electrically coupled with a multi-wire path, wherein the charge storage circuitry is configured to be charged by a voltage on the multi-wire path; boost circuitry coupled to the charge storage circuitry and configured to increase a voltage stored by the charge storage circuitry when the voltage on the multi-wire path is below a threshold; a solenoid configured to cooperate with a plunger and to receive a plunger drive signal produced through a discharge of at least the charge storage circuitry; and plunger position detection circuitry configured to determine whether the plunger is in one of an open position and a closed position.

BRIEF DESCRIPTION OF THE DRAWINGS

The above and other aspects, features and advantages of several embodiments of the present invention will be more apparent from the following more particular description thereof, presented in conjunction with the following drawings.

FIG. 9 shows a graphical representation of the resulting voltage over time as seen across a solenoid in response to an input stimulus when the plunger is in the open and closed positions, in accordance with some implementations.

FIG. 10 shows a graphical representation of a corresponding voltage over time across the solenoid in response to the input stimulus when a plunger is in the closed and open positions, in accordance with some embodiments.

FIG. 16 illustrates graphical representations of current passing through a solenoid in response to a pulse input stimulus.

FIG. 17 shows graphical representations of voltage measured across a resistance circuitry at a time after the pulse input stimulus is initially applied to a solenoid.

FIG. 23 shows a graphical representation of a switch control signal applied to switching circuitry of boost circuitry, in accordance with some embodiments.

FIG. 24 illustrates a graphical representation of a change in current through one or more power inductors in response to an activation of switching circuitry induced by a switch control signal, in accordance with some embodiments.

Figure 1:
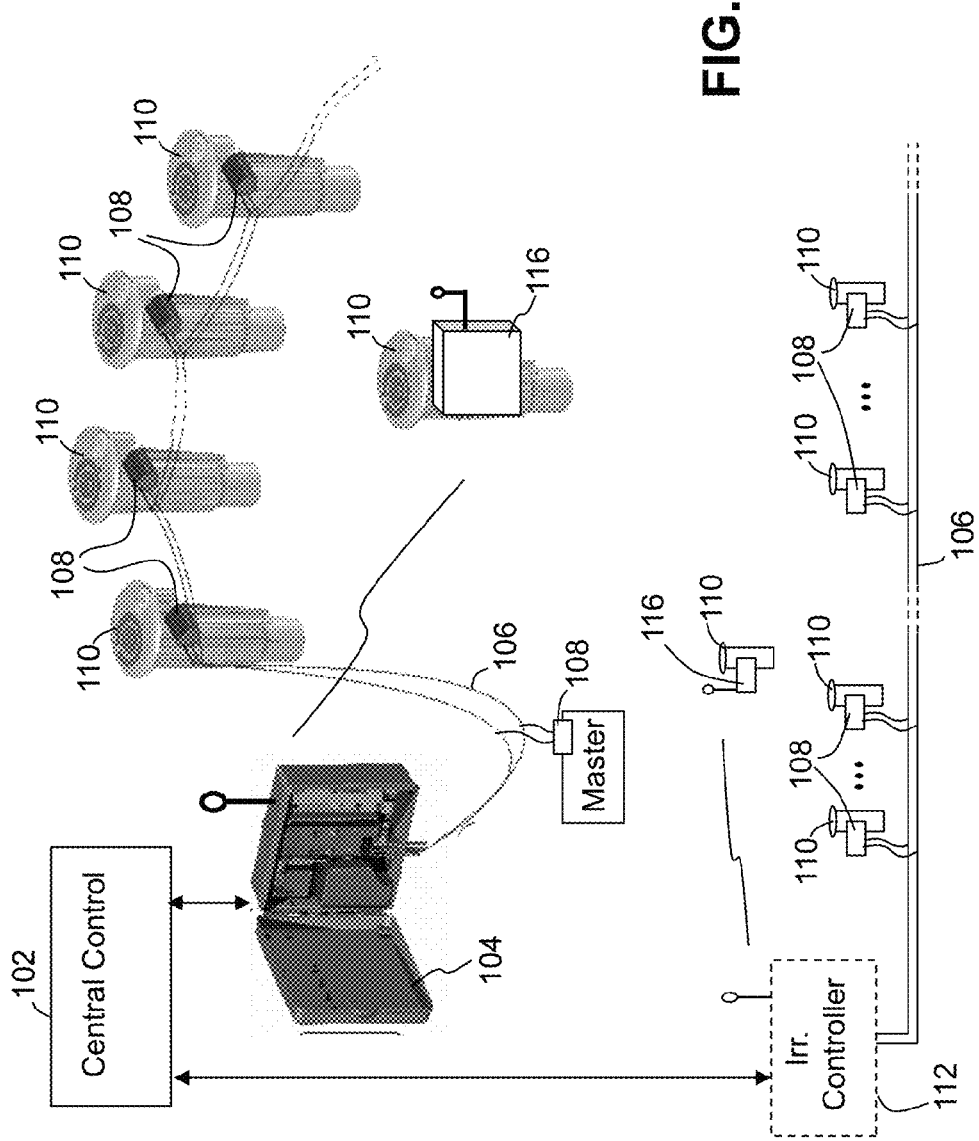
FIG. 1 illustrates a simplified block diagram of an exemplary irrigation system, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Many irrigation systems include widely distributed irrigation valves, master valves, pumps and other such devices that are controlled through one or more local irrigation controllers (sometimes referred to as satellite irrigation controllers) located at the site to be irrigated and/or controlled through a central controller that can be local to the site being irrigated and/or remote from the site being irrigated (e.g., in wired and/or wireless communication with one or more local irrigation controllers through the Internet). In many of these irrigation systems, the irrigation valves are remote from the irrigation controllers that often provide power to the irrigation valves to open or close the valves.

FIG. 1 illustrates a simplified block diagram of an exemplary irrigation system 100, in accordance with some embodiments. The irrigation system includes one or more Integrated Control Interfaces (ICI) 104 and/or other such control signal source, one or more wired or multi-wire paths 106 (which are typically multi-wire paths comprising two or more wires), and one or more valve control circuitry, valve control apparatus, and/or integrated control modules (ICM)

108 coupled with the multi-wire path 106. The below is described with reference to ICMs; however, those skilled in the art will appreciate that the above and below description with reference to the ICM can readily apply to substantially any relevant apparatus, system, device or the like that controls one or more valves or other such device, including systems having control circuitry separate from a solenoid and/or solenoid assembly that causes movement of a plunger of a valve. The ICMs 108 cooperate with one or more valves 110 or irrigation devices that include valves (e.g., rotors, sprinklers or the like with integrated valves) to control the valves.

In some embodiments, the irrigation system 100 optionally includes a central controller or control computer 102 that is configured to couple with the ICI 104 and/or other irrigation controller 112. Some embodiments additionally include one or more local irrigation controller (sometimes referred to as a satellite controller) 112. In some implementations, the irrigation controller 112 couples with the central controller 102, while in other embodiments the irrigation controller is a stand-alone irrigation controller that is configured to issue controls over the multi-wire path 106. Still other embodiments do not include the ICI 104, and instead include an irrigation controller 112 that may or may not be coupled with the central controller 102. In some embodiments, the ICI 104 and/or irrigation controller 112 may be in communication, via direct connection or over a distributed network (e.g., intranet, LAN, WAN, Internet, etc.), with the central controller 102, which may be located at the site where irrigation is implemented and/or remote from the site (e.g., a remote computer, a remote server operated over the Internet, a distributed server implemented through multiple devices distributed over the Internet and accessible by one or more users, the ICI, a satellite irrigation controller, user device (e.g., user computer, smart phone, tablet, etc.), and/or other such systems that can provide the central control). The below description generally refers to the ICI 104 in communication with the ICMs 108; however, it will be appreciated that the irrigation controller 112 can additionally or alternatively be in communication with the ICMs and provide similar control signals to the ICMs as dictated by an irrigation schedule being implemented by the central controller 102 or the irrigation controller.

The ICI 104 couples with the one or more ICM 108 over one or more wired or multi-wire paths 106, where the wire paths comprise one or more wires and typically include at least two wires. In some embodiments, a multi-wire path 106 may include three or more wires. Similarly, more than one multi-wire path 106 can couple with the ICI 104 allowing additional ICMs 108 to couple with the ICI and be controlled at least in part through the central controller 102. The ICMs cooperate with one or more valves 110 to control the valves. In some embodiments, the central controller 102 in implementing irrigation issues commands in accordance with one or more irrigation schedules to the ICI (or forwards the irrigation schedules to the ICI or irrigation controller 112). The ICI 104 generates a modulated AC power signal that is transmitted over a multi-wire path 106. The ICMs 108 are coupled at various locations along the length of the multi-wire path 106. Further, the ICMs 108 are cooperated with the one or more valves 110, which are coupled with a water source (e.g., valve on a water conduit). In some implementations, the valves 110 are in a head sprinkler (e.g., rotor) or other water distribution device. The ICMs 108 receive operational power from the AC signal applied over the multi-wire path 106. In some embodiments, the ICI 104 modulates this AC signal to transmit data (such as turn on and off commands) to one or more selected ICMs 108. The ICMs demodulate the modulated AC signal to determine whether the instructions apply to that ICM or to another one or more of the ICMs.

Further, in some embodiments, the ICI 104 (or irrigation controller 112) is configured to communicate, via wired or wireless communication, with other ICMs (e.g., wireless ICMs 116) that are also coupled with one or more valves 110, which are coupled with a water source (e.g., valve on a water conduit) and/or are in a head sprinkler (e.g., rotor) or other water distribution device. These wireless ICMs 116 receive power from a local source (e.g., battery power, solar power, etc.) or alternate AC power source other than the multi-wire path 106 or a separate multi-wire path.

The ICMs 108, 116 implement irrigation schedules and/or commands received from the ICI 104 and/or locally defined (e.g., through an interface or portable device in communication with the ICM, etc.). In some embodiments, the ICMs 108 in opening or closing the valve 110 control a solenoid, often a latching solenoid, that induces movement of an internal plunger between open and closed positions. The movement of the plunger opens and closes the corresponding valve. For example, in some embodiments water is allowed to pass through the valve when the plunger is in the open position and water is prevented from passing the valve when the plunger is in the closed position. In some embodiments, the ICMs 108 coupled with the multi-wire path can communicate back to the ICI 104 over the multi-wire path, for example, by selectively shorting their connection to the multi-wire path 106 in a pattern, and often at their assigned time. This results in a pattern of current draws that are detectable by the ICI 104 and can communicate the information to the central controller 102, which results in the communication of data upstream to the ICI 104 and/or central controller 102.

By using the multi-wire path 106 the valves 110 can be widely distributed over a relatively large area. For example, in some embodiments, the multi-wire path 106 may extend over several thousand feet or more, and in some instances may include one or more branches. With such long lengths, numerous valves 110 and ICMs 108 can be distributed along the multi-wire path. It can be very time consuming to verify the accurate operation of the ICMs and the valves.

Some embodiments provide the capability to determine whether a plunger of the valve is in a closed position, an open position, an undetermined position, removed from the solenoid and/or other information about the plunger and/or valve. Further, some embodiments provide sufficient precision to identify substantially any position of the plunger. The ICMs 108, 116 can evaluate the plunger position and report the plunger position back to the ICI 104 (irrigation controller 112) and/or the central controller 102. As such, these embodiments provide information about the operation of the valves 110 and/or whether there are errors occurring, which can result in damage to the plant life being irrigated, result in unnecessary costs, and/or waste resources. As described above, ICMs 108 coupled with the multi-wire path 106 are typically configured to communicate with the ICI 104, an irrigation controller 112 and/or the central controller 102 via the multi-wire path (e.g., by shorting the multi-wire path). Similarly, ICMs 116 that wirelessly communicate can wirelessly communicate plunger position information to the ICI 104, irrigation controller 112 and/or the central controller 102.

Figure 2:
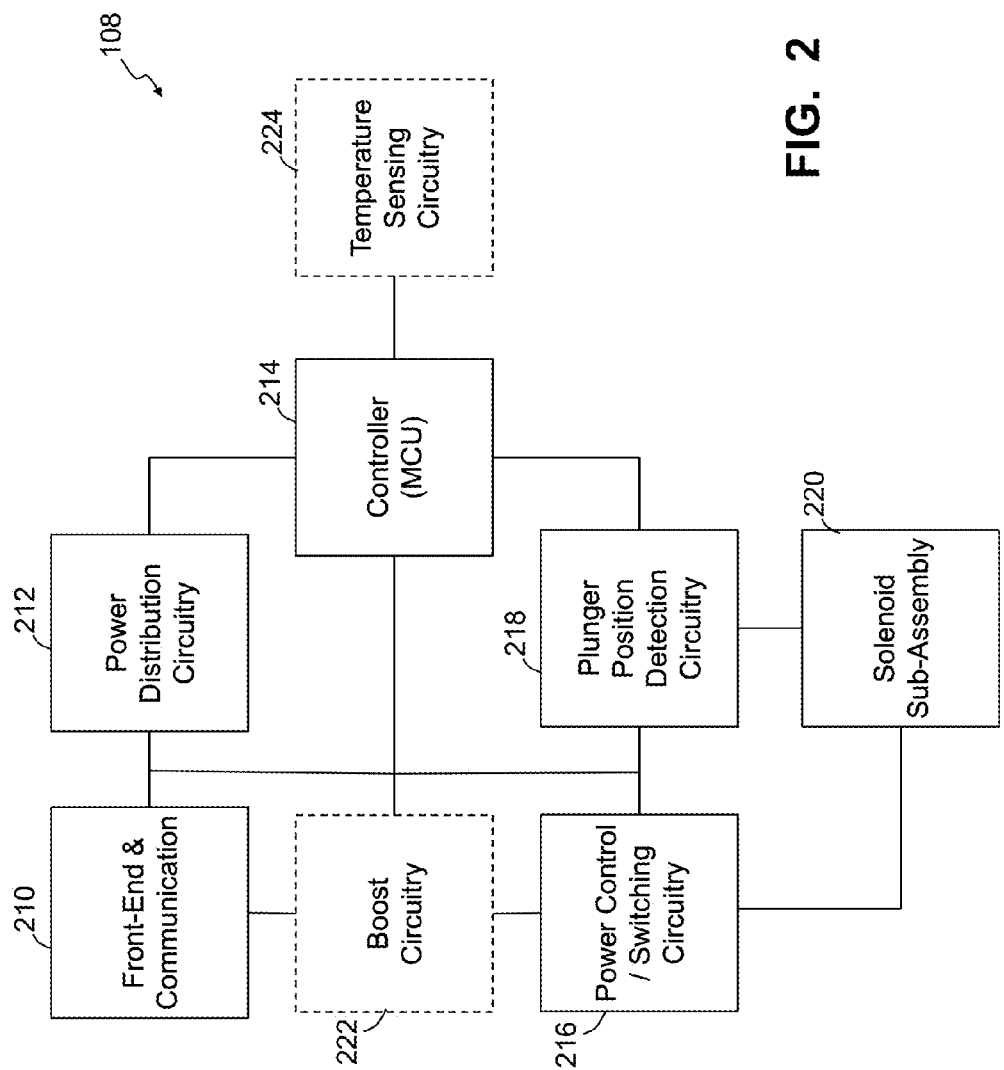
FIG. 2 depicts a simplified block diagram of an exemplary valve activation system and/or integrated control module (ICM), in accordance with some embodiments.

FIG. 2 depicts a simplified block diagram of an exemplary ICM 108, 116, in accordance with some embodiments. The ICM includes front-end and communication circuitry 210, power distribution circuitry 212, a controller and/or control circuitry 214, power control and switching circuitry 216, plunger position detection circuitry (PPDC) or system 218, and a solenoid sub-assembly or circuitry 220. In some embodiments, the ICM 108 may optionally include voltage boost circuitry 222. Still further, some embodiments may optionally include or couple with temperature sensing circuitry and/or sensor(s) 224. The controller 214 provides control over the ICM, including controlling the valve through the solenoid circuitry 220. In some embodiments, the controller 214 comprises an integrated circuit (or circuits) that is configured and/or programmed to monitor and manage the functions in the operation of the ICM. Again, the ICM includes and/or couples with a solenoid that moves an internal plunger between open and closed positions in response to a magnetic field generated through the solenoid depending on the direction of current passed through the solenoid.

Although FIG. 2 shows the various circuitry and/or components as discrete circuitry, two or more of these circuitry and/or portions of two or more of these circuitry may be cooperated into a single device, module, circuitry and/or system. For example, portions of the power control and switching circuitry and the PPDC may be incorporated and/or implemented through the controller 214. Similarly, some of the circuitry and/or components can be external to the ICM and operated in cooperation with the ICM. For example, the boost circuitry could operate external to the ICM and supply a boost voltage or signal as described below. Similarly, the controller 214 may be separate from the plunger position detection circuitry 218 and/or external to ICM. Further, in some embodiments, the control and/or electronic circuitry may be separate from one or more solenoid circuitry 220 and/or separate from one or more solenoids that are configured to cooperate with a plunger of a valve. In some implementations, some or all of the circuitry is integrated with the solenoid circuitry, while in other instances the solenoid and/or solenoid circuitry are implemented separate. For example, see U.S. application Ser. No. 12/510,111, filed Jul. 27, 2009, for Inventors Crist et al. (published as U.S. Pub. No. 2010/0082169), which is incorporated herein by reference, and which describes integrated and separate circuitry. Additionally, some embodiments may include the boost circuitry 222 while not including the PPDC 218, while other embodiments may include the PPDC 218 and not the boost circuitry 222. Other embodiments, however, include both the boost circuitry 222 and the PPDC 218.

Figure 3:
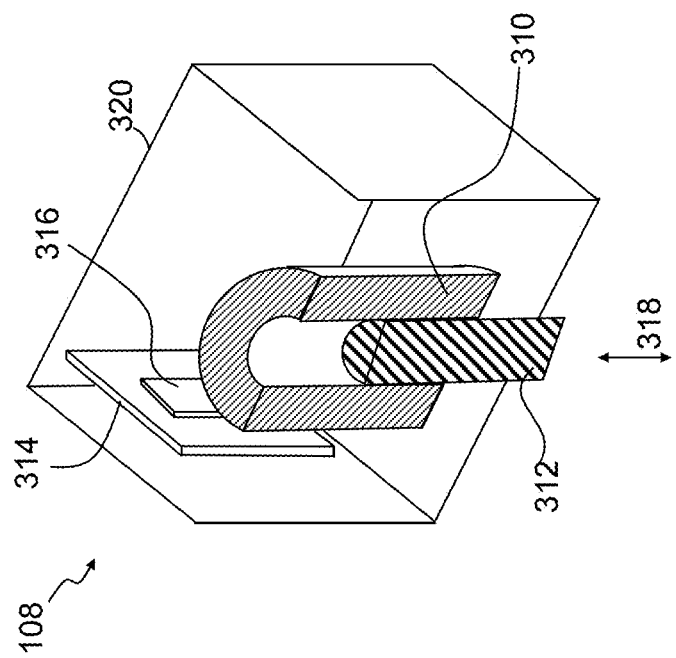
FIG. 3 shows a cross-sectional view of a simplified exemplary ICM, in accordance with some embodiments.

FIG. 3 shows a cross-sectional view of a simplified exemplary ICM, in accordance with some embodiments. The ICM 108 includes a solenoid 310, a plunger 312, and one or more circuit boards 314 that includes at least some of the circuitry 316 of the controller 214, which are positioned at least partially within a housing 320 of the ICM. The circuit board 314 and/or circuitry 316 typically implement the controller 214, PPDC 218, and/or other circuitry. The PPDC 218 and controller 214 use the solenoid 310 to indirectly detect the position of the plunger 312.

Referring to FIGS. 1-3, the controller 214 in cooperation with the power control and switching circuitry 216 induces movement of the plunger 312 between the open to close positions. In some embodiments, the solenoid 310 is configured to cooperate with the plunger 312 and to receive a plunger drive signal from a plunger activation circuitry of the power control and switching circuitry. The plunger drive signal is configured to induce a magnetic field relative to the solenoid 310, typically dependent on a direction of current flow through the solenoid, that causes the plunger to move along an axis 318 and over a range of motion to change positions between open and closed positions. The plunger 312, in some embodiments, reciprocates relative to the solenoid. An end of the plunger may include a seal member and/or may couple with a portion of a valve that includes a seal member that closes or covers and opens or uncovers an opening or orifice of the valve 110.

In some embodiments, the switching circuitry 216 comprises one or more solid state switches that selectively and directionally apply the plunger drive signal to the solenoid 310. The controller 214 and/or a power supply controller in communication with the controller 214 determines an intended state of the valve (e.g., open or closed), and typically based on the irrigation schedule. Further, the controller 214 controls the switching circuitry 216 regarding the direction of current flow through the solenoid as well as the timing of when the plunger drive signal is applied to the solenoid and the relative duration of the plunger drive signal.

In some embodiments, the front-end and communication circuitry 210 comprises terminals that couple with the multi-wire path 106 and receives the modulated signals and the power from the multi-wire path. In some embodiments, the front-end and communication circuitry includes an AC to DC converter and a transceiver that includes or couples with one or more demodulators and a shorting circuitry to selectively short the connection of the ICM to the multi-wire path 106 in a pattern to communicate back up to the ICI 104 and/or central controller 102. For example, in some embodiments the front-end and communication circuitry 210 serve as the interface between the ICM and the ICI 104 (and/or irrigation controller 112), accepts and rectifies the alternate current (AC) signal (e.g., about 26.5 VRMS, at about 50 Hz, 60 Hz, etc.), and provides bidirectional communication between the ICM and the ICI.

The power distribution circuitry 212 cooperates with the front-end communication circuitry to draw power from the multi-wire path to power the ICM. In some instances, the power distribution circuitry 212 draws power at a desired voltage to operate the controller 214 and other circuitry and components of the ICM 108. For example, the power distribution circuitry 212 can rectify the AC signal or receive the rectified AC signal from the front-end and communication circuitry 210, which in some instances is considered a direct current (DC) signal, therefore providing AC to DC conversion. In some embodiments, the power distribution circuitry 212 comprises the rectifier and/or a DC-to-DC converter to generate one or more reference voltages (e.g., 5 V and/or 3.3 V reference voltages, nominal). The power distribution circuitry can serve as a power distribution circuitry to the controller 214 and/or other components (e.g., analog circuits) within the ICM and/or on one or more circuit boards within the ICM.

In some embodiments, the power control and switching circuitry 216 is coupled with and controlled by the controller 214, while in other embodiments, some or all of the power control and switching circuitry is incorporated into the controller. In operation, the power control and switching circuitry 216 delivers the power to drive the current through the solenoid and controls the direction of the current flow through the solenoid 310 as dictated by the controller. In some embodiments, the power control and switching circuitry comprises a plunger activation circuitry that directs a plunger drive signal into the solenoid, and in some embodiments, controls a direction of current through the solenoid. The plunger drive signal induces a magnetic field relative to the solenoid to the plunger 312 to move relative to the solenoid causing the plunger to change positions between open and closed positions in opening and closing the valve. In some embodiments, the power control and switching circuitry 216 comprises one or more switches or transistors (e.g., H-Bridge comprising four field effect transistors (FETs)) that form an electrical path that is utilized to energize the ICM solenoid circuitry 220 to control the current to flow in a "forward" direction or in a "reverse" direction through the solenoid 310. The ability to change the direction of the current flow allows the ICM to retract or extend the plunger 312 between the open and closed positions.

In some circumstances, it is desirable to confirm that a given ICM has executed a turn on or turn off command. It can also be desirable to know for diagnostic purposes, what state a valve is currently in (open, closed, unknown, etc.) and/or a current position of a plunger 312 relative to the valve. Accordingly, in some embodiments the ICM 108 includes the PPDC 218 that is used to determine the location of the plunger. The PPDC 218 allows the controller 214 to determine and/or confirm a location of the plunger 312 (e.g., open position, closed position, and/or undetermined position), and thus, determine whether the valve is in an open state, a closed state, another position and in some instances an undetermined state. The controller 214 couples with the PPDC 218 to receive input from the PPDC identifying the position of the plunger 312 and/or providing information to the controller 214 to allow the controller to determine the location of the plunger based at least in part on the information provided.

In many implementations, the inductance of a solenoid varies based on a position of the plunger relative to the solenoid. This variation in inductance can have an effect on the voltage across a solenoid and/or a current passing through the solenoid. In some embodiments, the PPDC applies an input stimulus to the solenoid 310. The input stimulus typically does not cause the plunger to change positions or states, and in many embodiments does not cause the plunger to move from a current position. Further, in some embodiments, the input stimulus is applied to and/or injected into the solenoid at a time while a plunger drive signal is not being applied to the solenoid. The PPDC, in some embodiments, utilizes the input stimulus to estimate and/or determine a location of the plunger relative to the solenoid based, at least in part, from the resulting variations in inductance caused by the movement of the plunger relative to the solenoid.

The solenoid circuitry 220 comprises the solenoid or bobbin (e.g., including an inductor or coil) with which the plunger 312 is cooperated. The solenoid circuitry is electrically connected to power control and switching circuitry 216 and the PPDC 218. As described above, the power control and switching circuitry 216 controls the direction of current through the solenoid 310, which induces a magnetic field that is configured to move the plunger between closed and open positions.

Some embodiments optionally further include the temperature sensor and/or sensing circuitry 224. In some alternative embodiments, one or more temperature sensing circuitry 224 may be external to the ICM 108 and communicate directly with the ICM, communicate with the central controller 102 that provides temperature information to the ICM, or communicates with another device (e.g., another ICM) that forwards the temperature information to one or more other ICMs or the central controller. The temperature information allows the controller 214 and/or the PPDC 218 to compensate for variations in measurements (e.g., voltage and/or current measurements) due to current temperature information. For example, the voltage and/or current through the solenoid 310 may vary depending on temperature. Accordingly, the controller 214 and/or the PPDC 218 can take into consideration these variations when determining a relative position of the plunger.

In some embodiments, the ICM 108 optionally further includes a power or voltage boost circuitry or system 222. As described above with reference to FIG. 1, multiple ICMs 108 are typically coupled at various locations along the length of the multi-wire path 106, with the multi-wire path often being hundreds to potentially tens of thousands of feet long allowing potentially hundreds to thousands of ICMs to be coupled along a single multi-wire path. The ICMs typically derive operational power and power to drive open and close the valve from the AC waveform received via the multi-wire path 106. Because of the potential lengths of the one or more multi-wire paths, the amplitude of the AC waveform is often less as that ICMs are positioned further from the ICI 104 and/or other source of power received via the multi-wire path. Accordingly, the AC power signal may provide insufficient power (e.g., insufficient voltage to open and/or close the solenoid controlled valve) to one or more ICMs positioned away from the ICI and/or proximate an end of the multi-wire path.

In some embodiments, the ICM can include the boost circuitry or system. In response to detecting that the voltage or power is insufficient and/or when it is detected that a level of the AC signal drops below a threshold, the boost circuitry 222 can be activated. The boost circuitry comprises one or more energy storing devices to store energy that can be utilized when needed to, for example, at least boost the voltage retrieved from the multi-wire path 106 to effectively induce movement of the plunger 312 to open or close the valve even when the level of the signal on the multi-wire path drops below a level that would otherwise be insufficient to effectively move the plunger to a desired open or closed position.

Some embodiments incorporate some or all of the circuitry onto one or more circuit boards 314 incorporated into the ICM 108. Accordingly, the ICM solenoid sub-assembly or circuitry 220 is configured to actuate and in some instances latch the physical position of the plunger when the plunger drive signal is applied to the solenoid (e.g., a defined amount of current is conducted through the solenoid). The plunger detection, in some embodiments, is configured such that it does not actuate or change the physical position of the plunger.

Figures 4, 5:
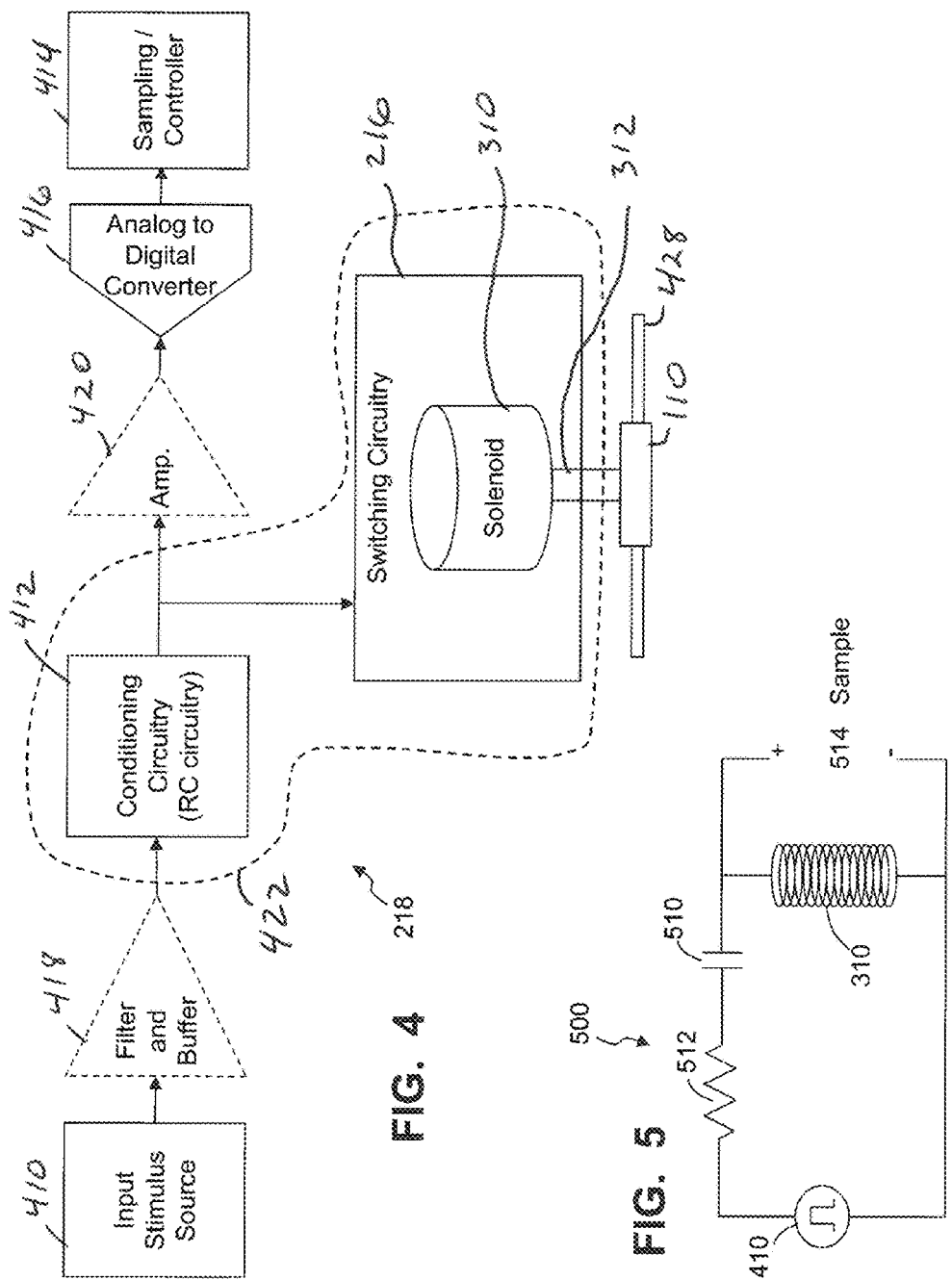
FIG. 4 shows a simplified block diagram of exemplary circuitry or a system comprising a plunger position detection circuitry (PPDC), in accordance with some embodiments.
FIG. 5 depicts a representative simplified schematic diagram of inductance-resistance-capacitance (LRC) circuitry, in accordance with some embodiments.

FIG. 4 shows a simplified block diagram of exemplary circuitry or a system comprising the PPDC 218, in accordance with some embodiments. As described above, the inductance of the solenoid typically varies based on a location of the plunger relative to the solenoid, and the change in inductance can affect the voltage across the solenoid and/or the current through the solenoid. Again, the solenoid 310 is configured to cooperate with a plunger 312 and to receive a plunger drive signal from plunger activation circuitry. The plunger drive signal induces a magnetic field relative to the solenoid 310 that can cause the plunger 312 to change positions between the open and closed positions. This change of positioning of the plunger causing an opening and closing of an irrigation valve 110 such that water is allowed to flow through a conduit 428 and through the valve when the plunger is in the open position and water is prevented from passing the valve when the plunger is in the closed position. In some embodiments, the PPDC 218 comprises an input stimulus source or circuitry 410, an input stimulus conditioning circuitry or system 412 that cooperates with the power control and switching circuitry 216, and a sampling circuitry and/or control circuitry 414. In some embodiments, the PPDC further includes or the sampling circuitry 414 further includes an analog to digital (A/D) converter 416. Additionally, some embodiments optionally include filtering and/or isolation circuitry 418, a gain stage circuitry or system 420, and/or other such circuitry.

The input stimulus source 410 injects the input stimulus into the solenoid 310. As described above, in many embodiments the input stimulus when applied to the solenoid 310 is insufficient to cause the plunger 312 to move from a current position. The input stimulus can be a signal that establishes a voltage across the solenoid that can be sampled by the sampling circuitry 414. For example, in some embodiments, the input stimulus is a single 5 V pulse (e.g., square wave pulse) applied to the solenoid. Again, the position of the plunger relative to the solenoid alters the inductance of the solenoid, and the voltage across the solenoid typically changes because of the change in inductance resulting from the changing positions of the plunger. Through testing, voltage thresholds can be determined and/or defined that can be used in subsequent measurements of voltage to identify the relative plunger position. Further, in some embodiments, the input stimulus source is implemented through the controller 214. For example, the controller in some embodiments comprises a microcontroller that is configured to generate the input stimulus and apply that to the PPDC. In other embodiments, the input stimulus can be a train of pulses, a tone, a sine wave, a low-level step function, a spectrally rich signal with multiple frequencies, or other such relevant inputs.

Some embodiments operate with pulse widths in the range of about 10 to 500 microseconds (μs). Further, some embodiments operate with pulse amplitudes in the range of about 3 to 5 VDC. As described above and further below, some embodiments utilize multiple pulse input stimuli, for example, with pulse widths in the range of about 10 to 500 μs, with intervals in the order of microseconds to milliseconds (ms), and with pulse amplitudes in the range of about 3 to 5 VDC. Some embodiments activate an input stimulus a predefined delay after the plunger drive signal is applied. The delay can be substantially any delay, such as from microseconds to minutes to hours, and typically the delay is sufficiently long to allow the magnetic field, which was induced through the solenoid in response to the plunger drive signal to actuate the plunger, to collapse. It is noted that the execution of the plunger drive signal or command is not necessary for initiating the determination of a location of the plunger, the execution of an input stimulus or the application of the input stimulus. Further, the taking of one or more voltage measurements and/or current measurement are typically delayed following the initiation of the input stimulus, which can range from microseconds to seconds or longer and may depend on the input stimulus.

The PPDC 218, in some embodiments, includes the conditioning circuitry 412 that cooperates with the solenoid 310 to condition the input stimulus to provide a measurable parameter that is used in determining the location of the plunger. In some embodiments, the conditioning circuitry 412 comprises a resistance-capacitance circuit (RC circuit) that in cooperation with the inductance of the solenoid 310 establishes an inductance, resistance and capacitance circuitry (LRC circuitry) or system 422. In other embodiments, a conditioning circuit may comprise a resistance to ground. Still other embodiments may utilize alternative conditioning circuitry.

FIG. 5 depicts a representative simplified schematic diagram of LRC circuitry 500, in accordance with some embodiments. The input stimulus source 410 applies the input stimulus (e.g., a relatively small amplitude 5V DC pulse) to the LRC circuitry establishing a voltage across the solenoid 310. In some embodiments, the resistance 512 is a fix-value resistance provided by one or more resistors, and the capacitance 510 is a fix-value capacitance provided by one or more capacitors. The inductance of the solenoid 310 changes depending on the position of the plunger, and accordingly, the position of the plunger relative to the solenoid changes the voltage 514 across the solenoid. Therefore, when the input stimulus is applied to the LRC circuit, the LRC circuitry modulates the amplitude of the injected input stimulus as a function of the plunger position. In some embodiments, the LRC circuitry 500 is a resonant circuit, but is not required to be a resonant circuit. The relative values of the resistance, capacitance and inductance will dictate whether or not the circuit is resonant. FIG. 5 shows the LRC circuitry 500 as a series coupled LRC circuitry. Other embodiments, however, utilize parallel coupled LRC circuitry.

Referring back to FIG. 4, some embodiments include the A/D converter 416 that converts the analog voltage across the solenoid into digital representations of the voltage. In some embodiments, the A/D converter is implemented in the controller 214 (e.g., as part of a microcontroller (MCU)), while in other embodiments, the A/D converter is external to the controller. The sampling circuitry 414 couples with the A/D converter to take one or more measurements of the voltage that correspond to the voltage across the solenoid.

The sampling circuitry or the controller 214 utilizes the one or more voltage measurements to determine a position of the plunger relative to solenoid. In some embodiments, the controller 214 has one or more voltage thresholds corresponding to expected voltages across the solenoid when the plunger is in the closed position, and/or the open position. Other thresholds may also be defined, such as corresponding to one or more other plunger positions, when the plunger is removed from the solenoid, and other such thresholds. Accordingly, the controller 214 can evaluate the one or more voltage measurements relative to the one or more voltage thresholds and based on the resulting relationship(s) between the measured voltage(s) and the threshold(s) determine whether the plunger is in a closed position, an open position or other position. Some embodiments are configured to determine a relative quality of open or closed state. For example, in some implementations, the controller determines a proportional location of the plunger relative to one of the open and closed positions and a range of motion of the plunger. Other embodiments identify a plunger location based on the plunger detected as being within a zone or range of positions of a plurality of zones or ranges distributed along the path of motion of the plunger.

The PPDC 218 can also include, in some embodiments, the gain stage 420 that is cooperated with the terminal of the solenoid 310. Typically, the gain stage is positioned between the solenoid and the A/D converter and/or sampling circuitry. In some implementations, the gain stage includes one or more amplifiers and/or amplifying circuitry. The gain stage is configured to amplify or increase the amplitude-modulated pulse resulting from the LRC circuitry 422 in response to the input stimulus. An amplified, amplitude-modulated pulse is produced or otherwise generated corresponding to voltage across the solenoid. The amplification allows for the utilization of a greater or full dynamic range of the A/D converter 416, the sampling circuitry and the controller. The increased range allows the A/C converter to utilize an increased resolution and in some embodiments approach its entire resolution (e.g., 12-bits of resolution), which can result in increased accuracy of the voltage measurements obtained by the sampling circuitry 414. In some embodiments, the sampling circuitry in measuring the one or more voltage measurements is configured to measure the one or more voltage measurements of the amplified, amplitude-modulated pulse corresponding to the voltage across the solenoid with a resulting increased dynamic range of the sampling circuitry allowing the utilization of a greater number of bits to digitally represent the sampled signal than available without the gain stage.

Some embodiments further include filtering and/or isolation circuitry 418. In some implementations, a filtering circuitry helps to shape the input stimulus (e.g., a pulse, a series of pulses, a sine wave, etc.) and/or to limit the frequency content of the input stimulus. Some embodiments include isolation circuitry that provides isolation of the input stimulus source 410 (e.g., a pulse waveform source) from the LRC circuitry 422. Similarly, in some implementation the gain stage 420 provides isolation of the A/D converter 416 and/or the control and/or sampling circuitry 414 from the LRC circuitry. Some embodiments include, as at least part of the isolation circuitry 418, a buffer, a unity-gain amplifier follower and/or other such isolation devices or circuitry.

Figure 6:
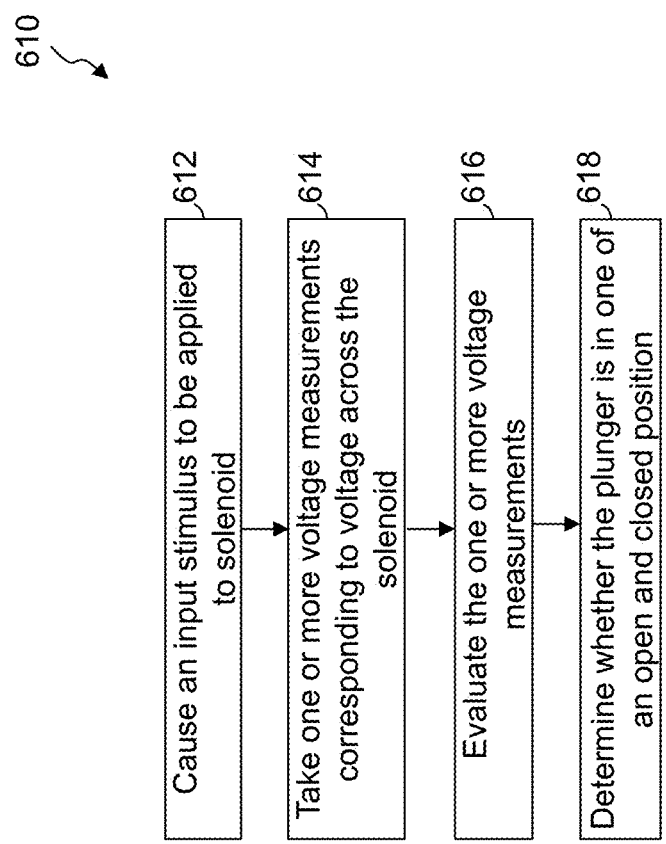
FIG. 6 shows a simplified flow diagram of an exemplary process of determining a location of a plunger that opens and closes a valve relative to a solenoid, in accordance with some embodiments.

FIG. 6 shows a simplified flow diagram of an exemplary process 610 of determining a location of a plunger 312 that opens and closes a valve relative to a solenoid 310, in accordance with some embodiments. In step 612, an input stimulus is applied to the solenoid. In some embodiments, the controller generates the input stimulus and/or activates a separate input stimulus generator or source so that the input stimulus is applied to the solenoid 310, which in some embodiments includes applying the input stimulus through the PPDC 218 and/or the conditioning circuitry 412. As described above, in many embodiments, the input stimulus is of an insufficient level to cause the plunger to change positions or states.

In step 614, one or more voltage measurements are taken and/or sampled across the solenoid in response to the input stimulus being applied to the input stimulus conditioning circuit and the solenoid. Again, the positioning of the plunger affects the inductance of the solenoid, and accordingly the voltage of the one or more voltage measurements in response to the input stimulus applied to the solenoid are dependent upon the state and/or position of the plunger relative to the solenoid. Further, in some embodiments, some or all of the voltage measurements are taken at least a predefined period of time following the application of the input stimulus to the solenoid. For example, in some implementations, the one or more voltage measurements are taking within 1-4 seconds following the input stimulus being applied to the solenoid. Furthermore, the input stimulus is typically applied to the solenoid at a time while the plunger drive signal is not being applied to the solenoid.

In step 616, the one or more voltage measurements are evaluated. In many embodiments, the evaluation includes evaluating the one or more voltage measurements relative to one or more thresholds. In step 618, it is determined whether the plunger is in one of the open position and the closed position based on the evaluation of the one or more voltage measurements. Some embodiments are additionally configured to determine the plunger is positioned between the open and closed positions, or determine that the plunger is removed from the solenoid based on the evaluation of the one or more voltage measurements. In some implementations a position of the plunger is determined as a result of a relationship between the one or more voltage measurements and one or more thresholds. For example, in some embodiments, the one or more voltage measurements or some combination of two or more voltage measurements are compared to a threshold, and when determined the threshold is exceeded the plunger is considered to be in a closed position and when not exceeded the plunger is considered to be in an open positioned. Similarly, in some embodiments the one or more voltage measurements are evaluated relative to a closed voltage threshold, which corresponds to a voltage that is approximately equal to (or within a range of) a voltage level that is expected when the plunger is in the closed position, in determining whether the one or more voltage measurements are within a range of the closed voltage threshold. Additionally or alternatively, in some embodiments, the one or more voltage measurements are evaluated relative to an open voltage threshold, which corresponds to a voltage that is approximately equal to (or within a range of) a voltage level that is expected when the plunger is in the open position, to determine whether the one or more voltage measurements are within a range of the voltage threshold corresponding to the open position.

In some embodiments, the location of the plunger can be determined as an undetermined or unknown position. For example, when the one or more voltage measurements are not within a predefined range of the close voltage threshold and not within a predefined range of the open voltage threshold, the controller can determine that that plunger is in an undetermined position, and instead between the open and closed positions. Other embodiments, however, may utilize additional thresholds, tables, ranges and/or other parameters to evaluate the one or more voltage measurements to more accurately determine a location of the plunger, including when the plunger is not at one of the open or closed positions.

In some implementations, the PPDC and/or controller are configured to determine a proportional location of the plunger relative to one of the open and closed positions and a range of motion of the plunger. For example, some embodiments determine of a level or quality of how open defined by an estimated proportional position of the plunger relative to a range of motion of the plunger and a fully open position at a first limit of the range of motion of the plunger, or a level or quality of how closed defined by an estimated proportional position of the plunger relative to the range of motion of the plunger and a fully closed position at a second limit of the range of motion (e.g., a percentage or distance relationship, such as 80% closed, 60% open, etc.). Accordingly, some embodiments are configured to determine that the plunger is located at an alternate position that is between the open position and the closed position. Still further, some embodiments are configured to identify that the plunger is within a first range of a plurality ranges of positions spaced along a range of motion of the plunger. The precision in identifying the location of the plunger is dependent on the size of the plurality of ranges. In some instances where the ranges may be substantially the same across the range of motion, while in other instances the plurality of ranges may vary over the range of motion of the plunger.

Additionally, some embodiments are configured to determine whether the plunger is removed from cooperation with the solenoid. The one or more voltage measurements can be evaluated relative to an additional threshold corresponding to a voltage expected across the solenoid when the plunger has been removed. In other instances, the controller can determine the plunger is removed based on the relationship of the one or more voltage measurements relative to one or both of the open voltage threshold and the closed voltage threshold (e.g., the voltage across the solenoid is greater than the closed voltage threshold by more than a predefined margin or range). In some embodiments, the controller 214 is configured to communicate the determined plunger position back to the ICI 104 and/or central controller 102, allowing the central controller to make adjustments to irrigation scheduling, provide notifications (e.g., signal an error), and/or take other action.

Figure 7:
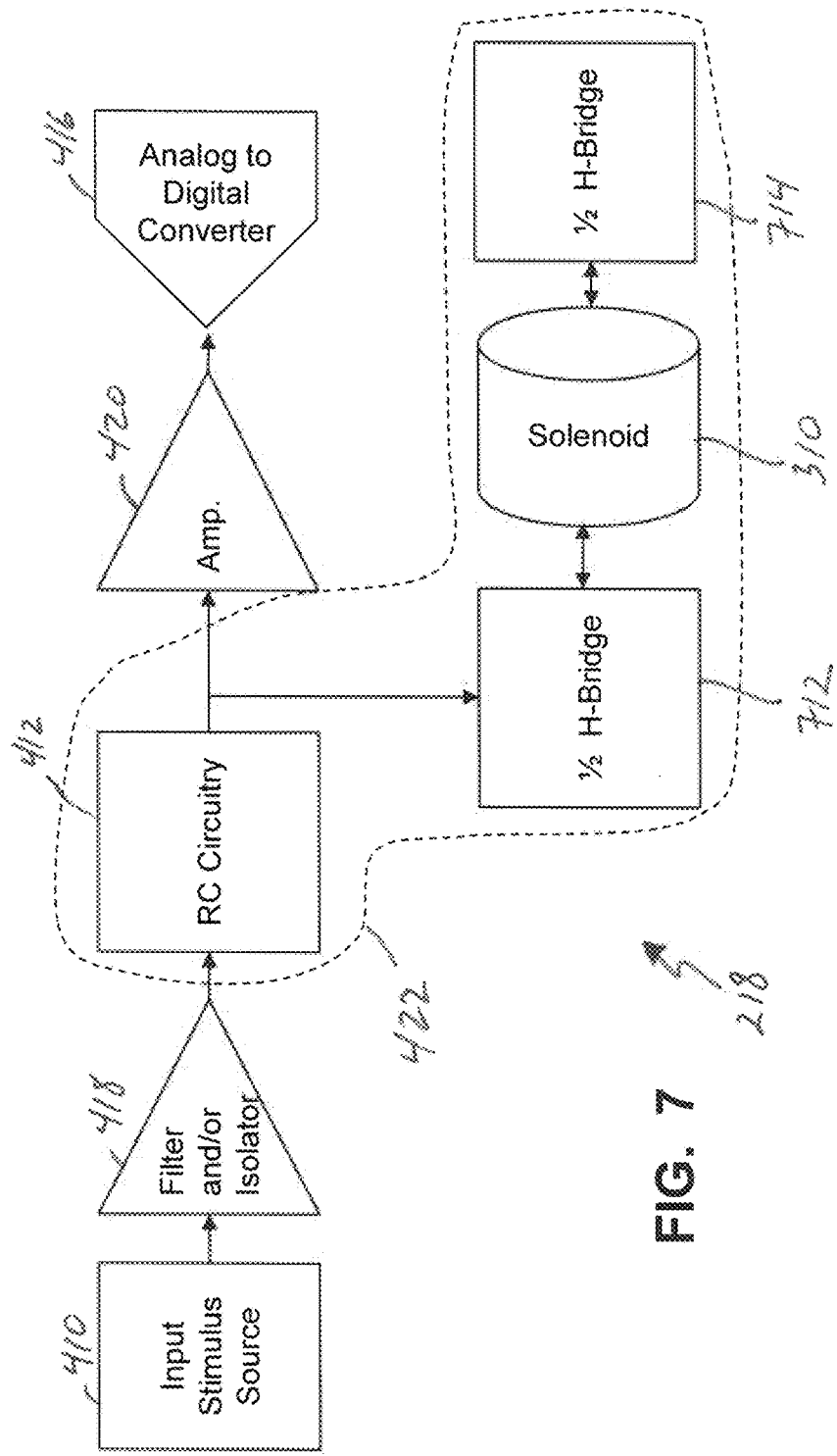
FIG. 7 illustrates a simplified block diagram of an exemplary circuitry or system comprising a PPDC, in accordance with some embodiments.

FIG. 7 illustrates a simplified block diagram of an exemplary circuitry or system comprising the PPDC 218 in accordance with some embodiments. The PPDC 218 receives the input stimulus from and/or comprises an input stimulus source 410. For example, the controller 214 and/or a microcontroller can generate the input stimulus and/or activate a separate stimulus source. Some embodiments include an input stimulus conditioning circuitry or system 412 that cooperates with the power control and switching circuitry. The switching circuitry dictates the direction of current through the solenoid 310, and thus, the direction of movement of the plunger 312 to the open position or the closed position.

In some embodiments, the switching circuitry comprises, for example, an H-bridge switching circuitry with a first half of an H-bridge switching circuitry 712 cooperated with a first terminal of the solenoid 310 and a second half of the H-bridge circuitry 714 cooperated with a second terminal of the solenoid. The H-bridge is controlled by the controller 214 to dictate a direction of the current flow through the solenoid 310 to control the extension and retraction of the plunger 312 between the open and closed positions. Similar to the embodiment depicted in FIG. 4, the embodiment illustrated in FIG. 7 may also include, in some embodiments, the A/D converter 416. Further, some embodiments may optionally include the filtering and/or isolation circuitry 418, the gain stage 420 and/or other relevant circuitry and/or systems.

Figure 8A:
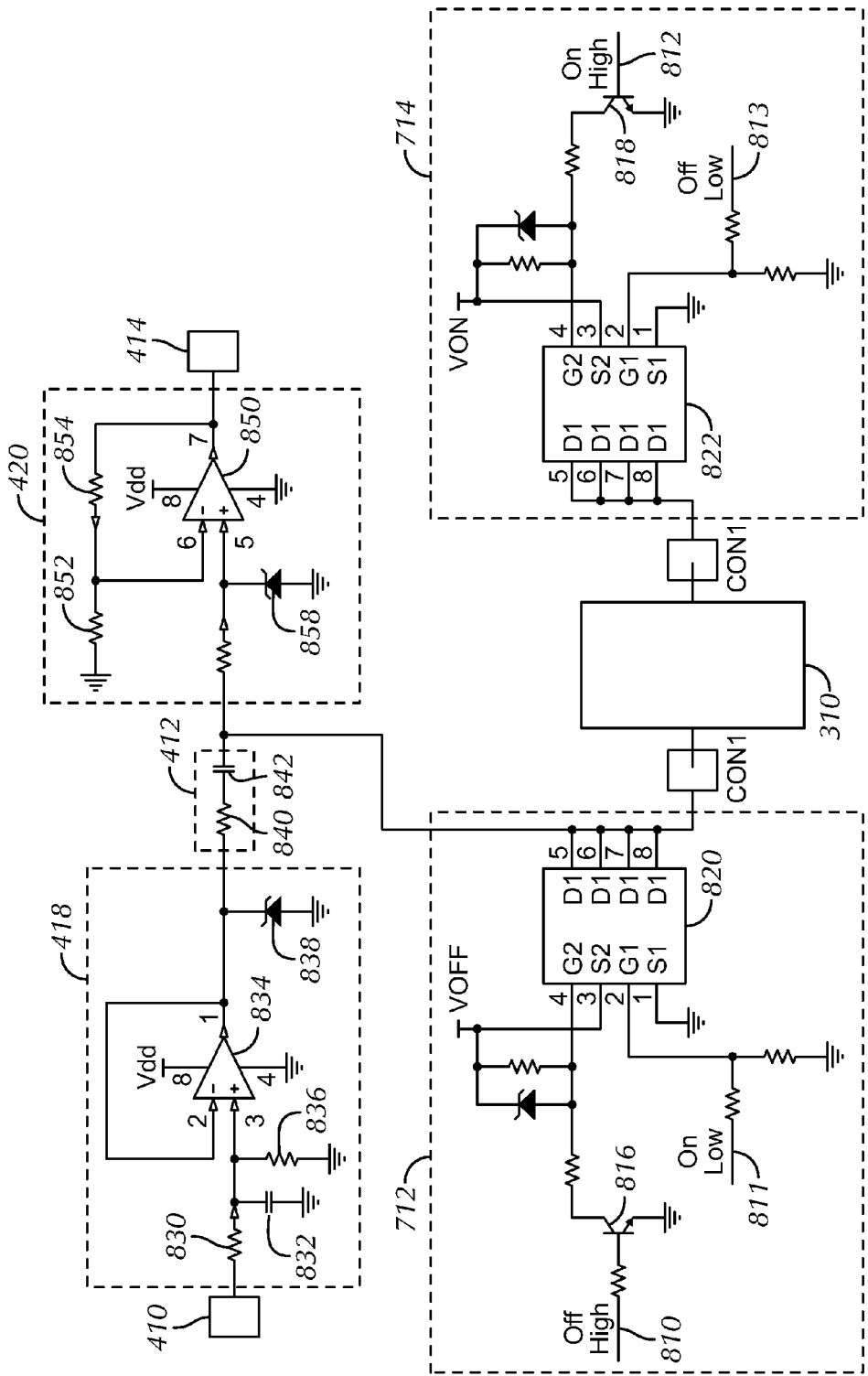
FIG. 8A shows a circuit diagram of exemplary circuitry or a system comprising a PPDC, in accordance with some embodiments.

FIG. 8A shows a circuit diagram of exemplary circuitry or a system comprising a PPDC 218, in accordance with some embodiments. The input stimulus source 410 couples with a filtering and isolation circuitry 418 that passes the input stimulus to the conditioning circuitry 412, which comprises RC circuitry. A first terminal of the solenoid 310 couples with the RC circuitry to receive the input stimulus. A gain stage 420 is also coupled with the first terminal of the solenoid 310, and amplifies the voltage across the solenoid. The amplified voltage is received at the sampling circuitry 414, which in some embodiments includes an A/D converter, to take one or more voltage measurements of the voltage corresponding to the voltage across the solenoid. The gain stage in part allows for the use of an increased dynamic range of the sampling circuitry and/or the utilization of a greater number of bits to digitally represent the sampled signal than available without the gain stage.

A first half of an H-bridge switching circuitry 712 also couples with the first terminal of the solenoid, while a second half of the H-bridge circuitry 714 couples with a second terminal of the solenoid. The H-bridge switching circuitry is controlled by the controller 214. Again, in operation, the H-bridge circuitry switches the plunger drive signal (e.g., current pulse) to open or close the corresponding irrigation valve 110. For example, the controller 214 can be configured to generate switching control signals 810-813 that are applied to the first and second halves of the H-bridge switching circuitry (e.g., one or more of: an off-high signal 810 applied to a gate of a first transistor 816 of the first half of the H-bridge circuitry 712 that in turn controls a voltage at a gate of a first switch of a first two-switch switching circuitry, device or system 820 (e.g., MOSFET switching circuitry); an on-low signal 811 applied to a gate of a second switch of the first two-switch switching circuitry 820; an on-high signal 812 applied to a gate of a second transistor 818 of the second half of the H-bridge circuitry 714 that in turn controls a voltage at a gate of a first switch of a second two-switch switching circuitry, device or system 822; an off-low signal 813 applied to a gate of a second switch of the second two-switch switching circuitry 822). The switching controls signals 810-813 can control whether the plunger is driven to the open or closed position, which in turn opens or closes the valve. For example, in some implementations when implementing a valve on plunger drive signal (i.e. valve is open) the on-low signal 811 can be applied as a logical low signal while the on-high signal 812 can be applied as a logical high signal. Similarly, in some implementations, when applying a valve off plunger drive signal (i.e., valve is closed) the off-high signal 810 can be applied as a logical high signal, and the off-high signal 810 can be applied as a logical high signal.

The filtering and isolation circuitry 418 of FIG. 8A includes a filtering circuitry comprising RC filter circuitry with a filter resistance 830 and filter capacitance 832. The values of the filter resistance and filter capacitance provide at least some control over a shape of the input stimulus and/or to limit the frequency content of the input stimulus (e.g., filtering edges on a square pulse). Some embodiments include an amplifier circuitry 834 (e.g., operational amplifier, transistor(s), etc.) that operates as a follower with a unitary gain, which in some instances can further provide some isolation of the input stimulus source 410 from the LRC circuitry. Accordingly, the input stimulus source (e.g., a microcontroller) is isolated from and effectively cannot see (or is not affected by) the impedance of the solenoid of by LRC circuit. In some embodiments, the filtering and/or isolation circuitry includes a limiting resistance 836 that can be configured to limit an amplitude of the input stimulus to a desired level, such as a predefined threshold. In some embodiments the limiting resistance maintains a maximum output of the amplifier (e.g., to a voltage of about 1.6 V, in some implementations).

Some embodiments may include one or more additional protection circuitry. For example, some embodiments may include a diode 838 coupled relative to the conditioning circuitry 412 and/or the amplifier circuitry 834. The diodes can provide protection for the isolation circuitry 418 from higher voltages that may appear at a circuit node of the isolation circuitry when the switching circuit is executing the actuation of the plunger.

In some embodiments, the conditioning circuitry 412 includes one or more resistors providing a conditioning resistance 840 and one or more capacitors providing the conditioning capacitance 842 such that the conditioning circuit comprises an RC circuitry. The RC circuitry is shown coupled in series with the solenoid 310. In other embodiments, however, the RC circuitry may be coupled in parallel with the solenoid. The value of the conditioning resistance 840 and conditioning capacitance 842 can be selected to provide for a resonant circuit, with a value of inductance of the solenoid 310 when the plunger is in a known position (e.g., closed position), the resistance of the conditioning resistance 840 and the capacitance of the conditioning capacitance 842 dictating whether or not the circuit is resonant. As described above, in some implementations the resistance 840 is a fix value resistor and the capacitance 842 is a fixed value capacitor.

Again, some embodiments optionally include the gain stage circuitry or system 420. In some implementations, the gain stage comprises amplifier circuitry 850 (e.g., an operational amplifier, transistor(s), etc.) that amplifies the voltage for sampling by the sampling circuitry 414. The gain of the amplifier 850 is controlled by the gain resistors 852 and 854. The gain stage increases the signal for sampling, and in some instances increases the signal to near full scale to increase and in some instances maximize resolution and/or allowing higher precision in the voltage measurements. Further, in some embodiments, the gain stage provides a low impedance source to drive the sampling circuitry (e.g., a sample and hold internal to the controller), which can help in reducing and/or eliminating sampling errors. Some embodiments may further include one or more additional protection circuitry. For example, some embodiments may include a diode 858 coupled relative to the conditioning circuitry 412 and/or the gain stage circuitry 420. Similar to the diode 838, the diodes 858 can provide protection for the gain stage circuitry from higher voltages that may appear at a circuit node of the gain stage circuitry when the switching circuit is executing the actuation of the plunger. Although FIG. 8A shows the diodes 838, 858 as part of the isolation circuitry 418 and gain stage circuitry 420, respectively, in some embodiments, the diodes may be stand-alone components, may be part of the conditioning circuitry 412, or may be part of other circuitry.

In operation, current is applied to the PPDC through the input stimulus source 410 passing through the filtering and/or isolation circuitry, which again can shape the input stimulus and/or isolate the input stimulus source. Following the isolation and/or filtering, when included, the current enters the conditioning circuitry 412 (e.g., RC circuitry comprising resistance 840 and capacitance 842). Typically, the current passes through the first half of the H-bridge circuitry 712 to be applied to the solenoid 310. In some embodiments, the current then continues to ground through the second half of the H-bridge circuitry 714 (e.g., the second two switch switching circuitry 822 can be configured and/or programmed such that the current flows from a drain to a source of a MOSFET and to ground). Again, the input stimulus is sufficiently low that it does not cause the plunger to move.

In some embodiments, the sampling circuitry 414 takes one or more voltage measurements through a stimulus response curve. FIG. 9 shows a graphical representation 910 of the resulting voltage over time as seen across the solenoid in response to a square pulse input stimulus (e.g., 5 V, 10 µs pulse width) in accordance with some implementations when the plunger is in the open position (e.g., with at least a majority of the plunger generally within of the solenoid), and a graphical representation 912 of the resulting voltage over time as seen across the solenoid in response to a square pulse input stimulus (e.g., 5 VDC, 10 µs pulse width) in accordance with some implementations when the plunger is in the closed position (e.g., with at least a majority the plunger positioned substantially out of the solenoid). Further, the graphical representations 910 and 912 are based on measurements taken by through an A/D converter (e.g., within the controller 214) following a gain stage circuitry (e.g., gain stage 420). Multiple measurements 914 or samples are taken over time of the voltage across the solenoid in response to the application of the input stimulus to the solenoid (e.g., injection into the LRC circuit). In some embodiments, the multiple voltage measurements made through the stimulus response curve help with noise immunity and increase the absolute magnitude difference between the two plunger positions or states. Further, in some embodiments, two or more of the multiple measurements can be combined and the combined value can be compared to the one or more thresholds in determining whether the plunger is in the open position, closed position or other position. For example, the multiple voltage measurements taken over the response curve and/or time can be summed. In other embodiments, two or more voltage measurements are averaged. Again, the combined value can be compared to one or more thresholds and/or ranges in determining a location of the plunger. Other such combining and/or other mathematical equations can be applied to combine the one or more voltage measurements that can be evaluated to determine a location of the plunger (e.g., based on a comparison to one or more thresholds, a mapping between combined measurements and corresponding position information, one or more tables associating cooperated measurements with plunger locations, a relationship between a range of combined measurements and a range of locations, etc.).

The distance between the resulting voltage measurements when the plunger is in the different positions allows the controller to evaluate the voltage measurements relative to one or more thresholds in determining a position of the plunger. For example, a first threshold can correspond to an approximate voltage across the solenoid when the plunger is in the closed position (e.g., measured voltage is greater than a first threshold), and a second threshold can correspond to an approximate voltage expected across the solenoid when the plunger in the open position (e.g., measured voltage is less than a second threshold). Similarly, the one or more thresholds may include or correspond to one or more threshold curves or graphs 918, 920 that correspond to the expected stimulus response voltage curve measured across the solenoid (e.g., an open threshold curve 918, and a closed threshold curve 920). Again, some embodiments evaluation one or more measurements and/or cooperated measurements relative to one or more thresholds. Additionally or alternatively, in some embodiments, the controller 214 is configured to evaluate measurements relative to ranges, and to identify the plunger as being at a location when the plunger is determined to be within a one range of a plurality ranges of positions distributed along and within a range of motion of the plunger.

FIG. 10 shows a graphical representation of a corresponding voltage over time 1010 across the solenoid and prior to a gain stage in response to the input stimulus when the plunger is in the closed position (out of the solenoid), and a graphical representation of a corresponding voltage over time 1012 across the solenoid in response to the input stimulus when the plunger is in the open position (in the solenoid).

Figure 8B:
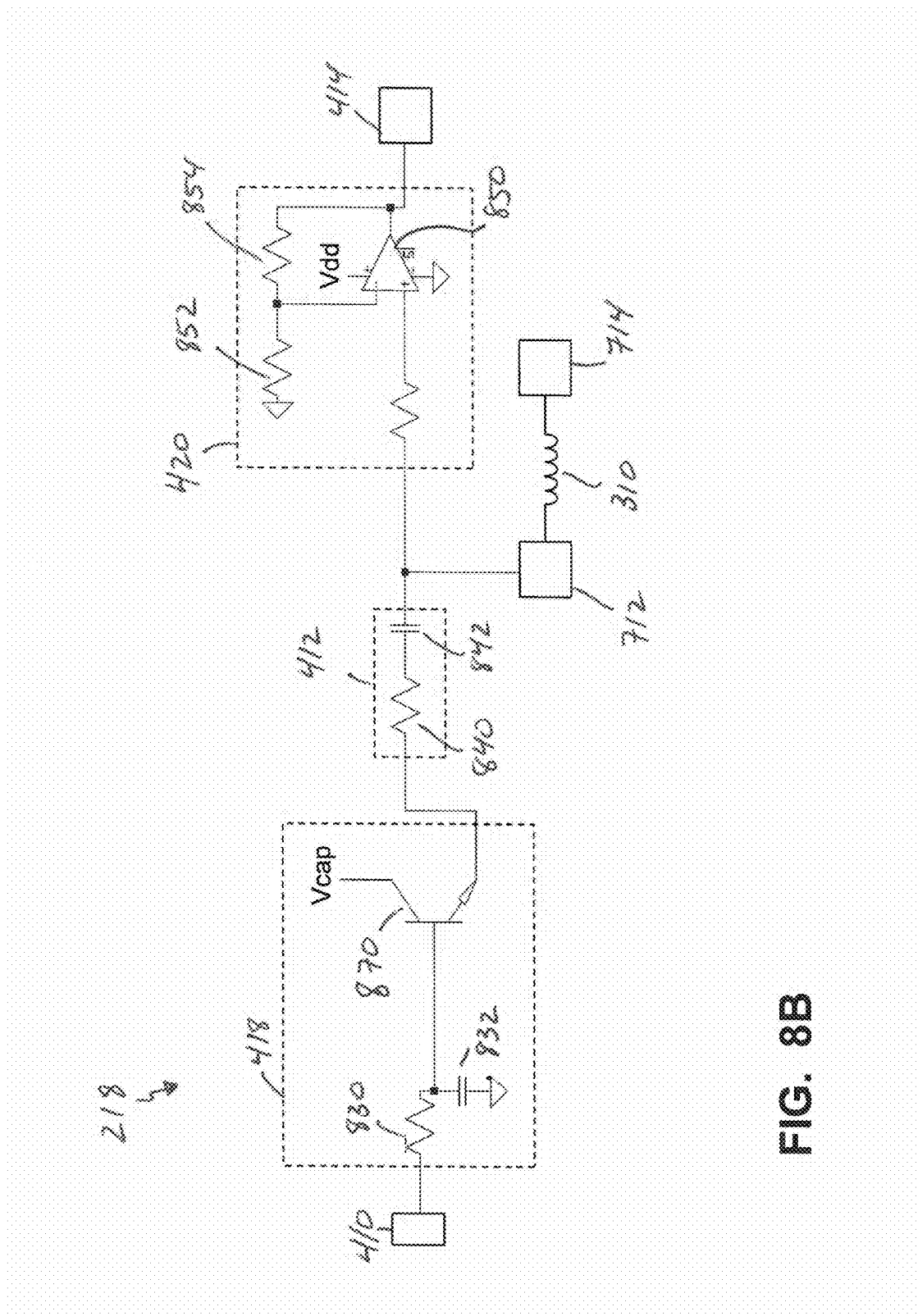
FIG. 8B show a circuit schematic of exemplary circuitry or system comprising a PPDC, in accordance with some embodiments.

FIG. 8B shows a circuit schematic of exemplary circuitry or a system comprising a PPDC 218, in accordance with some embodiments. Filtering and/or isolation circuitry 418 receives the input stimulus from an input stimulus source 410, and couples with conditioning circuitry 412. A first terminal of the solenoid 310 couples with the conditioning circuitry through switching circuitry 712, 714. A gain stage 420 is also coupled with the first terminal of the solenoid 310, and amplifies the voltage across the solenoid. The amplified voltage is received at sampling circuitry 414, which in some embodiments includes an A/D converter, to take one or more voltage measurements of the voltage corresponding to the voltage across the solenoid.

The filtering and/or isolation circuitry 418, in some embodiments, includes a filtering circuitry comprising RC filter circuitry with a filter resistance 830 and filter capacitance 832. As described above, the values of the filter resistance and filter capacitance provide at least some control over a shape of the input stimulus and/or to limit the frequency content of the input stimulus (e.g., filtering edges on a square pulse). Further, some embodiments include isolation circuitry 870. For example, some implementations include one or more transistors (e.g., bipolar junction transistor(s) (BJT), or other such transistor or transistors) that provide some isolation of the input stimulus source 410 from the LRC circuitry. Accordingly, in some implementations, the input stimulus source (e.g., a microcontroller) is isolated from and effectively cannot see (or is not affected by) the impedance of the solenoid of by LRC circuit. A voltage, Vcap, is connected to one or more energy storage devices (e.g., capacitors, batteries, rechargeable batteries, etc.) or other voltage source. The application of the input stimulus activates the transistor to switch on and modulates the voltage from the application of the energy storage devices or other source voltage to the conditioning circuitry 412, first half of the H-bridge switching circuitry 712, solenoid 310 and second half of the H-bridge switching circuitry 714 in determining a location of the plunger.

In some embodiments, the switching circuitry is similar to the switching circuitry of FIG. 8A, and includes a first half of an H-bridge switching circuitry 712 that couples with the first terminal of the solenoid, while a second half of the H-bridge circuitry 714 couples with a second terminal of the solenoid. The H-bridge switching circuitry can be controlled by the controller 214 or other relevant switch controller.

Again, some embodiments optionally include the gain stage circuitry or system 420. In some implementations, the gain stage comprises amplifier circuitry 850 (e.g., an operational amplifier, transistor(s), etc.), where a gain of the amplifier 850 is controlled by the gain resistors 852 and 854. In operation, current is applied to the PPDC through the input stimulus source 410 passing through the filtering and/or isolation circuitry 418, which again can at least help in shaping the input stimulus and/or isolate the input stimulus source. Following the isolation and/or filtering, when included, the current enters the conditioning circuitry 412 (e.g., RC circuitry comprising resistance 840 and capacitance 842). Typically, the current passes through the first half of the H-bridge circuitry 712 to be applied to the solenoid 310. In some embodiments, the current then continues to ground through the second half of the H-bridge circuitry 714. In some embodiments, the sampling circuitry 414 takes one or more voltage measurements through a stimulus response curve.

Further, the timing of when the one or more voltage measurements are taken is typically controlled by the controller 214, and is typically dependent on the expected range of inductance of the solenoid, and can also be dependent upon the conditioning circuitry 412 and/or the input stimulus. In some embodiments, one or more measurements may be taken simultaneously as the input stimulus is applied, in some instances one or more voltage measurements are taken at a termination of an input stimulus (e.g., at a falling edge of a plus), one or more voltage measurements may additionally or alternatively be taken some delayed time period following the application of the input stimulus. The delay between the application and/or termination of the input stimulus and the timing of the one more measurements can be a few microseconds or more. For example, in many instances, the input stimulus applied is a single pulse having a fixed duration (e.g., 50 μs). As such, the controller having knowledge of the input stimulus can delay the one or more measurements to approximately a conclusion of the pulse, sometime during the pulse, a time just following the pulse (e.g., starting at about 52-56 μs), or other such delays. The timing can take into consideration reactance of circuit components (e.g., the inductance of the solenoid).

In some embodiments, the basic measurement circuitry used to detect the plunger is relatively simple, based on expected inductance value differences corresponding to different plunger positions. This inductance difference is caused by the different plunger positions relative to the coil. Observations from tested, manufactured coils show a "plunger in" inductance value to be approximately 18.5 mH and the "plunger out" to be approximately 26 mH. The inductance values are measured by a small stimulus, too small to provide motive force on the plunger, and in some embodiments routed through an LRC circuit. Testing can be performed to identify one or more thresholds that can subsequently be utilized in determining thresholds (e.g., a closed voltage threshold and/or an open voltage threshold).

One or more measurements can be made through the stimulus response curve to help with noise immunity and to increase the absolute magnitude difference between the two states as illustrated in FIG. 9. A gain stage can, in some embodiments, be configured to provide a low impedance source to drive the internal sample and hold, which can reduce or eliminate sampling errors. Further, the gain stage can increase the signal to near full scale to maximize resolution.

Referring back to FIGS. 7 and 8, and as described above, in some embodiments the RC circuitry and the solenoid 310 establish the LRC circuitry. The value of the conditioning resistance 840 and conditioning capacitance 842 can be selected to provide a resonant circuit when the plunger is in a predefined position such that the inductance of the solenoid in relation to the selected resistance and capacitance dictates that the LRC circuitry is a resonant circuit. As the inductance of the solenoid changes, however, due to a change in position of the plunger the LRC circuitry no longer acts as a resonant circuit. As such, some embodiments utilize the resonant aspect of the established LRC circuitry in determining a location of the plunger relative to the solenoid.

In some embodiments, the response to an input stimulus can be measured to determine whether a resonant response is detected. For example, in some implementations, an amplitude of the response from the LRC circuitry is tracked or otherwise sampled to determine whether the amplitude has a predefined relationship with one or more amplitude thresholds. When the resonant circuit is established the LRC circuitry response typically results in a peak amplitude. As such, based on measured LRC circuitry response, the controller can determine whether the plunger is in the predefined position.

Further, some embodiments are configured to determine different plunger positions relative to the solenoid by configuring the system to utilize a range of frequencies that can be tracked as different resonant frequencies each typically correspond to a different inductance of the solenoid and thus different plunger positions. As is understood in the art, a resonant frequency ($\omega_o$) equals 1 over root squared of inductance times capacitance (i.e., $\omega_o=1/\sqrt{LC}$), where the resonant frequency is in radians per second. So when a resonance condition occurs the measured voltage (e.g., at the A/D converter 416) peaks versus when resonance does not occurs (i.e. when it does not occurs at $\omega_o$), where the resonant frequency typically is depended on the inductance (L value) of the solenoid 310. In some embodiments, the input stimulus is a sine wave signal, a periodic square wave signal or other such relevant signal that is set at the resonant frequency, or at one of potentially several different frequencies that each correspond to a different plunger position. The controller 414, in some embodiments, is configured to detect the resonance peak at the resonant frequency or the absence of the resonant response indicating the plunger is a predefined position (e.g., an open position when the resonant response is detected and a closed position when the resonant response is not detected, or at some position between open and closed as a function of the response relative to the resonant response).

In some embodiments, the controller is further configured to detect over a range of frequencies to allow the plunger position to be more precisely tracked. In such configurations, the resonant frequency of the input stimulus can be varied, where different resonant frequencies correspond to different plunger locations (i.e., correspond to the different inductances of the solenoid based on the position of the plunger relative to the solenoid). As such, the controller can estimate a plunger location from a fully closed position, to a fully open position, one or more positions between fully open and fully closed, and in some instances when the plunger is removed, based on applying different resonant frequency input stimulus signals and the detection of a resulting resonant response (e.g., tracking voltage peaks which correspond to a given resonant frequency, $\omega_o$).

Figure 11:
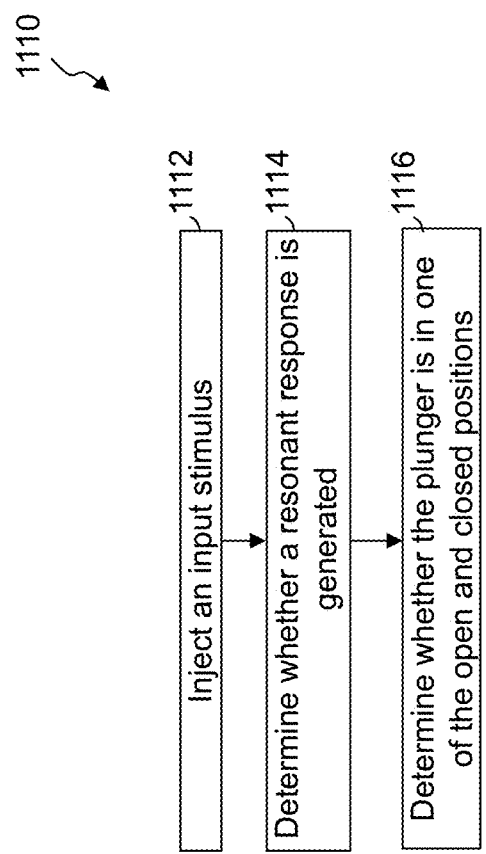
FIG. 11 shows a simplified flow diagram of an exemplary process to identify a location of the plunger based on a resonant response to the input stimulus, in accordance with some embodiments.

FIG. 11 shows a simplified flow diagram of an exemplary process 1110 to identify a location of the plunger based on a resonant response to the input stimulus, in accordance with some embodiments. In step 1112, an input stimulus is injected or applied to the solenoid. The input stimulus can be a pulse, a train of pulses, a tone, or other such relevant inputs that can induce a resonant response from the LRC circuit when the plunger is in a position to establish an inductance that allows the LRC circuit to generate the resonant response. In some embodiments, the application of the input stimulus can include applying an input stimulus signal that changes its resonant frequency over time, or multiple input stimulus signals having different resonant frequencies may sequentially be applied. In step 1114, it is determined whether a resonant response is detected in response to the input stimulus. In some embodiment, one or more voltage measurements relative to the solenoid and/or across the solenoid are taken. The controller 214 can be configured to evaluate the one or more voltage measurements to determine whether a resonant response is detected. For example, the controller can compare the one or more voltage measurements, voltage amplitude and/or peak measurements to one or more predefined amplitude thresholds that correspond to predicted amplitude when the plunger is in the predefined position and the resonant response is generated in response to the input stimulus. As described above, some embodiments apply different input stimulus signals having different resonant frequencies. Accordingly, some embodiments may repeat steps 1112 and 1114 any number of times with different resonant frequencies to identify when a resonant response is detected.

In step 1116, a position of the plunger is estimated. In some instances, this includes determining whether the plunger is in the open or closed position based on a determined relationship between the peak voltage and one or more voltage threshold. Some embodiments are configured to determine whether the resonant response is detected, and/or a degree of the resonant response detected that corresponds to partially open positions. In some embodiments, the resistance and capacitance of the resonant circuitry are selected to correspond with the inductance of the solenoid when the plunger is in a predefined position, such as in the closed position, when the input stimulus is applied with the relevant resonant frequency. When the resonant response is detected the plunger is determined to be in the predefined position corresponding to the resonant frequency of the input stimulus and the inductance of the solenoid (e.g., the closed position), and when the resonant response is not detected the plunger is not in the predefined position (e.g., the open position or in another position). As described above, some embodiments may vary the resonant frequency of the input stimulus to provide a more precise identification of the position of the plunger.

Further, in some embodiments, the control circuitry or controller is configured to determine a voltage amplitude of a response generated by the resonant circuit in response to the input stimulus and determine whether the resonant response is generated by, at least in part, comparing a peak voltage to a voltage threshold, and determining whether the resonant response is generated based on a determined relationship between the peak voltage and the voltage threshold. Similarly, some embodiments measure one or more voltage measurements corresponding to one or more voltages across the solenoid, e.g., through sampling circuitry, and the control circuitry is further configured to evaluate the one or more voltage measurements relative to a second threshold, and determine the location of the plunger as a function of a relationship between the one or more voltage measurements and the second threshold. The identification of a location, in some instances includes identifying the plunger is in an unknown position (e.g., not in the open position and not in the closed position) as the result of a determined relationship between the peak voltage and its relationship with one or more thresholds. Some embodiments apply an alternate input stimulus into the solenoid, determine whether the resonant response is generated in response to the alternate input stimulus, and determine that the plunger is removed from a position cooperated with the solenoid in response to whether the resonant response is generated based on the alternate input stimulus.

Some embodiments inject an input stimulus that is in the frequency domain. For example, some embodiments employ a tone signal, sine wave (e.g., through a digital to analog converter), periodic square signal, or the like as the input stimulus. In some implementations, a tone signal is configured as a signal that oscillates at a fixed frequency (e.g., a sine wave), having a spike or tone at a given frequency when considered and/or evaluated in the frequency domain. Other embodiments apply an input stimulus comprising multiple tones and/or spanning a frequency spectrum. Further, the sampling circuitry and/or circuitry taking the one or more voltage measurements may be configured to take the one or more voltage measurements as they vary with frequency.

Depending on the position of the plunger relative to the solenoid, the amplitude of the tone is amplitude modulated (i.e., attenuated). In response to the application of the tone input stimulus, one or more voltages can be measured, and typically multiple voltage measurements corresponding to the voltage across the solenoid are taken over time in response to the tone input stimulus being applied to the solenoid. The voltage measurements can be taken similar to those described above. The one or more voltage measurements are then evaluated to determine the location of the plunger. For example, in some implementations, the amplitude of the modulated tone is determined and/or an amount of attenuation can be detected. Based on the determined amplitude and/or attenuation, and the frequency of the input stimulus, a location of the plunger can be determined, e.g., through a relationship with one or more thresholds, a mapping of attenuation to plunger position, a mapping of amplitude to plunger position, or other such evaluations and/or combinations thereof. Again, some embodiments identify whether the plunger is in one of the open or closed position, whether the plunger is in an undetermined position, and/or whether the plunger is removed from the solenoid. Further, some embodiments may provide more precision to identify a location of the solenoid within a given range, identify a relative location of the plunger (e.g., 80% open, 35% closed, etc.) or other such more precise location identification.

Figure 12:
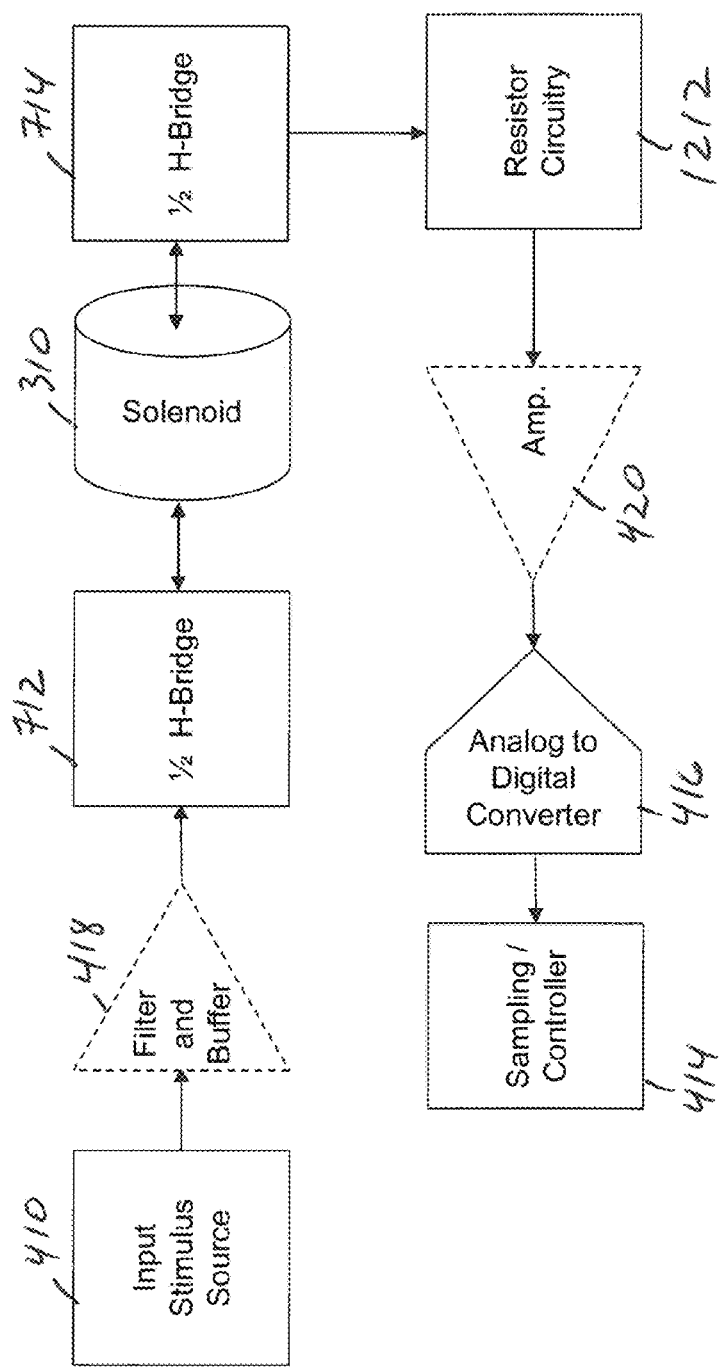
FIG. 12 depicts a simplified block diagram representation of exemplary circuitry forming at least part of a PPDC, in accordance with some embodiments.

FIG. 12 depicts a simplified block diagram representation of exemplary circuitry forming at least part of the PPDC 218, in accordance with some embodiments. The circuitry utilizes a determined inductances in identifying a position of a plunger 312 relative to the solenoid 310. The circuitry includes an input stimulus source 410, switching circuitry such as first and second half H-bridge switching circuitry 712 and 714, resistance circuitry 1212 or other such relevant conditioning circuit, and sampling and/or control circuitry 414. Some embodiments optionally include filtering and/or isolation circuitry 418, a gain stage or amplifying circuitry 420, an A/D converter 416 and/or other such circuitry.

The solenoid 310 is configured to cooperate with a plunger 312 (not shown in FIG. 12). Further, the solenoid is configured to receive the plunger drive signal from a plunger activation circuitry (not shown). The plunger drive signal induces a magnetic field generated relative to the solenoid that in turn can cause the plunger to change positions between open and closed positions. Again, the transition of the plunger corresponds to an opening and closing of the irrigation valve coupled with the plunger. The H-bridge circuitry 712, 714 couples with the solenoid, and depending on switch orientation as activated and controlled by the controller 214, dictates the direction of current flow through the solenoid. The direction of current of the plunger drive signal applied by the plunger activation circuitry controls the direction of movement of the plunger between the open and closed position and whether the plunger is in the open or closed position.

The input stimulus source 410 generates and/or directs an input stimulus to be applied to a first terminal of the solenoid. In some embodiments, the input stimulus source is implemented on the controller 214 (e.g., a microcontroller). Typically, the input stimulus is applied to the solenoid at a time when the plunger drive signal is not being applied to the solenoid. Further, the input stimulus typically does not cause the plunger to change from a current position. In some implementations, the input stimulus is a pulse, such a single square pulse with a fixed duration. Other embodiments may apply a train of pluses, while yet other embodiments may utilize a sine wave oscillator and apply a sine wave or other such waveforms.

The resistance circuitry 1212 cooperates with the solenoid 310. In some embodiments, the resistive circuitry is coupled with a second terminal of the solenoid, such as through one or more switching circuitry that couple and decouple the resistance circuitry 1212 with the solenoid or otherwise provide a lower resistance path. Further, in some embodiments, the resistance circuitry 1212 comprises a precision, low tolerance, fix-value resistor or other relevant circuitry. The known resistances of the resistance circuitry can be utilized to indirectly calculate the electrical current flowing through the inductor.

In some embodiments, the solenoid 310 is selectively coupled in series with the resistance circuitry 1212 providing a resistive load. The sampling circuitry 414 is coupled with the second terminal of the solenoid and/or the resistance circuitry, and is configured to take one or more voltage measurements across the resistive load, at least in response to the input stimulus being applied to the solenoid. In some implementation, the one or more voltage measurements of the voltage across the resistance circuitry 1212 are taken while the input stimulus is being applied to the solenoid, at about the termination of the input stimulus (e.g., approximately at a falling edge of a pulse input stimulus) while current is passing through the solenoid in response to the input stimulus, after a predefined delay after applying the input stimulus or other such timing. The control circuitry 214 couples with the sampling circuitry to receive the one or more voltage measurements and determines a current passing through the resistive load as a function of the one or more voltage measurements and the resistance of the resistance circuitry.

The controller 214, in some embodiments, is configured to determine an inductance of the solenoid as a function of the determined current and a timing of the input stimulus. In some implementations, the controller exploits the equation V=di/dt*L. Utilizing the measured one or more voltage measurements measured across the resistance circuitry 1212, the voltage is known, and the inductance becomes proportional to a change in current over time (e.g., L=V/di/dt). The duration, duty cycle and/or frequency of the input stimulus is known and can be used to determine and/or estimate the change in current (di/dt). For example, a pulse input stimulus having a duration of 10 μs can be applied to a solenoid having an unknown inductance value based on an unknown position of the plunger relative to the solenoid. The one or more voltage measurements are made across the current sense resistance circuitry 1212, typically at time proximate an end of the pulse. With the known resistance and the measured voltage, the current is calculated. Knowing the time that the voltage was applied and/or the pulse duration, the change in current can be estimated, for example as a function of the measured voltage, the resistance and the duration of the pulse (e.g., $di/dt \approx (V_{measured}/R)/10$ us).

Based on the determined change in current over time and the voltage of the input stimulus ($V_{stimulus}$), the controller can calculate an estimated inductance (L) of the solenoid at the time the input stimulus was applied to the solenoid (e.g., $L=(V_{stimulus})/(di/dt)$). The controller can then evaluate the estimated inductance and determine whether the plunger is in one of the open or closed position as a function of the determined inductance of the solenoid. Further, in some implementations, the controller can determine, based on the determined inductance and one or more thresholds, whether the solenoid is in an unknown position between the open and closed positions, and/or whether the plunger is removed from the ICM. Similarly, depending on a precision, some embodiments can further determine an approximate location of the plunger between the open and closed positions.

As described above, some embodiments include the filtering and/or isolation circuitry 418. The filtering circuitry can be implemented, at least in part, to further shape the input stimulus and/or to limit the frequency content of the input stimulus. Again, the isolation circuitry can provide isolation for the input stimulus source 410 from other stages of the PPDC 218 and/or other circuitry. In some embodiments the isolation circuitry comprises a unity-gain amplifier, follower and/or other such buffer devices or circuits.

Further, some embodiments include the gain stage or circuitry 420. The gain stage 420, in some embodiments, includes an operational amplifier (op-amp) coupled between the resistance circuitry 1212 and the A/D converter 416. The amplification can help reduce sampling errors and/or allow for the utilization of a greater or full dynamic range of the A/D converter 416, the sampling circuitry and the controller. The amplification, in some implementation, provides an increased sample range of the sampling circuitry allowing a utilization of a greater number of bits to digitally represent the sampled signal and/or use of a greater dynamic range of the controller than available without the gain stage.

As one example, a 5V input stimulus can be applied to the solenoid with a duration of 10 µs. The resistance circuitry 1212 can comprise one or more resistors establishing a resistance of 100Ω. If a voltage measurement of 193 mV is measured across the resistance circuitry in response to the pulse input stimulus, an estimated current of 1.93 mA is calculated (193 mA/100Ω). Using the duration of 10 µs, the estimated change in current over time (di/dt) is calculated to be 193 A/s (1.93 mA/10 µs). The estimated inductance of the solenoid in response to the input stimulus can then be calculated (L=5V/(193 A/s)) to be 25.9 mH. Based on the calculated inductance the controller can determine whether the plunger is in the open or closed position. For example, a threshold of 25.0 mH can be set as a closed position threshold corresponding to a known inductance of 26 mH when the plunger is in the closed position. Accordingly, the controller can identify based on the calculated 25.9 mH inductance that the plunger is in the closed position.

As a further example, if a voltage of 265 mV is measured across the resistance circuitry 1212 having the resistance of 100Ω in response to a 5V pulse input stimulus having a 10 µs duration applied to the solenoid, an estimated current through the solenoid can be calculated as 2.65 mA (265 mV/100Ω). The change in current over time can be estimated as 265 A/s (2.65 mA/10 us). The estimated inductance of the solenoid 310 can be calculated to be 18.9 (L=5V/(265 A/s)). If a threshold of 20.5 mH is set as an open position threshold corresponding to a known inductance of 18.5 mH when the plunger is in the open position, the controller can identify based on the calculated 18.9 mH inductance that the plunger is in the open position. Other thresholds can be defined and used to determine other locations of the plunger and/or more precision in identifying a position of the plunger.

Figure 13:
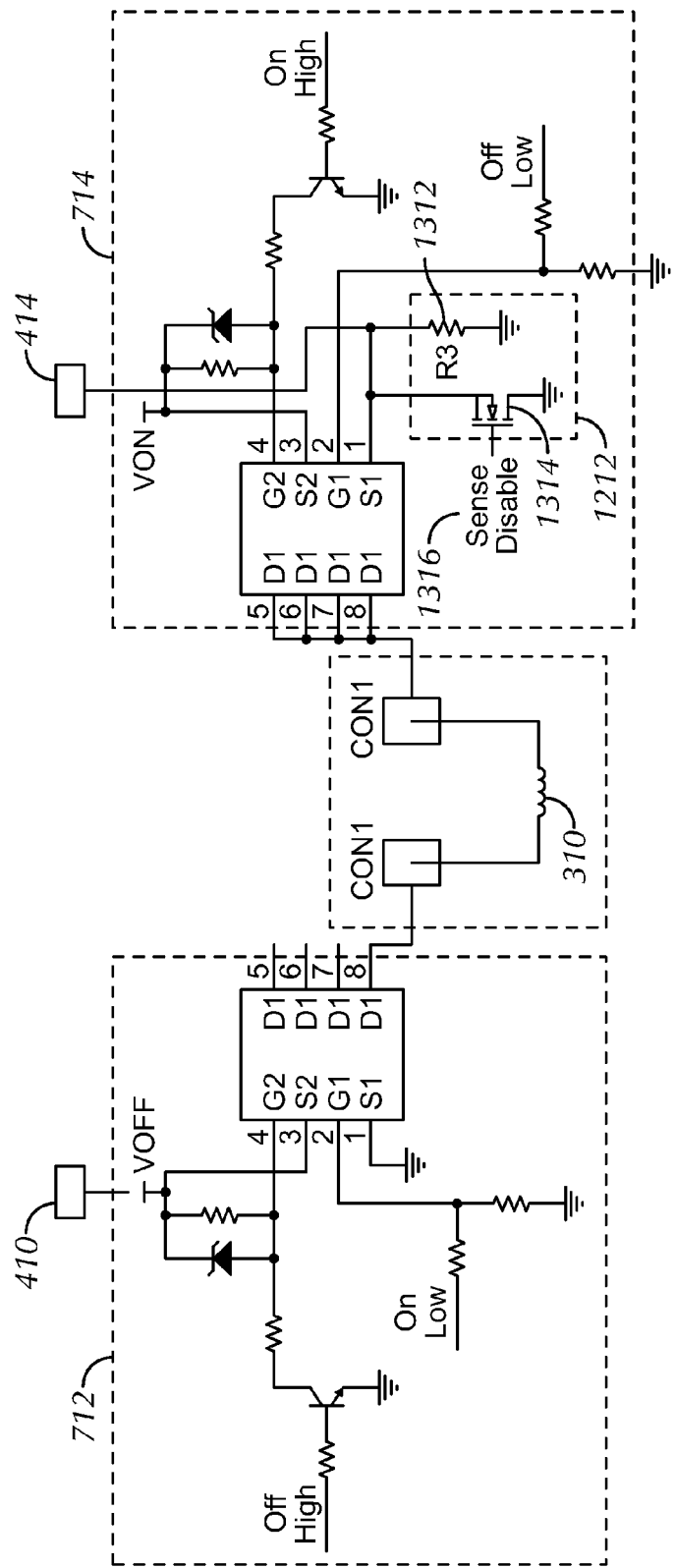
FIG. 13 shows a circuit diagram of exemplary circuitry or a system comprising a PPDC, in accordance with some embodiments.

FIG. 13 shows a circuit diagram of exemplary circuitry or a system comprising a PPDC 218, in accordance with some embodiments. The input stimulus source 410 injects the input stimulus through the first half of the H-bridge switching circuitry 712 that directs the input stimulus to a first terminal of the solenoid 310. A resistance circuitry 1212 is coupled with the second terminal of the solenoid. The second half of the H-bridge circuitry 714 also couples with the second terminal of the solenoid and/or the resistance circuitry couples with the solenoid through the second half of the H-bridge circuitry 714. In some embodiments, the H-bridge circuitry 712, 714 comprises two sets of back to back MOSFETs on both sides of the solenoid 310.

In some embodiments, the resistance circuitry 1212 comprises one or more resistors 1312 providing the resistance for the resistance circuitry. A switching circuitry or resistance circuitry switch 1314 further couples in parallel with the resistor 1312. A switching control signal 1316 controls the resistance circuitry switch 1314 dictating whether the current flows through the resistance circuitry 1212. In some embodiments, the controller 214 and/or the power control and switching circuitry 216 deliver the switching control signal 1316. In association with the input stimulus, the resistance circuitry switch 1314 is activated, and current passing through the solenoid induced by the input stimulus is directed through the resistor 1312. Further, in some embodiments the resistance circuitry switch 1314 comprises one or more transistors, such as a MOSFET transistor with the switching control signal 1316 coupled with the gate of the transistor.

The switching control signal 1316 activates the resistance circuitry switch 1314 directing the current from the solenoid through the resistor 1312. In some embodiments, the resistance circuitry switch 1314 provides a lower impedance path to ground than the resistor 1312 such that current passing through the solenoid when a plunger drive signal is applied to the solenoid is directed to ground instead of passing through the resistor 1312. Accordingly, in some embodiments, the activation and deactivation of the resistance circuitry switch 1314, in association with the application of the input stimulus, selectively couples the resistor 1312 with the second terminal of the solenoid.

When attempting to determine a location of the plunger relative to the solenoid, the switching control signal 1316 induces the resistance switching circuitry to direct the current through the resistor 1312 (e.g., by opening the current path to ground such that the current passes through the resistor 1312). The activation or opening of the resistance circuitry switch 1314 is controlled in accordance with the application input stimulus. As such, the current path through the solenoid as a result of the input stimulus is rerouted through the resistor 1312.

The sampling and/or control circuitry 414 couples with the resistor 1312 of the resistance circuitry 1212 and the one or more voltage measurements across the resistor 1312 can be taken in response to the input stimulus being applied to the solenoid. As described above, some embodiments optionally include a gain stage that couples between the resistance circuitry and the sampling circuitry. The gain stage is configured to amplify the voltage signal across the resistance circuitry, which effectively increases a dynamic range of the sampling circuitry allowing a utilization of a greater number of bits to digitally represent the sampled one or more voltage measurements.

In some embodiments, the one or more voltage measurements are taken at a time proximate an end of the input stimulus (e.g., at approximately the falling edge of a pulse input stimulus), while in other implementations some or all of the voltage measurements are taken while the input stimulus is applied to the solenoid. The current through the solenoid 310 is not measured. Instead, the voltage across the resistor 1312 is measured and used to determine the inductance as a function of the input stimulus. Further, in some embodiments, multiple voltage measures are taken and/or sampled over time and one or more of these measurements are combined, such as summed, averaged or other such combination, and the cooperated results are used in determining the inductance of the solenoid to determine a location of the plunger. For example, the controller and/or control circuitry can be configured to receive multiple voltage measurements, cooperate the multiple voltage measurements and calculate a cooperative measurement that is evaluated relative to one or more thresholds.

Based on the one or more measured voltages across the resistor 1212, the inductance of the solenoid is determined. The controller can evaluate the determined inductance to identify whether the plunger is in the open or closed position (or an undetermined position or removed from the solenoid assembly). For example, in some embodiments, the determined inductance is evaluated relative to a first inductance threshold (e.g., a closed position inductance threshold), and a location of the plunger is determine as a function of a relationship between the determined inductance of the solenoid and the first inductance threshold (e.g., determined inductance is greater than a closed position inductance threshold corresponding to the plunger being in the closed position). Similarly, the determined inductances can be evaluated relative to a second known inductance threshold (e.g., an open position inductance threshold) to determine whether the plunger is in the open position as a function of a relationship between the determined inductance of the solenoid and the second known inductance threshold (e.g., determined inductance is less than an open position inductance threshold corresponding to the plunger being in the open position).

Still further, some embodiments determine whether the plunger is removed from the solenoid by evaluating the determined inductance relative to a third threshold corresponding to an expected inductance when the solenoid is removed. Some embodiments further evaluate the determined inductance to identify that the plunger is in an undetermined position. For example, an undetermined position may be identified as the result of the relationship between the determined inductance of the solenoid and open position inductance threshold and the result of the relationship between the determined inductance of the solenoid and the closed position inductance threshold (e.g., determined inductance is between an open position inductance threshold and a closed position inductance threshold). In some implementations, the plunger position detection circuitry of FIG. 13 provides circuitry that has a reduced component count over the circuitry of FIG. 8. Additionally, the electrical current (i.e., current draw) may be reduced in the circuitry of FIG. 13 over that of FIG. 8, and the time to obtain the voltage measurements may be reduced.

Figure 14:
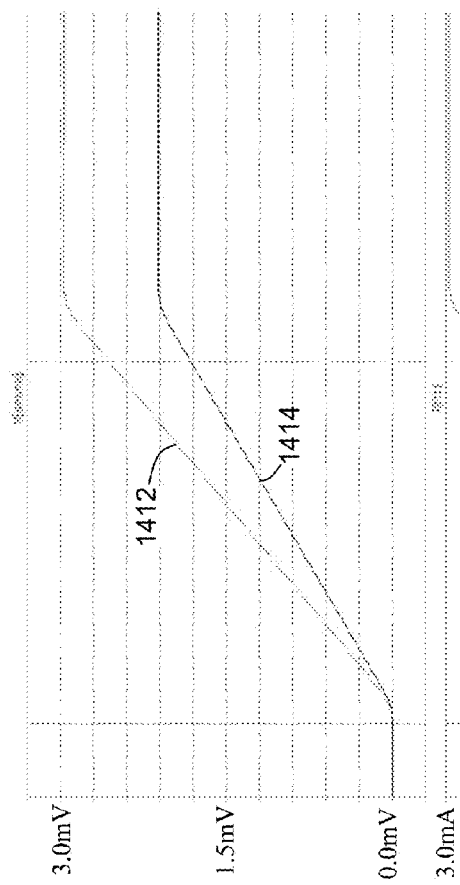
FIG. 14 shows a graphical representation of voltage measurements taken across the resistance circuitry in response to a pulse input stimulus applied to the solenoid, in accordance with some embodiments.
Figure 15:
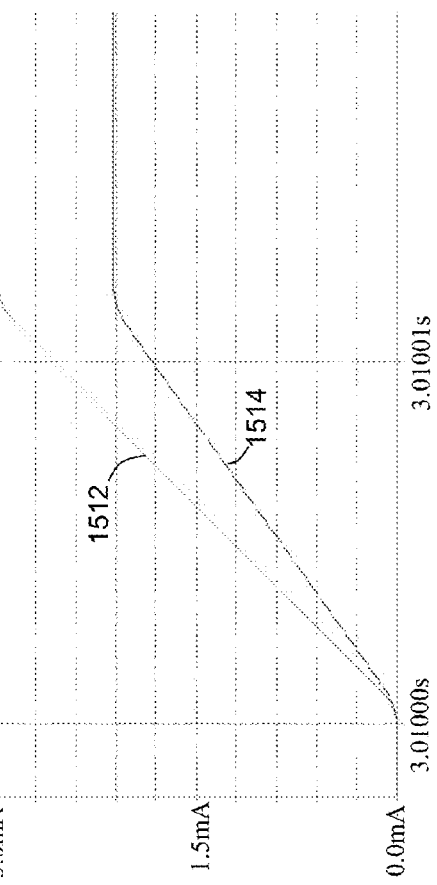
FIG. 15 shows a graphical representation of a corresponding current through the solenoid when the plunger is in the closed and open positions.

FIG. 14 shows a graphical representation of voltage measurements taken across the resistance circuitry 1212 in response to a pulse input stimulus applied to the solenoid, in accordance with some embodiments. The graph shows a first plot of voltage measurements 1412 of a simulation when the plunger is in the closed position, and shows a second plot of voltage measurements 1414 of a simulation when the plunger is in the open position. FIG. 15 shows a graphical representation of a corresponding current 1512 through the solenoid when the plunger is the closed position calculated based on the closed position voltage measurements 1412, and a graph of a corresponding current 1514 through the solenoid when the plunger is in the open position calculated based on the open position voltage measurements 1414.

FIG. 16 illustrates graphical representations of current passing through a solenoid 310 in response to a pulse input stimulus having a 10 us duration. A first plot 1612 shows the current through the solenoid when the plunger is in the closed position while the second plot 1614 shows the current through the solenoid when the plunger in the open position. FIG. 17 shows graphical representations of voltage across the resistance circuitry 1212 obtained through sample-and-hold circuitry of an A/D converter 416 at a time 10 us after the pulse input stimulus is initially applied to the solenoid. A first plot 1712 shows the voltage when the plunger is in the closed position while the second plot 1714 shows the voltage measured when the plunger is in the open position. In some embodiments, the one or more voltage measurements are sampled at the controller 214 (e.g., a microcontroller). For example, the graphical representation of FIG. 17 provides a graph representing the sampling and holding at an A/D converter of the controller or in communication with the controller.

Figures 18, 19:
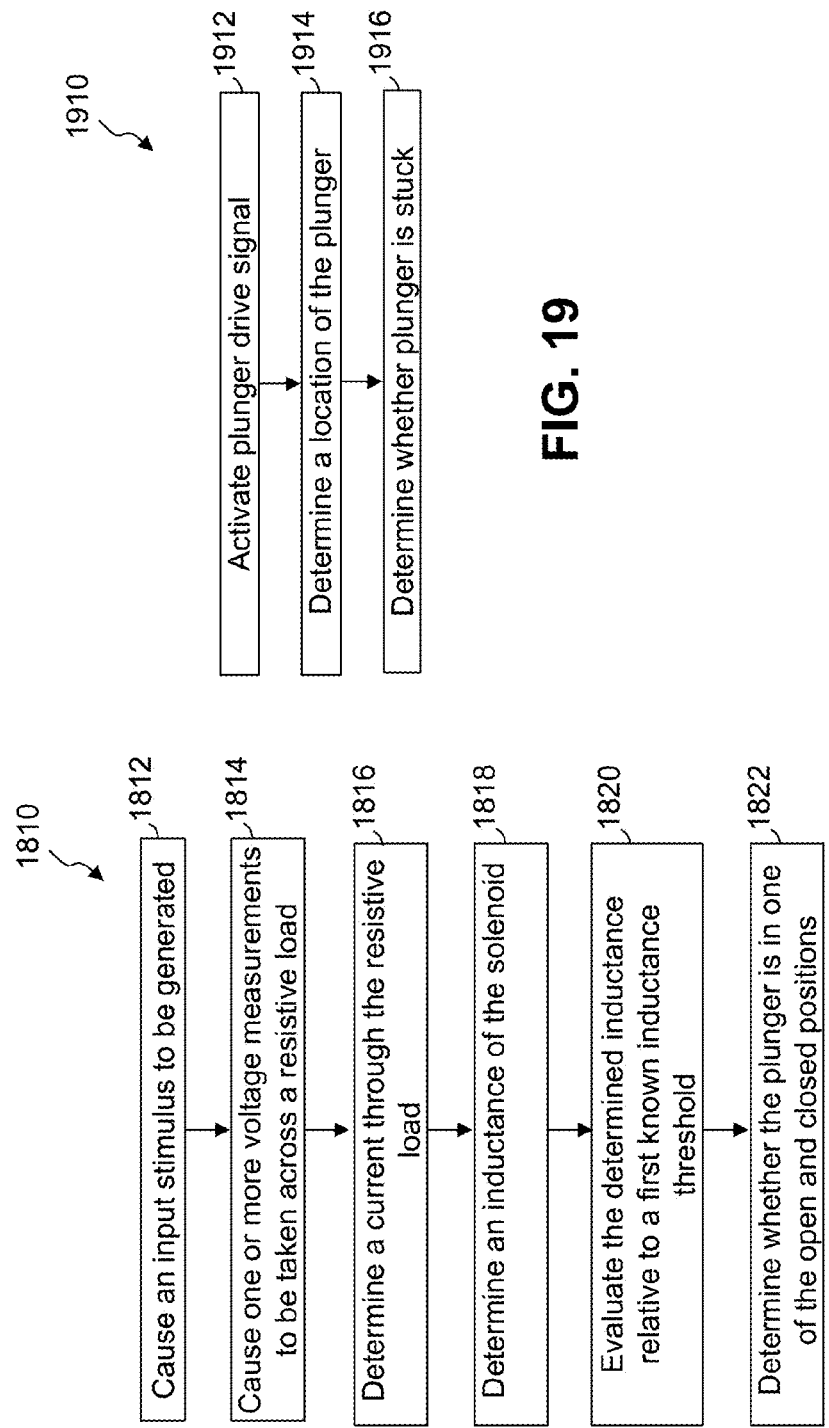
FIG. 18 shows a simplified flow diagram of an exemplary process, in accordance with some embodiments, of determining a location of a plunger relative to a solenoid based on an estimated inductance determined from a measured voltage.
FIG. 19 illustrates a simplified flow diagram of an exemplary process of confirming a location of the plunger and/or determining whether the plunger is stuck or otherwise malfunctioning, in accordance with some embodiments.

FIG. 18 shows a simplified flow diagram of an exemplary process 1810, in accordance with some embodiments, of determining a location of a plunger relative to a solenoid based on an estimated inductance determined from a measured voltage. In step 1812, an input stimulus is generated and applied to a first terminal of a solenoid (e.g., the controller 214 causes the input stimulus to be generated from the controller and/or activates a separate input stimulus source). Typically, the input stimulus is applied to the solenoid while the plunger drive signal is not being applied to the solenoid. Further, the input stimulus typically does not cause the plunger to change positions.

In step 1814, one or more voltage measurements are taken across a resistive load that is cooperated with the solenoid in response to the input stimulus. In some embodiments, the controller activates the switching circuitry, in response to the input stimulus being applied to the solenoid, to direct current passing through the inductor to the resistive load, and activates the sampling circuitry to take the one or more voltage measurements across the one or more resistors 1312 of the resistance circuitry 1212 while the current is directed to the resistive load. In some embodiments, the one or more voltage measurements are taken at a time proximate an end of the input stimulus (e.g., at approximately the falling edge of a pulse input stimulus), in other implementations some or all of the voltage measurements are taken while the input stimulus is applied to the solenoid, while in other implementations, some or all of the measurements are taken a delay period following the application of the input stimulus.

In step 1816, a current through the resistive load is determined as a function of the one or more voltage measurements. As described above, some embodiments calculate an estimated change in current over time as a function of the determined current through the resistive load and a known or determined pulse duration of the input stimulus. In step 1818, an estimated inductance of the solenoid is determined as a function of the determined current and a timing of the input stimulus. Again, for example, the duration of a pulse input stimulus may be known and used in calculating the estimated inductance of the solenoid 310 (e.g., the duration of at least a portion of an input stimulus (e.g., a half-cycle) can be used to calculate a change in current over time that in turn is used to estimate an inductance of the solenoid). In many embodiments, the estimated inductance is determined without measuring a current, and instead is calculated based on the measured voltage across the resistance circuitry 1212. Other embodiments, however, may additionally or alternatively take one or more current measurements and calculate an estimated inductance of the solenoid at least in part based on the measured current.

In step 1820, the determined inductance is evaluated. Typically, the determined inductances is evaluated relative to one or more inductance thresholds. In step 1822, it is determined whether the plunger is the open or closed positions as a function of a relationship between the determined inductance of the solenoid and the one or more inductance thresholds. For example, the determined inductance can be evaluated relative to a closed position inductance threshold and/or an open position inductance threshold. Based on the resulting relationship, it can be determined whether the plunger is in an open or closed position. Some embodiments are further configured to identify that the plunger is in an undetermined position as a result of both the relationship between the determined inductance of the solenoid and the first inductance threshold and the relationship between the determined inductance of the solenoid and the second inductance threshold. Similarly, some embodiments are configured to determine whether the plunger is removed from the solenoid (e.g., based on a third inductance threshold), and/or determine a location of the plunger between the open and closed positions (e.g., based on the relationship of the determined inductance to one or more thresholds and/or at table of expected inductance values). Still other embodiments utilize additional thresholds, tables and/or precision measurements in determining a location of the plunger when between the open and closed positions.

In other embodiments, multiple voltage measurements and/or multiple current measurements are taken at multiple times in response to the input stimulus being applied to the solenoid. A slope of the resulting measurements can be calculated and used to determine the position of the plunger.

Some embodiments are additionally configured to determine whether the plunger is stuck in a fixed position and/or not operating as intended. FIG. 19 illustrates a simplified flow diagram of an exemplary process 1910 of confirming a location of the plunger and/or determining whether the plunger is stuck or otherwise malfunctioning in accordance with some embodiments.

In step 1912, the plunger activation circuitry is triggered to inject a plunger drive signal intending to force the plunger 312 to a predefined position. For example, the plunger drive signal can be induced with the intent of force the plunger to be in the closed position. This induced plunger drive signal can be specifically generated to determine whether the plunger is operating effectively and/or is in a stuck condition, can be injected as part of implementing an irrigation schedule (e.g., an irrigation schedule instructs that irrigation is complete for a given area corresponding to a valve coupled with the plunger), can be injected as part of a system set-up or preset (e.g., flowing an installation of an irrigation valve 110, multiple irrigation valves, an ICM 108, an irrigation controller 112, establishing a communication with a central controller 102, and/or the installation or set-up of other relevant components of an irrigation system), can be part of an irrigation initialization (e.g., force valves to be in known states prior to initiating an irrigation schedule), or other such reasons.

In step 1914, a location of the plunger is determined. In determining the location, any one of the above described embodiments or other embodiments can be used to determine the location. For example, some embodiments inject an input stimulus, take one or move voltage measurements across the solenoid and evaluate those one or more voltage measurements to determine a location of the plunger (e.g., compare the one or more voltage measurements or a cooperation of the voltage measurements relative to one or more thresholds, evaluate an amplitude of a modulation of the input stimulus relative to one or more thresholds, determine whether a resonant response is generated and/or a degree of resonant response in response to the input stimulus, or other such evaluations or combinations of such evaluations). Other embodiments apply an input stimulus and take one or more voltage measurements of the voltage across a load resistance, calculate an estimated inductance of the solenoid from a voltage measurement (or one or more of the voltage measurements when multiple voltage measurements are taken), and compare the calculated inductance to one or more inductance thresholds to determine a location of the plunger.

In step 1916, it is determined based on the determined location of the plunger whether the plunger is stuck and/or operating correctly. In some embodiments, the plunger is identified as being stuck or experiencing a malfunction when the determined location of the plunger is not in the predetermined position or within a predetermine range of the position into which the plunger drive signal intended to force the plunger. Subsequent retesting of the plunger movement may be taken before an error is reported, other action is taken and/or action is recommended to be taken. In some embodiments, the controller 214 initiates the confirmation of the location of the plunger. This initiation may result in response to instructions from the central controller 102 or a satellite irrigation controller 112, may be part of an irrigation schedule, may be part of a predefined procedure, or the like. Upon determining the plunger is not responding accurately and/or is not moving to the predefined location, the controller 214 can, in some embodiments, repeat the process 1910 one or more times in attempts to confirm the erroneous location of the plunger, cause the plunger to dislodge from a stuck position, or the like.

The controller 214 can additionally or alternatively issue a notification, alter or warning (e.g., cause the illumination of a warning light, LED, etc. in the ICM 108, ICI 104, satellite irrigation controller 112, or the like; send a communication to the central controller 102, an irrigation controller 112, a portable device (e.g., wireless transceiver, smart phone, etc.); cause an alert or warning to be displayed on a user display panel of the ICM, satellite irrigation controller, ICI, central controller, or the like or combinations thereof; or other such actions or combinations of such actions). Other notifications can additionally or alternatively be issued. For example, the central irrigation controller 102 can send a communication (e.g., email, text message, facsimile, and/or other such communications), trigger a warning or alert (e.g., on a user interface of the central controller 102, an Internet accessed user interface to the central controller, through an application (commonly referred to as an APP) on a portable device (e.g., smart phone, tablet, etc.), or other such alter), and/or other such notifications. Further, the controller 214, satellite irrigation controller and/or the central controller 102 may take further action in response to the detection that the plunger is stuck or malfunctioning, such as repeatedly trying to force the plunger to a desired position (e.g., closed position), trigger another valve (e.g., a master valve), inhibit further implementation of an irrigation schedule, or other such action or combinations of such action.

As introduced above with respect to FIG. 2, some embodiments include boost circuitry 222. The boost circuitry 222 is configured to allow the ICM 108 or other valve control device to operate in low line conditions and still have enough energy to operate and control the positioning of the plunger (and when relevant, plunger position detection circuitry). In some embodiments, the boost circuitry 222 is configured to enhance voltage from the multi-wire path 106. Again, multiple ICMs 108 are typically coupled at various locations along the length of the multi-wire path 106 and derive operational power from, for example, an AC waveform received via the multi-wire path 106. Because of the potential lengths of the multi-wire paths, the amplitude of the AC waveform is often less further from the ICI 104 or other source of the AC waveform (e.g., at the end of the multi-wire path) than closer to the ICI 104. In some instances, the voltage on the multi-wire path at one or more ICMs is below a threshold and insufficient to ensure effective voltage to open or close corresponding solenoid controlled valves. The boost circuitry can optionally be included in an ICM (or other relevant device deriving power over a multi-wire path) and be activated in response to detecting that voltage on the multi-wire path is below a threshold to release additional locally stored up energy to effectively move the plunger to closed or open positions, and thus effectively closing and opening a corresponding irrigation valve 110.

Figure 20:
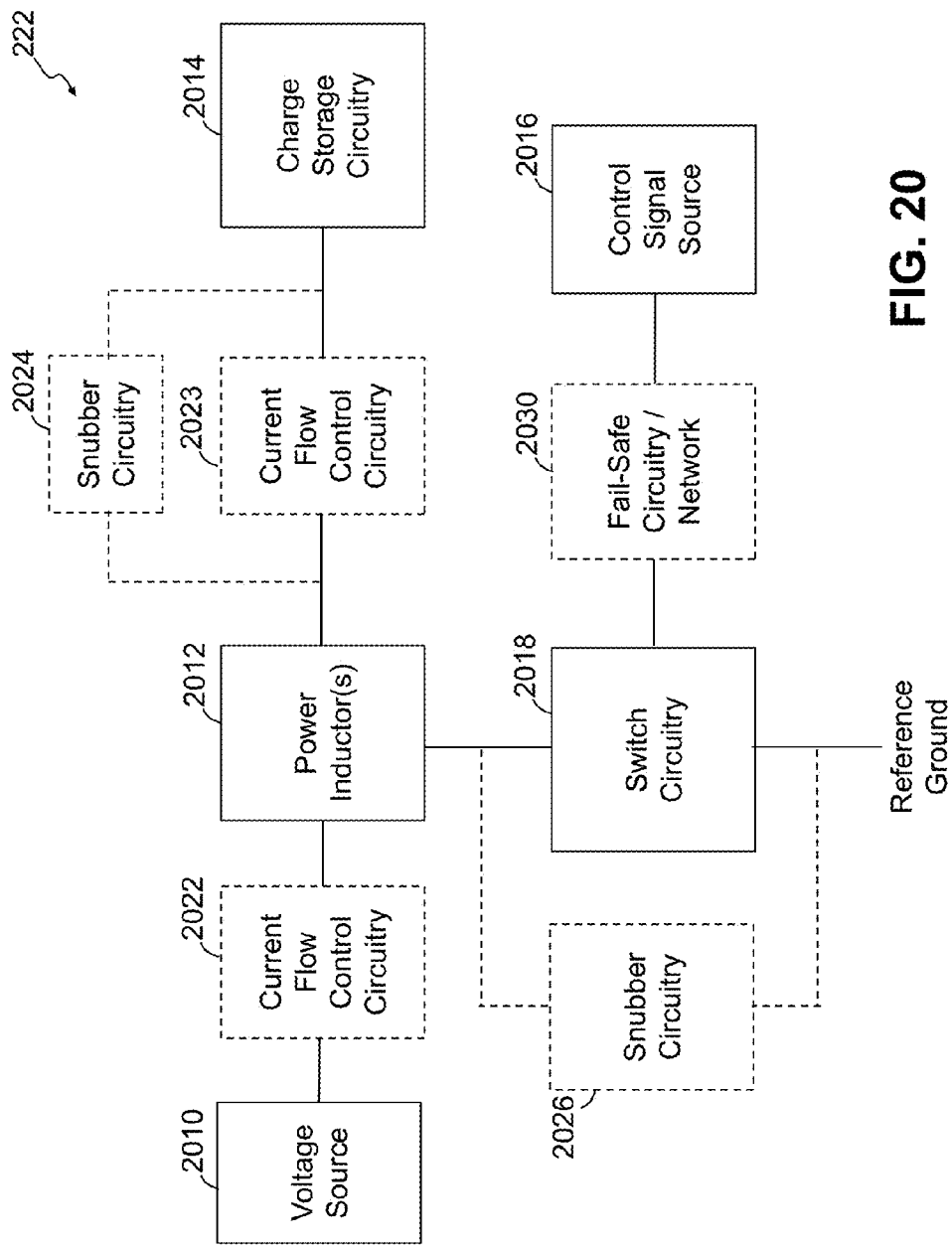
FIG. 20 illustrates a simplified block diagram of exemplary boost circuitry, in accordance with some embodiments.

FIG. 20 illustrates a simplified block diagram of exemplary boost circuitry 222 in accordance with some embodiment. The boost circuitry 222 includes a power or voltage source 2010, one or more boost or power inductors 2012, charge storage devices or circuitry 2014, a switch control signal source 2016 and switching circuitry 2018. Some embodiments optionally include current control circuitry 2022, 2023, one or more snubber circuitry 2024, 2026, safety or fail-safe circuitry 2030, and/or other such circuitry or combinations thereof.

The voltage source 2010 typically couples with and/or is the multi-wire path 106 with which the ICM 108 is coupled. In some embodiments, multiple terminals (e.g., terminals of the ICM) electrically couple with the multi-wire path. As such, the voltage source obtains power from the two wire path and is substantially the same as and/or is dependent on the voltage and/or power levels on the multi-wire path 106 at the location along the multi-wire path where the ICM is coupled. In some embodiments, the voltage source 2010 can be AC or DC, and can be supplied externally or internally to the boost circuitry 222. In an exemplary embodiment, the voltage source 2010 originates from the irrigation system (e.g. the ICM) that deploys the solenoid circuitry 220, which electrically is previous to the boost circuitry 222. In some embodiments, the voltage source comprises a rectifier that converts an input AC signal to DC.

The charge storage circuitry 2014 is configured to hold an electrical charge and to discharge at a later time to deliver a plunger drive signal. For example, the charge storage circuitry can include one or more capacitors, rechargeable batteries, super capacitors, or the like or combinations thereof. Further, the charge storage circuitry is configured to cyclically hold charge and then discharge repeatedly over larger numbers of cycles, and typically for a life of the ICM, without adversely affecting the performance of the charge storage circuitry 2014 over time. In some embodiment, the charge storage circuitry comprises a network of capacitors. Further, some embodiments include a valve-on charge storage circuitry and a valve-off charge storage circuitry.

In operation, the charge storage circuitry 2014 stores voltage received from the voltage source 2010. Accordingly, the charge storage circuitry stores a voltage that is at least initially dependent on the voltage of the multi-wire path. Again, the plunger drive signal generated within the ICM has a threshold voltage in order to achieve a sufficient magnetic field and/or magnetic forces induced through the solenoid to effectively move the plunger between the open and closed positions. In some embodiments, the controller 214 provides boost or power control circuitry (or, in some implementations, a separate boost control circuitry (not shown) is included), and is configured to monitor the voltage on the multi-wire path 106. In some embodiments, this voltage level is monitored by monitoring the voltage stored on the charge storage circuitry 2014. In other embodiments, the charge storage circuitry 2014 comprises voltage monitoring circuitry that monitors a voltage stored in the charge storage circuitry and can report the results to the controller 214.

In those instances where the controller 214 determines that the voltage on the multi-wire path is below a first plunger drive signal threshold, the controller 214 activates the switch control signal source 2016 that delivers a switch control signal to the switching circuitry 2018. In some embodiments, the switch control signal is an alternating signal that sequentially and repeatedly activates and deactivates or otherwise triggers the switching circuitry 2018. For example, in some implementations, the switch control signal has a known duty cycle, frequency, pulse width and/or other such known characteristics to achieve the desired alternating activation and deactivation, as well as maintaining the switch in the desired active state or deactivated state for desired periods of time to achieve desired changes in current flow through the one or more power inductors 2012. Some embodiments utilize a pulse width modulated (PWM) signal that is used to control the switching circuitry.

In response to the switch control signal, the switching circuitry 2018 repeatedly turns on and turns off alternately inducing and halting a current through the one or more power inductors 2012. The one or more power inductors 2012 are cooperated with the switching circuitry 2018 and store energy in the induced magnetic field in response to the transition of the switching circuitry between on (current conducting) and off states. When the switching circuitry transitions to an off state stopping the current flow, the stored energy in the one or more power inductors is released to energize and/or charge the charge storage circuitry 2014. In response to the changing current as a function of time (di/dt) through the one or more power inductors 2012, a boost voltage is temporarily established across the one or more power inductors (V=di/dt*L) that is greater than the voltage delivered by the voltage source 2010. This temporary boost voltage is stored in the charge storage circuitry 2014 in additional to the voltage already stored as a result of the voltage on the multi-wire path. For example, the control circuitry can be configured to generate a PWM signal that is applied to the switching circuitry to implement sequential triggering of the switching circuitry in response to the PWM signal to induce the change in current over time through the one or more power inductors, which in some implementations corresponds to a frequency of the PWM signal.

As described above, the switch control signal turns on and off the switching circuitry activating and deactivating the switching circuitry inducing the boost voltage. The switch control signal from the switch control signal source 2016 provides the switching control signal causing the transition of the switching circuitry between on (i.e., current conducting) and off (i.e., non-conducting), which consequently modulates the storing and releasing of energy through the one or more power inductors 2012. When the one or more power inductors release energy, the equivalent electronic circuit that is formed comprises two sources in series (i.e., the voltage source 2010 and the voltage potential across the one or more power inductors). The increased energy from the one or more power inductors results in an increase in the voltage level (the incremental boost voltage) at the charge storage circuitry 2014 that is higher than the voltage source 2010 boosting the voltage level of the voltage source.

The charge storage circuitry 2014 is charged from voltage source 2010 and the boost voltage to increase the voltage stored on the charge storage circuitry. When the voltage across the charge storage circuitry reaches a threshold level, for example, the first plunger drive signal threshold, the controller 214 can deactivate the control signal source 2016 stopping the switch control signal from activating and deactivating the switching circuitry 2018. Accordingly, the boost circuitry 222 is configured to increase a voltage stored on the charge storage circuitry 2014 above a predefined threshold allowing the ICM to boost the locally stored voltage to allow effective opening and/or closing of a corresponding irrigation valve even when the voltage on the multi-wire path 106 is below a threshold voltage level sufficient to close and/or open the valve.

As introduced above, some embodiments optionally include one or more current control circuitry 2022, 2023. A first or source current control circuitry 2022 can be incorporated into the boost circuitry 222 coupled between the voltage source 2010 and the one or more power inductors 2012, and be configured to conduct from the voltage source 2010 toward the one or more power inductors 2012 while inhibiting or preventing current from being conducted in the opposite direction (i.e. from the one or more power inductor toward the voltage source). In some embodiments, the source current control circuitry 2022 acts as a protection mechanism that allows the one or more power inductors 2012 to energize the charge storage circuitry 2014 while not energizing an output impedance network that may be associated with the voltage source 2010.

Some embodiments may optionally include a second or output current control circuitry 2023 coupled between the one or more power inductors 2012 and the charge storage circuitry 2014. Similar to the source current control circuitry 2022, the output current control circuitry 2023 can be configured to conduct from the one or more power inductors 2012 toward the charge storage circuitry 2014, but does not conduct in the opposite direction (i.e., from the charge storage circuitry toward to the one or more power inductors). Again the output current control circuitry 2023 can operate as a protection mechanism that does not allow the charge storage circuitry to naturally discharge through an undesired electrical path, particularly through the one or more power indictors and the switching circuitry 2018 when the switching circuitry is activated (e.g., "on").

Further, some embodiments include an optional fail-safe circuitry 2030 that provide protection of the one or more power inductors 2012, charge storage circuitry and/or the voltage source 2010 from a potential short circuit condition by establishing an off condition. In some implementation, the fail-safe circuitry limits or prevents the charge storage circuitry 2014 once charged from inadvertently discharging as a result of a failure, for example, of the switch control signal source 2016. In some implementations, should the switch control signal source 2016 failed, for instance, in a mode that forces the switching circuitry 2018 to an "on" state, the voltage source 2010 could potentially be constantly connected to a reference ground, resulting in a "short circuit" condition. The short circuit condition may allow high current to be conducted through the one or more power inductors, which could result in a permanent failure of the one or more power inductors and/or the voltage source 2010. The fail-safe circuitry 2030, however, ensures an "off" state of the switching circuitry 2018 to prevent the short circuit condition.

Still further, some embodiments include emission protection circuitry that limit or reduce electromagnetic interference (EMI). For example, some embodiments optionally include emission protection circuitry comprising one or more snubber circuitry 2024, 2026. The snubber circuitry can be configured to reduce noise in the switching and/or can modify the frequency response of the boost circuitry 222 in order to manage. Some embodiments additionally or alternatively limit and/or eliminate electromagnetic interference (EMI) that may result, for example, from undesired oscillations produced by the operation of the boost circuitry.

Figure 21:
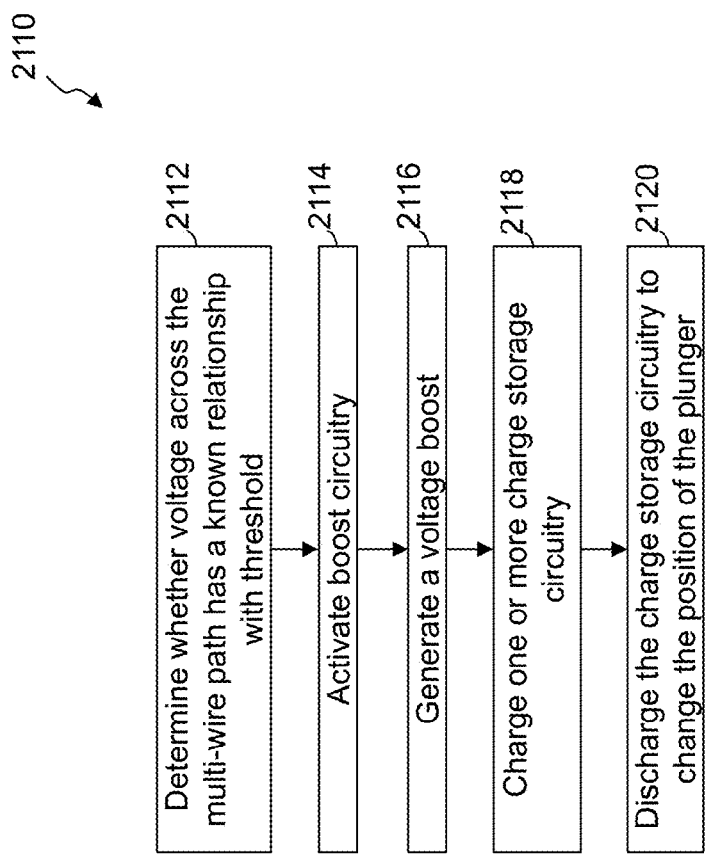
FIG. 21 shows a simplified flow diagram of an exemplary process, in accordance with some embodiments, of boosting the voltage from the multi-wire path.

FIG. 21 shows a simplified flow diagram of an exemplary process 2110, in accordance with some embodiments, of boosting the voltage from the multi-wire path in controlling the movement of the plunger between the open and closed positions, thus, controlling the opening and closing of the irrigation valve. In step 2112, it is determined at the ICM 108, or other such an irrigation valve control circuitry, whether a voltage on a multi-wire path has a known relationship with a boost threshold. For example, it can be determined whether the voltage is less than a boost threshold. Again, this determination may be determined by the controller 214 of the ICM, a separate boost circuitry controller or other such controller. In some embodiments, this voltage on the multi-wire path is determined based on a voltage measured and/or monitored at the one or more charge storage circuitry 2014. Again, the ICM obtains power from the multi-wire path and uses that power in part to move the plunger 312 to open and close the corresponding irrigation valve.

In step 2114, the boost circuitry is activated in response to determining that the voltage on the multi-wire path is less than the boost threshold. In step 2116, a boost voltage is generated, through the boost circuitry, to increase the voltage stored by the one or more charge storage circuitry 2014 to be greater than the voltage on the multi-wire path. In some embodiments the switch control signal alternately induces and halts current flow through the one or more power inductors 2012, which in turn generates the incremental boost voltage that is accumulated on the charge storage circuitry 2014.

In step 2118, the one or more charge storage circuitry 2014 are charged, through the boost voltage, to a desire voltage that is greater than the voltage on the multi-wire path in response to the boost voltage. Accordingly, in some embodiments where the charge storage circuitry are charged, steps 2116 and 2118 may be part of a loop to repeatedly generate the boost voltage that is accumulated over time on the charge storage circuitry. Typically, the charge storage circuitry is charged to at least the boost threshold. Further, in some embodiments, the boost threshold is sufficient to at least ensure that the plunger can be moved to a closed position to close the corresponding valve and prevent further water distribution through the valve. Some embodiments consider more than one threshold. For example, there may be a closing boost threshold corresponding to a voltage to move the plunger to a closed position, and an open boost threshold corresponding to a voltage to move the plunger to an open position. In some instances, the opening and closing boost thresholds may be different levels.

In step 2120, at least one of the one or more charge storage circuitry 2014 is discharged to provide the plunger drive signal that drives a current through the solenoid in controlling movement of the plunger to cause the plunger to be in a desired position (e.g., change positions from the open to the closed position, or vice versa). Again, in some embodiments, the controller further dictates whether the plunger is being moved to the open or closed position by controlling a direction of current flow through the solenoid (e.g., through the power control and switching circuitry 216). The plunger is cooperated with and/or coupled with a portion of an irrigation valve, where typically water is allowed to pass through the valve when the plunger is in an open position and water is prevented from passing the valve when the plunger is in a closed position.

In some embodiments, one or more irrigation schedules provide control over irrigation and/or can be interpreted as an orchestration on when, for how long, for how many cycles, etc., one or more valves (e.g., a particular rotor's valve) will be turned on or off such that water is delivered to a certain area, and typically attempts to control irrigation without exceeding the entire irrigation system capacity to properly supply water (e.g., at a certain specified pressure and flow rate). Further, in some implementations, during such control, commands may be sent to the one or more ICMs 108, 116 to actuate corresponding plungers (to turn on or off the corresponding one or more valves associated with the ICM). Typically, these command (e.g., on or off) that are executed causes the charge storage circuitry 2014 to issue the plunger drive signal (e.g., capacitors discharge such that current flows though the solenoid). In some embodiments, before the execution of an irrigation command, the controller 214 checks to determine whether the voltage on the multi-wire path 106 and/or stored on the one more charge storage circuitry 2014 meets one or more certain levels (e.g., a plunger ON threshold) that is adequate for a reliable execution of the irrigation command.

In some implementations, the boost circuitry 222 is configured to operate when a voltage threshold is not met or until the one or more charge storage circuitry 2014 are charged to or above the voltage threshold. The controller 214, in some instances, can periodically (e.g., multiple times per minute, multiple times per second (e.g., 10 times per second), or other such interval) measure the voltage of at the charge storage circuitry 2014 and/or the multi-wire path, determine the voltage threshold is met, and if not turn on activate the boost circuitry 222 until the threshold is met. Further, in many implementations, even when irrigation commands are not being executed, the charge storage circuitry may discharge slowly due to the current draw of the power distribution 212 and/or other circuitry connected to it. Similarly, in the case where the voltage level on the multi-wire path 210 is high enough to not require boosting, in some embodiments the voltage level on the charge storage circuitry is adequately maintained because the charge storage circuitry continue to charge as voltage is drained of by other circuit connected to it.

Additionally, in some embodiments, the boost circuitry 222 may be configured to automatically activate to recharge the charge storage circuitry in response a drop in the voltage level of charge storage circuitry below the threshold in response to the charge storage circuitry discharging to deliver the plunger drive signal in response to an irrigation command. This automatic activation in response to discharge may be limited to when the voltage on the multi-wire path 210 is below the threshold, or may be configured to activate regardless of the voltage on the multi-wire path. Typically, the rate of discharge through the power distribution circuitry 212 and/or other circuitry connected to it is slow relative to how fast the boost circuitry is capable of boosting the voltage stored on the charge storage circuitry back to a level at or above the threshold. In some embodiments, the controller 214 may further be programmed and/or otherwise configured to detect an irrigation command is to be executed and activate the boost circuitry in response to the irrigation command activation. Additionally or alternatively, the controller 214 can be programmed and/or configured such that when an irrigation command is executed the controller can discriminate between the voltage drop in response to implementing the irrigation command and other occurrences when the voltage drops below a boost threshold.

Figure 22:
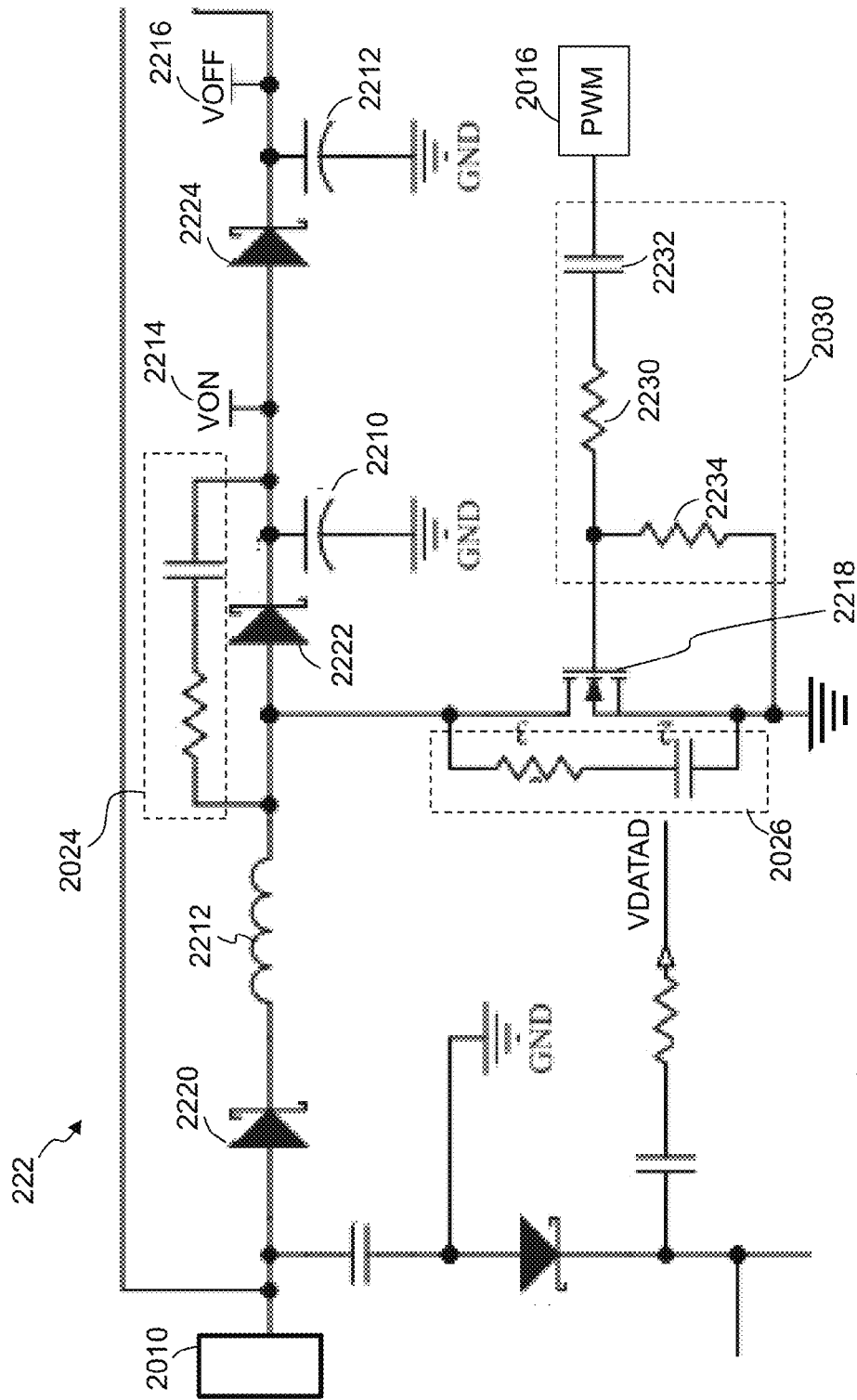
FIG. 22 depicts a simplified circuit diagram of exemplary boost circuitry, in accordance with some embodiments.

FIG. 22 depicts a simplified circuit diagram of exemplary boost circuitry 222 in accordance with some embodiments. The boost circuitry 222, in this embodiment, includes the voltage source 2010 coupled with one or more boost or power inductors 2012 that couple with a first charge storage circuitry 2210 and a second charge storage circuitry 2212. In some embodiments, the first charge storage circuitry 2210 includes one or more capacitors and the second charge storage circuitry 2212 includes one or more capacitors. Typically, the boost circuitry is configured to charge both the first charge storage circuitry and the second charge storage circuitry increasing the stored voltage. In operation, at least one and typically both the first and second charge storage circuitry 2210, 2212 are discharged (e.g., through the H-bridge switching circuitry 712, 714) to generate the plunger drive signal configured to move the plunger to a desired position (e.g., open or closed position). In some embodiments, the controller 214 tracks one or both VON 2214 and VOFF 2216 in determining whether to activate the boost circuitry 222 to further charge the first and/or second charge storage circuitry.

The switching circuitry 2018 is coupled between the one or more power inductors 2012 and the first and second charge storage circuitry. In this embodiment, the switching circuitry comprises a transistor (e.g., MOSFET transistor, insulated-gate bipolar transistor (IGBT), etc.) with the switch control signal coupled with the gate of the transistor. The switch control signal activates and deactivates the transistor to include the current flow through the one or more power inductors 2012 and through the transistor resulting in repeated generation of the boost voltage that is stored in one or both of the first and second charge storage circuitry 2210, 2212.

The one or more power inductors 2012 are coupled with the switching circuitry 2018 and are configured to store energy through induced magnetic fields when the transistor is switched "on" causing current change through the one or more power inductors 2012 (e.g., through the switching circuitry 2018 to a reference ground). When the transistor is switched "off" the stored energy in the one or more power inductors 2012 is released charging the first and second charge storage circuitry 2210, 2212. It is noted that more than one reference ground may be implemented simultaneously within the boost circuitry 222 (and/or within the ICM 108 or circuitry within the ICM), for example, to in part provide some isolation for portions of the boost circuitry 222 (and/or other circuitry when relevant).

As introduced above, in some embodiments, the switch control signal can include a PWM signal supplied by the switch control signal source 2016. Further, in some embodiments, the switch control signal source 2016 is controlled by and/or implemented as part of the controller 214 (e.g., a microcontroller of the ICM through which the controller 214 is implemented). The switch control source can be configured to supplies a voltage waveform that oscillates at a fixed frequency with a fix duty-cycle (e.g., a square wave, sine wave, etc.). For example, the switch control signal can be a PWM signal with a 1-50% duty cycle. In some embodiments, the duty cycle is dependent on a frequency of the switch control signal. Further, in some implementation, however, the switch control signal has a variable frequency and/or duty cycle.

Further, the controller is configured to automatically activate the switch control signal source 2016 and/or generate the switch control signal in response to notification and/or determining that the voltage on the multi-wire path 106 and/or the charge stored on one or both of the first and/or second charge storage circuitry 2210, 2212 are below one or more voltage level thresholds (e.g., plunger movement threshold). In some embodiments, the switch control signal is generated (e.g., as a PWM signal) and is not monitored or adjusted, but merely applied to induce the generation of the boost voltage and is not varied relative to characteristics of an input.

Some embodiments optionally include a first or source current control circuitry 2022 comprising a source diode 2220. The source diode 2220 is forward biased such that it conducts current from the voltage source 2010 towards the one or more power inductors 2012, while inhibiting current from being conducted in the opposite direction (i.e. from the power inductor to the voltage source or other portion of the circuitry). Accordingly, the source diode 2220 prevents the boost voltage from being drawn away from the one or more charge storage circuitry.

Further, the embodiment depicted in FIG. 22 optionally includes a second or output current control circuitry 2023 that includes a first charge storage diode 2222 and/or a second charge storage diode 2224. Similar to the source diode, the first and second charge storage diodes 2222, 2224 are forward-biased such that they conduct current from the one or more power inductors towards the first and/or second charge storage circuitry 2210, 2212, while inhibiting current from being conducted in the opposite direction (i.e., from the charge storage circuitry to the one or more power inductors and/or the switching circuitry). Further, the first and/or second charge storage diodes 2222, 2224 are used as protection mechanisms that inhibit the charge storage circuitry from discharging through the electrical path that is otherwise imposed by the one or more power indictors and/or the switching circuitry 2018 (e.g., when the transistor is switched "on" to conduct current).

Switching noise may result in response to the repeated switching, and in some implementations the rapidly repeated switching of the switching circuitry 2018. Further, this switching noise may cause unwanted EMI bursts. As described above, some embodiments optionally include one or more snubber or other such protection circuitry 2024, 2026. For example, a first snubber circuitry 2024 can be included in the boost circuitry 222 coupled across the first charge storage circuitry 2210. Some embodiments may additionally or alternatively optionally include a second snubbing circuitry 2026 coupled across the switching circuitry 2018. In some embodiments, one or both of the snubber circuitry 2024, 2026 can comprise resistor and capacitor connected in series. Again, the snubber circuitry, in some embodiments, is configured to at least in part modify the frequency response of the boost circuitry 222 in order to manage or eliminate electromagnetic interference (EMI) that may result from undesired oscillations produced by the operation of the boost circuitry.

Some embodiments further include an enhanced resistance 2230. At least in part, the enhanced resistance is configured to aid in controlling a speed of the switching circuitry 2018. In some embodiments, the enhanced resistance has a resistance value of about 5Ω, while in other embodiments the resistance may be 20 KΩ or more. This enhanced resistance can, in some embodiments, also help in controlling and/or limiting EMI bursts.

As described above, some embodiments optionally include the fail-safe circuitry 2030. In part, the fail-safe circuitry 2030 helps to control or assure that once the charge storage circuitry is charged it does not discharge as a result of a failure on the switch control signal source 2016. In some embodiments, the switch control signal source 2016 generates the switch control signal oscillates periodically such that the switch (e.g., MOSFET transistor) is modulated and periodically switching between "on" and "off" states. If the switch control source fails, for instance, as a failure mode constantly drives the switching circuitry such that the switching circuitry is constantly operated as an electronic "on" switch, the voltage source 2010 may be constantly connected to the reference ground, which in turn will result in a short circuit condition. The short circuit condition may allow high current to be conducted through the one or more power inductors 2012, which may result in permanent failure of the one or more power inductors and/or the voltage source 2010. In some embodiments, the fail-safe circuitry comprises a fail-safe capacitance 2232 and parallel coupled resistance 2234.

FIG. 23 shows a graphical representation of a switch control signal 2310 applied to the switching circuitry 2018 of the boost circuitry, in accordance with some embodiments. FIG. 24 illustrates a graphical representation of a change in current 2410 as a function of time through the one or more power inductors 2012 in response to the activation of the switching circuitry induced by the switch control signal 2310, in accordance with some embodiments. After a pulse from the switch control signal triggers the switching circuitry (e.g., turn off), in some embodiments, the current through the one or more power inductors decays. The voltage on an output side of the one or more power inductors rises to a level in excess of the voltage on the multi-wire path and/or VON 2214. For example, in some implementations when the current control circuitry 2023 comprises a diode 2222, the voltage at the output side of the one or more power inductors is raised to at least VON+$V_{D2222}$. Again, this boost voltage charges the one or more charge storage circuitry 2014 (e.g., first charge storage circuitry 2210 and a second charge storage circuitry 2212).

In some embodiments, a boost rate (V/s) can be determined by the pulse width of the switch control signal, a frequency of the switch control signal, the line voltage of the multi-wire path and/or the voltage of the power source 2010, and an efficiency of the boost circuitry. As an example, a switch control signal can be applied from the controller where each pulse of the signal provides 50 nC (as defined by Amps=Coulombs/sec.), when the signal has an average of 5 mA/pulse*10 us yielding the 50 nC. With the charge storage circuitry 2014 comprising capacitors, Farads are defined as Coulombs/volt. To increase a voltage across a 440 ufds capacitance, 440 uC is generated. Applying the exemplary switch control signal defined by a 50 nC/pulse*10K pulses per second yields 500 uC/s. Translating to voltage (500 uC/s*1V/440 uC) yields a boost rate of approximately 1.1V/S. Actual boost rates may deviate from this example, due for example to efficiency losses. It is further noted that the voltage from the voltage source 2010 may also affect an average boost current and thus the resulting boost rate.

Again, some embodiments limit the switching speed or transition rate 2312, 2314 of the switching circuitry, which can limit or prevent oscillation during switching (e.g., via the one or more power inductors 2012, the switching circuitry 2018, and in some instances diode capacitance) and/or reduce EMI emissions. Further, in some embodiments, with the switching circuitry 2018 comprising a transistor, a gate of the transistor is capacitively coupled through a fail-safe capacitance 2232 with the controller 214 (e.g., microprocessor) to provide protection control in an off state. Furthermore, some embodiments reduce the speed of the switching circuitry 2018 at least in part with the insertion of the enhanced resistance 2230 coupled with the gate. Some implementations take advantage of inherent gate capacitance of a transistor and create an RC circuit that can in part control and/or result in a reduced and/or relatively slow rise time of a gate voltage. In some instances, the relatively slow switching speed can result in losses in efficiency. These losses in efficiency, however, are often acceptable because of the control and/or elimination of EMI. Some efficiency can be gained with the inclusion of the one or more snubber circuitry 2024, 2026 allowing a speed up of the switching speed.

The boost circuitry 222 depicted in FIG. 22 utilizes the one or more power inductors 2012 in cooperation with the switching circuitry 2018 to generate the boost voltage that charges the one or more charge storage circuitry 2014. Other boost circuitry is alternatively or additionally utilized in other embodiments. For example, some embodiments utilize a transformer connected to the line side that is configured to step up the voltage for charge storage circuitry. A full bridge switch mode power supply (SMPS) may be used where a step up DC/DC converter is configured as an isolated circuit providing high frequency transformer coupling where a secondary provides a higher voltage than the primary. Other embodiments may include a charge pump, for example, comprising one or more capacitors connected in parallel with an input capacitor, which are then switched out to a series configuration to provide twice the voltage. This switching from parallel to series can be repeated a number of times transferring charge from the input to the charge storage circuitry and/or directly to the plunger activation circuitry or as part of the plunger activation circuitry. Other circuitry and/or methods may be utilized to boost the voltage received from the multi-wire path.

Referring back to FIG. 2, some embodiments include temperature sensing circuitry 224. The temperature sensing circuitry is configured to provide information corresponding to measured temperature. This temperature information can be used by the controller 214 in compensating for variations in other measured parameters that may be affected by a current temperature. For example, the voltage across the solenoid 310 and/or the current flowing through the solenoid can vary depending on a current temperature and/or vary as a function of temperature.

In some implementations there can be contributing factors that cause differences in a response to the input stimulus as temperature varies. For example, the winding of the solenoid typically are dependent on a resistance temperature coefficient and/or a permeability temperature coefficient. These factors, as well as device to device variations, can cause sufficient variations in operation that some embodiments factor these potential variations into one or more measurement algorithms and/or thresholds in attempts to limit and/or prevent false position readings.

Accordingly, the controller 214 utilizes the temperature information, in some embodiments, to compensate for these variations. For example, in some implementations, the temperature sensing circuitry is configured to provide an indication of a current temperature of an environment in which the solenoid is positioned. The controller utilizes this temperature information in evaluating the one or more voltage measurements relative to the first threshold. Further, the controller can adjust one or more thresholds (or utilize alternative thresholds) that are used to determine a location of the plunger 312. In some implementations the controller is configured to adapt the evaluation of the one or more voltage measurements relative to one or more threshold and/or modify the one or more thresholds as a function of the indication of the current temperature. Similarly, a threshold of a voltage received from the multi-wire path and/or a threshold of the voltage stored in the charge storage circuitry 2014 may be adjusted (or an alternative threshold used) to ensure that the plunger activation circuitry, power control and switching circuitry 216, charge storage circuitry 2014, and the like can deliver a plunger drive signal that is sufficient to induce the desired movement of the plunger 312 relative to the solenoid to move the plunger to the intended open or closed position.

Figure 25:
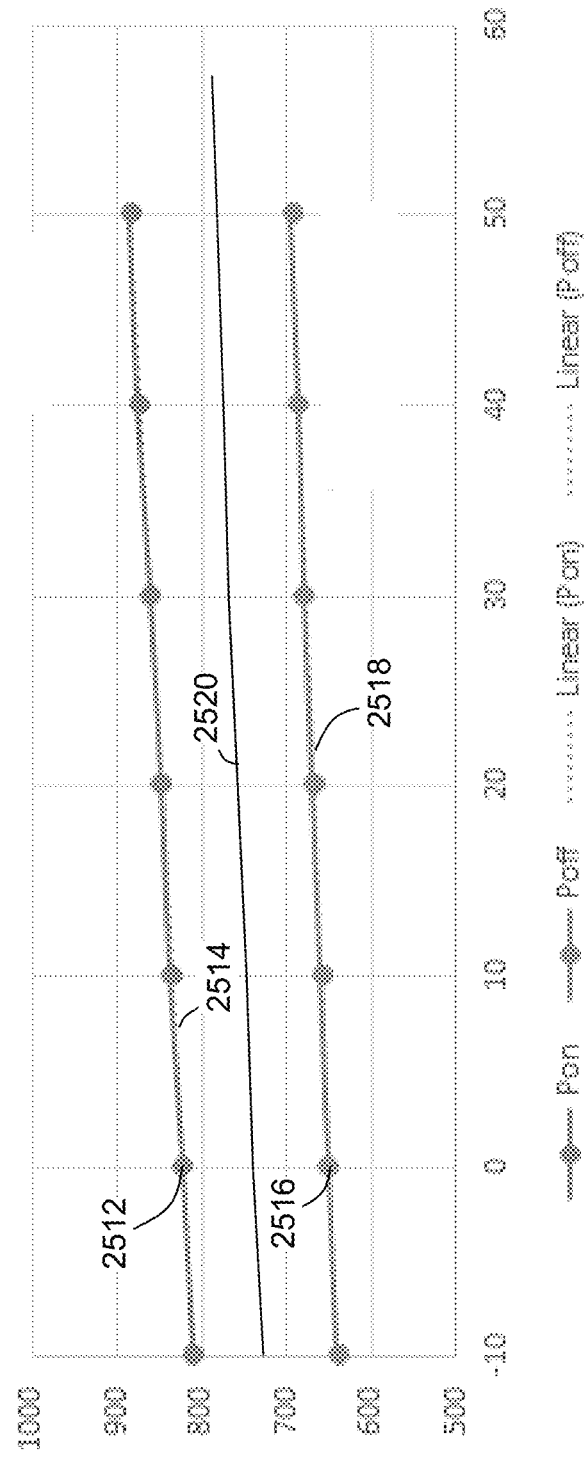
FIG. 25 shows exemplary graphical representations of voltage measurements across the solenoid (vertical axis in A/D converter counts) relative to temperature (horizontal axis in Celsius), in accordance with some embodiments.

FIG. 25 shows exemplary graphical representations of measurements (vertical axis) relative to temperature (horizontal axis in Celsius), in accordance with some embodiments. In some embodiments, the representation of the measurements are a decimal numeric system (sometimes referred to as "counts") of what an A/D converter 416 (e.g., inside the controller 214) outputs when voltage is measured across the solenoid in response to, and in some instances during, the execution of an input stimulus (e.g., a pulse). Further, in some implementations the temperature sensing circuitry 224 provides temperature information, which in some implementation is measured inside the ICM 108, 116.

A first plot 2512 (solid) is an interpolation utilizing measured data, and a second plot 2514 (dash-line) is the result of a linear curve fitting, showing the plunger detection circuit response over temperature when the plunger is in the open position (i.e., ON with the valve open). A third plot 2516 (solid) is an interpolation utilizing measured data, and a fourth plot 2518 (dash-line) is the result of a linear curve fitting, showing plunger detection circuitry response over temperature when the plunger is in the closed position (i.e., OFF with the valve closed). In some embodiments, the linear representation of the curves are determined using the formula: $y=m*x+b$, where y corresponds to the measurement counts, m is a slope (calculated from empirical results, and sometimes referred to as a calibration constant), x corresponds to the sensed temperature information, and b is a y-intercept (where the plots cross the vertical axis). In some implementations the m, the slope, is referred to as a temperature coefficient (e.g., when the slope is zero there is typically no variation or dependence in temperature).

Further, FIG. 25 also shows an exemplary threshold 2520, in accordance with some embodiments, between the two plots 2512, 2516, where a measured voltage above the threshold relative to the temperature may be identified as the plunger being in the open or ON position, while a measured voltage below the threshold relative to the temperature maybe identified as the plunger being in the closed or OFF position. Some embodiments include more than one threshold allowing the system to identify with more precision the location of the plunger, such as whether the plunger is in a 70% open position, 90% open position, 90% closed position, etc. Accordingly, some embodiments compensate for temperature variations in accurately identifying a location of the plunger relative to the solenoid.

In some embodiments, the temperature sensing circuitry 224 may be incorporated into a housing 320 of an ICM 108, while in other embodiments some or all of the temperature sensing circuitry may be implemented outside the ICM. The temperature sensing circuitry comprises a temperature sensor that is configured to sense the temperature of an environment in which the plunger position detection circuitry 218 is operated. Accordingly, in some instances, it is beneficial that the temperature sensor be positioned proximate the PPDC 218 and/or the solenoid 310. It is noted that in some instances, some or all of the plunger detection circuitry, the solenoid and/or some or all of an interior of an ICM may be protected from environmental conditions through an encasement within a resin, epoxy or other such potting material. Accordingly, some embodiments ensure that the temperature sensor is positioned within the potting material and/or within the environment in which the solenoid is positioned so that the temperature sensed is consistent with a temperature of the relevant components of the ICM.

As described above, some embodiments identify a location of the plunger based on one or more thresholds. For example, in some implementations, a plunger is identified as being in the open position when parameters (e.g., one or more voltage measurements, current measurements, calculated inductance, etc.) has a first predefined relationship with the threshold (e.g., less than a threshold), and identified as being in the closed position when the predefined relationship does not exist. Other embodiments consider one or more additional thresholds and/or ranges.

Some embodiments are configured to determine a relative location of the plunger along the range of motion of the plunger. Further, the location can, in some embodiments, be determined as a proportional location of the plunger relative to one of the open and closed positions and a range of motion of the plunger. For example, in some implementations, the controller can receive and/or calculate theoretical voltage for a fully on position and a fully off position. Based on the measured voltage and/or cooperated voltage obtained from multiple voltage measurements, a proportional location can be determined or a quality of "on" and "off". In some implementations, measurements corresponding to the fully "on" and the fully "off" positions can be designated 100% and 0%, respectively, with measurements between corresponding to proportionally open or closed. Measurements and/or calculated parameters between the 100% and 0% can be evaluated to determine one of a level of how open and a level of how closed, wherein the level of how open and the level of how closed are defined by an estimated proportional position of the plunger relative to a range of motion of the plunger and at least one of a fully open position at a first limit of the range of motion and a fully closed position at a second limit of the range of motion.

Some embodiments use one or more temperature measurements and/or one or more calibration constants, where the calibration constant is the slope 'm' in the linear representation $y=m*x+b$. Some embodiments further define an $m_{on}$ and an $m_{off}$. A proportional location and/or a quality of the position can be determined based on these calibration constants. Some embodiments further normalize the calibration constants to +100 for the "on" position, and −100 for the "off" position.

For example, one or more measurements are taken in response to one or more input stimulus signals. The temperature sensing circuitry 224 can provide the controller 214 with temperature information. The controller is configured to calculate a theoretical $P_{ON}$ value, where the $P_{ON}$ value is a digital representation of one or more voltage measurements taking by a sampling circuitry (e.g., A/D converter counts) corresponding to the plunger being in the open or "on" position. In some implementations, $P_{ON}=m_{ON}T+b_{ON}$, based on the application of $y=m*x+b$ for the ON curve 2514 (e.g., see FIG. 25). Similarly, a theoretical $P_{OFF}$ value is calculated, where $P_{OFF}=m_{OFF}T+b_{OFF}$, which is again based on the application of $y=m*x+b$. Some embodiments calculate a normalization scaling (N) defined by $N=200/(P_{ON}-P_{OFF})$. Further, some embodiments determine or calculate a theoretical midpoint, $Midpt=(P_{ON}-P_{OFF})/2$. Based on the normalization scaling (N) and the midpoint (Midpt), some embodiments calculate a normalized measurement $Ping_{norm}=(Ping-Midpt)*N$, where in some instances, the controller causes $Ping_{norm}$ to be sent. So, a result detected identifies detected based on an input stimulus that is +100, the controller the plunger is in open or on position (i.e., fully on), while if results are determined to be +80 the plunger is identified as being in in the 80% open position (i.e., 80 on). Alternatively, when results are determined to be −100, the plunger is recognized as being in the fully closed or off position. Some embodiments simply identify the plunger as in the open position, closed position or undetermined (e.g., above 50%=ON, below 50%=OFF, at 50%=undetermined).

Figure 26:
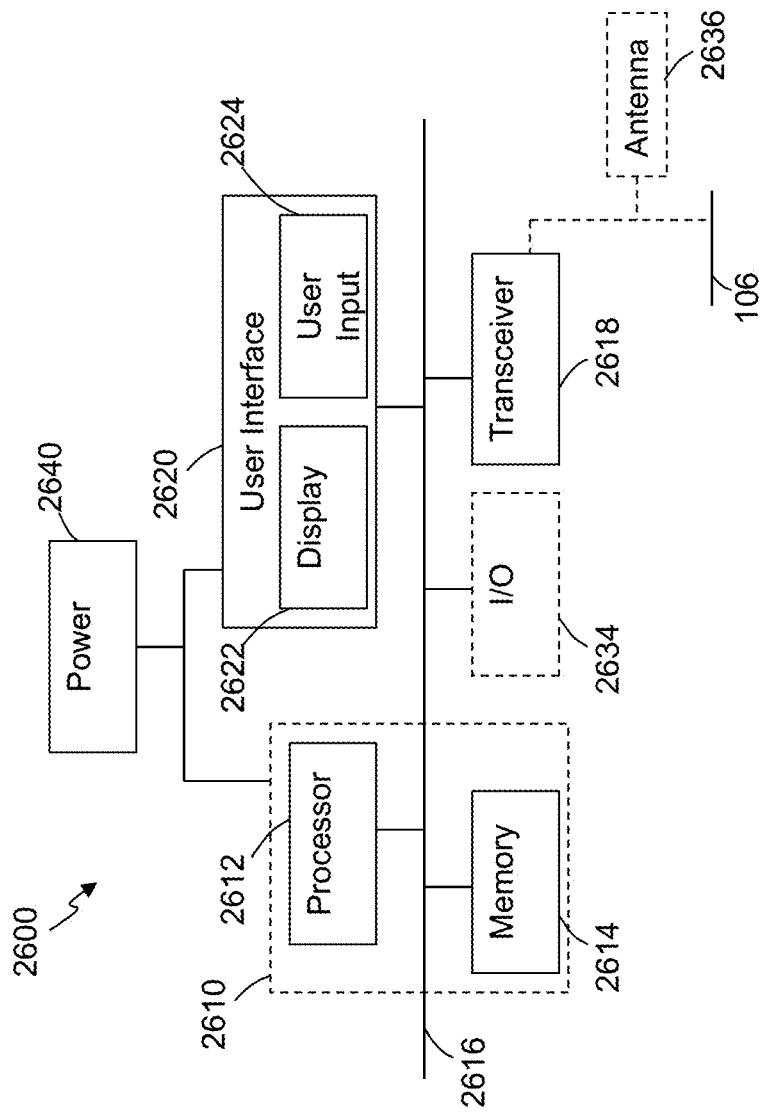
FIG. 26 illustrates circuitry for use in implementing methods, techniques, devices, apparatuses, systems, servers, sources and the like in providing user interactive virtual environments in accordance with some embodiments.

The methods, techniques, systems, circuitry, devices, services, servers, sources and the like described herein may be utilized, implemented and/or run on many different types of devices, circuitry, systems and/or combinations thereof. Referring to FIG. 26, there is illustrated circuitry 2600 that may be used in such implementations, in accordance with some embodiments. One or more components of the circuitry 2600 may be used for implementing any system, circuitry, apparatus or device mentioned above or below, or parts of such systems, apparatuses, circuitry or devices, such as for example any of the above or below mentioned central controller 102, ICI 104, satellite irrigation controller 112, ICM 108, 116, front-end and communication circuitry 210, power distribution circuitry 212, controller 214, power control and switching circuitry 216, PPDC 218, solenoid circuitry 220, boost circuitry 222, temperature sensing circuitry 224, and/or other such systems, circuitry, devices and the like. However, the use of the circuitry 2600 or any portion thereof is certainly not required.

By way of example, the circuitry 2600 may comprise a controller, microcontroller or processor module 2612, memory 2614, and one or more communication links, paths, buses or the like 2616. In some implementations the controller 2612 and some or all of the memory 2614 are cooperated as a single control element or circuitry 2610, such as a single microprocessor, microcontroller or the like. The controller 2612 can be implemented through one or more processors, microprocessors, central processing unit, logic, local digital storage, firmware and/or other control hardware and/or software, and may be used to execute or assist in executing the steps of the methods and techniques described herein, and control various communications, programs, content, listings, services, interfaces, etc. A power source or supply 2640 is included or coupled with the circuitry 2600.

Some embodiments optionally include a user interface 2620. The user interface 2620 can allow a user to interact with the circuitry 2600, and in some implementations receive information through the circuitry. In some instances, the user interface 2620 includes a display 2622 and/or one or more user inputs 2624, such as a button(s), touch screen, rotary dial(s), remote control, keyboard, mouse, track ball, etc., which can be part of or wired or wirelessly coupled with the circuitry 2600.

Typically, the circuitry 2600 further includes one or more communication interfaces, ports, transceivers 2618 and the like allowing the circuitry 2600 to communication with one or more other devices, systems, circuitry, and the like, or combinations thereof. For example, in some implementations, the one or more communication interfaces or transceivers 2618 allow the circuitry to communicate over the multi-wire path, 106. Additionally or alternatively, the one or more transceivers 2618 may allow communication over a distributed network, a local network, the Internet, communication link, other networks or communication channels with other devices and/or other such communications. Further the transceiver 2618 can be configured for wired, wireless, optical, fiber optical cable or other such communication configurations or combinations of such communications (e.g., wireless communication via one or more antennas 2636). Some embodiments additionally include other input and/or output interfaces 2634 that allows the circuitry to couple with and/or communicate with other external devices, systems or the like.

The circuitry 2600 comprises an example of a control and/or processor-based system with the controller 2612. Again, the controller 2612 can be implemented through one or more processors, controllers, central processing units, logic, software and the like. Further, in some implementations the controller 2612 may provide multiprocessor functionality.

The memory 2614, which can be accessed by the controller 2612, typically includes one or more processor readable and/or computer readable media accessed by at least the controller 2612, and can include volatile and/or nonvolatile media, such as RAM, ROM, EEPROM, flash memory and/or other memory technology. Further, the memory 2614 is shown as internal to the circuitry 2610; however, the memory 2614 can be internal, external or a combination of internal and external memory. The external memory can be substantially any relevant memory such as, but not limited to, one or more of flash memory secure digital (SD) card, universal serial bus (USB) stick or drive, other memory cards, hard drive and other such memory or combinations of such memory. The memory 2614 can store code, software, executables, scripts, data, programming, programs, irrigation scheduling, sensor data, log or history data, user information, or the like, or combinations thereof.

One or more of the embodiments, methods, processes, approaches, and/or techniques described above or below may be implemented in one or more computer programs executable by a processor-based system. By way of example, such a processor based system may comprise the processor based circuitry 2600, a computer, central irrigation controller, a satellite irrigation controller, tablet, smart phone, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques to identify plunger location, report such plunger location, instruct actions to be taken, implement actions, implement irrigation schedules and/or other such functions or actions. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a non-transitory computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein.

For example, some embodiments provide one or more computer-readable storage mediums storing one or more computer programs for use with a computer simulation, the one or more computer programs configured to cause a computer and/or processor based system to execute steps comprising: causing an input stimulus to be applied to a solenoid at a time while a plunger drive signal is not being applied to the solenoid, wherein the solenoid is configured to cooperate with a plunger and to receive the plunger drive signal that induces a magnetic field relative to the solenoid that causes the plunger to change positions between open and closed positions, and wherein the input stimulus does not cause the plunger to change a position; taking one or more voltage measurements across the solenoid in response to the input stimulus being applied to the solenoid, wherein the voltage of the one or more voltage measurements are dependent upon the position of the plunger relative to the solenoid in response to the input stimulus applied to the solenoid; evaluating the one or more voltage measurements; and determining whether the plunger is in one of the open and closed positions based on the one or more voltage measurements.

Other embodiments provide one or more computer-readable storage mediums storing one or more computer programs configured for use with a computer simulation, the one or more computer programs configured to cause a computer and/or processor based system to execute steps comprising: causing an input stimulus to be generated and applied to a first terminal of a solenoid, wherein the solenoid is cooperated with a plunger that is configured to be movable between open and closed positions in response to a magnetic field generated by the solenoid in response to a plunger drive signal causing an opening and closing of an irrigation valve, and wherein the input stimulus does not cause the plunger to change positions and the input stimulus is applied to the solenoid while the plunger drive signal is not being applied to the solenoid; causing one or more voltage measurements to be taken across a resistive load cooperated with a second terminal of the solenoid in response to the input stimulus; determining a current through the resistive load as a function of the one or more voltage measurements; determining an inductance of the solenoid as a function of the determined current and a timing of the input stimulus; evaluating the determined inductance relative to a first inductance threshold; and determining whether the plunger is in one of the open and closed positions as a function of a first relationship between the determined inductance of the solenoid and the first inductance threshold.

Additionally or alternatively, some embodiments provide one or more computer-readable storage mediums storing one or more computer programs configured for use with a computer simulation, the one or more computer programs configured to cause a computer and/or processor based system to execute steps comprising: injecting an input stimulus into a resonant circuit comprising a solenoid, wherein the solenoid is configured to cooperate with a plunger and to receive a plunger drive signal from plunger activation circuitry wherein the plunger drive signal configured to induce a magnetic field relative to the solenoid that causes the plunger to change positions between open and closed positions resulting in opening or closing a valve such that water is allowed to pass through the valve when the plunger is in the open position and water is prevented from passing the valve when the plunger is in the closed position, and wherein the input stimulus will not cause the plunger to move from a current position and the input stimulus is injected while the plunger drive signal is not being applied to the solenoid; wherein the resonant circuit is configured to be excited by the input stimulus to generate a resonant response that resonates when the plunger is in one of the open position and the closed positions; determining whether the resonant response is generated in response to the input stimulus; and determining, through control circuitry, whether the plunger is in one of the open position and closed positions in response to whether the resonant response is generated.

Still further, some embodiments provide one or more computer-readable storage mediums storing one or more computer programs configured for use with a computer simulation, the one or more computer programs configured to cause a computer and/or processor based system to execute steps comprising: determining, at an irrigation valve control circuitry, whether a voltage on a multi-wire path is less than a first threshold, wherein the irrigation valve control circuitry is coupled with the multi-wire path obtains power from the multi-wire path to open and close an irrigation valve; activating a boost circuitry in response to determining that the voltage on the multi-wire path is less than the first threshold; generating a boost voltage, through the boost circuitry, that is greater than the voltage on the multi-wire path when the voltage on the multi-wire path is less than the first threshold; charging, through the boost voltage, a first charge storage circuitry to a first voltage that is greater than the voltage on the multi-wire path in response to the boost voltage; and discharging the first charge storage circuitry to drive a current through a solenoid controlling movement of a plunger to change positions to one of the open and closed position, wherein moving the plunger controls the irrigation valve such that water is allowed to pass through the valve when the plunger is in an open position and water is prevented from passing the valve when the plunger is in a closed position.

As described above, some embodiments are configured to determine the location of the plunger 312. The determination can be performed for substantially any reason. In some embodiments, the plunger location can be confirmed in response to instructions to induce movement of the plunger (i.e., following a plunger drive signal to open or close a valve). Similarly, the plunger location can be determined in response to a status check of a valve or irrigation system, system maintenance, periodically, based on a schedule, a start-up routine, prior to initiating an irrigation schedule, upon completing an irrigation schedule, as part of a set-up or preset procedure, in response to an installation or upgrade to an irrigation system or component of an irrigation system, part of an initialization (e.g., force valves to be in known states prior to initiating an irrigation schedule), or the like or combinations thereof.

Some embodiments utilize relatively basic circuitry to detect the plunger location. As described above, some embodiments utilize known inductance value differences between two or more plunger locations. This inductance difference is cause by the different plunger positions inside the coil. The circuitry injects a relatively small input stimulus, which is too small to provide motive force on the plunger, and one or more measurements are taken. For example, voltage measurements across the solenoid can be determined, voltage across a resistive load can be taken and/or other such measurements can be taken. Based on these one or more measurements, the position of the plunger relative to the solenoid can be determined and/or estimated.

Further, some embodiments utilize resonant circuitry in determining the plunger location relative to the solenoid. For example, through the use of a small amplitude, DC signal induced through an LRC circuitry including the solenoid, a response can be measured that is used to indirectly measure the position of the plunger. The location information can be used to determine whether the plunger is in a position indicating that the valve is open, closed, or in an undetermined position.

Some embodiments additionally or alternatively include boost circuitry. As described above, and depicted in FIG. 1, ICMs 108 can be coupled with a multi-wire path 106 at various locations along the length of the multi-wire path. Typically, the ICMs derive operational power and power to drive open and close the solenoid valve from a power signal (e.g., an AC waveform) received via the multi-wire path. The length of the multi-wire path, however, may be hundreds of meters or longer. Because of relatively long runs of the multi-wire path, the amplitude of the AC waveform may diminish along the multi-wire path such that the amplitude is proximate an end of the multi-wire path than proximate the ICI 104, satellite irrigation controller 112 or other source of the AC waveform. Accordingly, at the distal end of the path, the AC power signal may provide insufficient power to the ICMs to effectively and/or accurately open or close the solenoid controlled valve. As such, some embodiments include the boost circuitry in the ICM, a separate power circuitry coupled with the ICM or other such circuitry. The ICM can detect the level of the AC signal on the multi-wire path and/or a voltage proportional to the level on the multi-wire path, and activate the boost circuitry to generate a boosted voltage when the AC signal drops below a threshold. In some embodiments, the boost circuitry includes one or more charge storage circuitry (e.g., including one or more capacitors, batteries, etc.) to store at least the boosted voltage.

It is noted that in some embodiments, an irrigation control device is provided that includes boost circuitry and/or plunger detection circuitry. For example, while several of the embodiments described herein indicate that boost circuitry functionality and plunger detection circuitry functionality may be implemented in the same device (e.g., see FIG. 2), it is understood that an irrigation device in some embodiments may include boost circuitry without plunger detection circuitry, and that an irrigation device in some embodiments may include plunger detection circuitry without boost circuitry.

It is also noted that in some embodiments, an irrigation control device includes boost circuitry and plunger detection circuitry, where the boost circuitry may be any of the boost circuits described herein or any other boost circuits known in the art, and where the plunger detection circuitry may be any of the plunger detection circuits described herein or any other plunger detection circuits known in the art. Accordingly, in some embodiments, an irrigation control apparatus comprises: charge storage circuitry electrically coupled with a multi-wire path, wherein the charge storage circuitry is configured to be charged by a voltage on the multi-wire path; boost circuitry coupled to the charge storage circuitry and configured to increase a voltage stored by the charge storage circuitry when the voltage on the multi-wire path is below a threshold; a solenoid configured to cooperate with a plunger and to receive a plunger drive signal produced through a discharge of at least the charge storage circuitry; and plunger position detection circuitry configured to determine whether the plunger is in one of an open position and a closed position.

Some embodiments provide methods of controlling an irrigation device, comprising: causing an input stimulus to be applied to a solenoid at a time while a plunger drive signal is not being applied to the solenoid, wherein the solenoid is configured to cooperate with a plunger and to receive the plunger drive signal that induces a magnetic field relative to the solenoid that causes the plunger to change positions between open and closed positions, and wherein the input stimulus does not cause the plunger to change a position; taking one or more voltage measurements across the solenoid in response to the input stimulus being applied to the solenoid, wherein the voltage of the one or more voltage measurements are dependent upon the position of the plunger relative to the solenoid in response to the input stimulus applied to the solenoid; evaluating the one or more voltage measurements; and determining whether the plunger is in one of the open and closed positions based on the one or more voltage measurements. In some implementations, methods further comprise: generating the input stimulus as a tone that oscillates at a fixed frequency, wherein the causing the input stimulus to be applied to the solenoid comprises causing the tone to be applied to the solenoid, wherein the tone does not cause the plunger to change positions.

Other embodiments provide methods of controlling an irrigation device, the methods comprising: causing an input stimulus to be generated and applied to a first terminal of a solenoid, wherein the solenoid is cooperated with a plunger that is configured to be movable between open and closed positions in response to a magnetic field generated by the solenoid in response to a plunger drive signal causing an opening and closing of an irrigation valve, and wherein the input stimulus does not cause the plunger to change positions and the input stimulus is applied to the solenoid while the plunger drive signal is not being applied to the solenoid; causing one or more voltage measurements to be taken across a resistive load cooperated with a second terminal of the solenoid in response to the input stimulus; determining a current through the resistive load as a function of the one or more voltage measurements; determining an inductance of the solenoid as a function of the determined current and a timing of the input stimulus; evaluating the determined inductance relative to a first inductance threshold; and determining whether the plunger is in one of the open and closed positions as a function of a first relationship between the determined inductance of the solenoid and the first inductance threshold. In some implementations, the methods further comprise: activating a resistance circuitry switch, while at least a portion of the input stimulus is applied to the solenoid, to direct current passing through the inductor, in response to at least the portion of the input stimulus being applied to the solenoid, to the resistive load; and wherein the causing the one or more voltage measurements to be taken comprises causing the one or more voltage measurements to be taken across the resistive load while the current is directed to the resistive load.

Further, some embodiments provide methods of controlling irrigation apparatuses, comprising: injecting an input stimulus into a resonant circuit comprising a solenoid, wherein the solenoid is configured to cooperate with a plunger and to receive a plunger drive signal from plunger activation circuitry wherein the plunger drive signal configured to induce a magnetic field relative to the solenoid that causes the plunger to change positions between open and closed positions resulting in opening or closing a valve such that water is allowed to pass through the valve when the plunger is in the open position and water is prevented from passing the valve when the plunger is in the closed position, and wherein the input stimulus will not cause the plunger to move from a current position and the input stimulus is injected while the plunger drive signal is not being applied to the solenoid; wherein the resonant circuit is configured to be excited by the input stimulus to generate a resonant response that resonates when the plunger is in one of the open position and the closed positions; determining whether the resonant response is generated in response to the input stimulus; and determining, through control circuitry, whether the plunger is in one of the open position and closed positions in response to whether the resonant response is generated.

Some embodiments provide irrigation valve control apparatuses comprising: multiple terminals coupled with a multi-wire path; a first charge storage circuitry electrically coupled with at least one of the multiple terminals, wherein the first charge storage circuitry is configured to be charged by a voltage on the multi-wire path; a control circuitry configured to determine the voltage on the multi-wire path; and a boost circuitry controlled by the control circuitry, wherein the control circuitry in response to determining that the voltage on the multi-wire path is below a threshold activates the boost circuitry to increase a voltage stored by the first charge storage circuitry.

Further, some embodiments provide methods of controlling irrigation valves, comprising: determining, at an irrigation valve control circuitry, whether a voltage on a multi-wire path is less than a first threshold, wherein the irrigation valve control circuitry is coupled with the multi-wire path obtains power from the multi-wire path to open and close an irrigation valve; activating a boost circuitry in response to determining that the voltage on the multi-wire path is less than the first threshold; generating a boost voltage, through the boost circuitry, that is greater than the voltage on the multi-wire path when the voltage on the multi-wire path is less than the first threshold; charging, through the boost voltage, a first charge storage circuitry to a first voltage that is greater than the voltage on the multi-wire path in response to the boost voltage; and discharging the first charge storage circuitry to drive a current through a solenoid controlling movement of a plunger to change positions to one of the open and closed position, wherein moving the plunger controls the irrigation valve such that water is allowed to pass through the valve when the plunger is in an open position and water is prevented from passing the valve when the plunger is in a closed position.

Some embodiments provide irrigation valve control apparatuses comprising: a solenoid configured to cooperate with a plunger and to receive a plunger drive signal from plunger activation circuitry wherein the plunger drive signal is configured to induce a magnetic field relative to the solenoid that causes the plunger to change positions between open and closed positions; an input stimulus source coupled with the solenoid and configured to apply an input stimulus into the solenoid at a time while the plunger drive signal is not being applied to the solenoid, wherein the input stimulus is sufficiently small that the input stimulus applied to the solenoid does not cause the plunger to move from a current position; sampling circuitry configured to measure one or more voltage measurements corresponding to one or more voltages across the solenoid, wherein the one or more voltage measurements are dependent upon the current position of the plunger relative to the solenoid in response to applying the input stimulus to the solenoid; and control circuitry cooperated with the sampling circuitry to receive the one or more voltage measurements from the sampling circuitry, wherein the control circuitry is configured to determine whether the plunger is in one of the open and closed positions based on the one or more voltage measurements.

Further, some embodiments provide irrigation apparatuses, comprising: a solenoid configured to cooperate with a plunger and to receive a plunger drive signal from plunger activation circuitry wherein the plunger drive signal is configured to induce a magnetic field relative to the solenoid that causes the plunger to change positions between open and closed positions causing an opening and closing of an irrigation valve; first switching circuitry cooperated with the solenoid, wherein the first switching circuitry is configured, upon activation, to dictate a direction of electrical current flow through the solenoid, wherein the direction of current flow while the plunger drive signal is applied controls a direction of movement of the plunger in response to the application of the plunger drive signal; an input stimulus source cooperated with the solenoid, wherein the input stimulus source is configured to generate an input stimulus that is applied to a first terminal of the solenoid at a time while the plunger drive signal is not being applied to the solenoid, and wherein the input stimulus does not cause the plunger to change from a current position; a resistive load cooperated with a second terminal of the solenoid; sampling circuitry coupled with the resistive load, wherein the sampling circuitry is configured to measure one or more voltage measurements across the resistive load in response to the input stimulus; and control circuitry coupled with the sampling circuitry, wherein the control circuitry is configured to receive the one or more voltage measurements, determine a current passing through the resistive load as a function of the one or more voltage measurements, calculate an estimated inductance of the solenoid as a function of the determined current and a timing of the input stimulus, and determine whether the plunger is in one of the open position and the closed position as a function of the estimated inductance of the solenoid.

Still other embodiments provide irrigation valve control apparatuses comprising: a solenoid configured to cooperate with a plunger and to receive a plunger drive signal from plunger activation circuitry wherein the plunger drive signal is configured to induce a magnetic field relative to the solenoid that causes the plunger to change positions between open and closed positions resulting in opening or closing a valve such that water is allowed to pass through the valve when the plunger is in the open position and water is prevented from passing the valve when the plunger is in the closed position; control circuitry cooperated with the solenoid and configured to direct the plunger drive signal into the solenoid to induce movement of the plunger; an input stimulus source cooperated with the solenoid and configured to apply an input stimulus into the solenoid at a time while the plunger drive signal is not being applied to the solenoid, wherein the input stimulus that is sufficiently small that the input stimulus does not cause the plunger to move from a current position; and a resonant circuit comprising the solenoid, wherein the resonant circuit is coupled with the input stimulus source and configured to be excited by the input stimulus to generate a resonant response that resonates when the plunger is in one of the open position and the closed position; wherein the control circuitry is configured to determine whether the resonant response is generated in response to the input stimulus, and to determine whether the plunger is in one of the open and closed positions in response to whether the resonant response is generated.

Some embodiments provide irrigation apparatuses, comprising: a solenoid configured to cooperate with a plunger and to receive a plunger drive signal from plunger activation circuitry wherein the plunger drive signal is configured to induce a magnetic field relative to the solenoid that causes the plunger to change positions between open and closed positions causing an opening and closing of an irrigation valve; first switching circuitry cooperated with the solenoid, wherein the first switching circuitry is configured, upon activation, to dictate a direction of electrical current flow through the solenoid, wherein the direction of current flow while the plunger drive signal is applied controls a direction of movement of the plunger in response to the application of the plunger drive signal; an input stimulus source cooperated with the solenoid, wherein the input stimulus source is configured to generate an input stimulus that is applied to a first terminal of the solenoid at a time while the plunger drive signal is not being applied to the solenoid, and wherein the input stimulus does not cause the plunger to change from a current position; a resistive load cooperated with a second terminal of the solenoid; sampling circuitry coupled with the resistive load, wherein the sampling circuitry is configured to measure one or more voltage measurements across the resistive load in response to the input stimulus; and control circuitry coupled with the sampling circuitry, wherein the control circuitry is configured to receive the one or more voltage measurements, determine a current passing through the resistive load as a function of the one or more voltage measurements, calculate an estimated inductance of the solenoid as a function of the determined current and a timing of the input stimulus, and determine whether the plunger is in one of the open position and the closed position as a function of the estimated inductance of the solenoid. Some embodiments further comprise: the plunger positioned relative to the solenoid, wherein the plunger is configured to be movable between the open and closed positions in response to the magnetic field generated by the solenoid in response to the plunger drive signal applied to the solenoid by the plunger activation circuitry.

Additionally, in some embodiments, the control circuitry, in determining whether the plunger is in one of the open and closed positions, is configured to evaluate the estimated inductance relative to a first inductance threshold, and determine whether the plunger is in one of the open and closed positions as a function of a relationship between the estimated inductance of the solenoid and the first inductance threshold. Further, the control circuitry can be further configured to evaluate the estimated inductance relative to a second inductance threshold, and determine whether the plunger is in the other of the open and closed position as a function of a relationship between the estimated inductance of the solenoid and the second inductance threshold. In some implementations the control circuitry is further configured to identify that the plunger is in an unknown position as the result of the relationship between the estimated inductance of the solenoid and the first inductance threshold and the result of the relationship between the estimated inductance of the solenoid and the second inductance threshold. Furthermore, some embodiments further comprise: second switching circuitry cooperated with the solenoid, wherein the second switching circuitry is configured, when triggered, to direct current passing through the solenoid through the resistive load establishing a voltage across the resistive load; and wherein the control circuitry is cooperated with the second switching circuitry and configured to control the second switching circuitry in association with the application of the input stimulus. The resistive load can couple between the solenoid and ground when the second switching circuitry is triggered to direct the current passing through the solenoid through the resistive load. The input stimulus can comprises a pulse wherein a duration of the pulse is known to the control circuitry; and wherein the control circuitry, in calculating the estimated inductance, is configured to calculate the estimated inductance as a function of the determined current and the pulse duration. Further, the control circuitry, in some implementations, is configured to calculate an estimated change in current over time as a function of the known pulse duration and, in calculating the estimated inductance, calculate the estimated inductance as a function of the estimated change in current over time. Still further, in some embodiments, the sampling circuitry is configured to take at least one of the one or more voltage measurements at approximately an end of the pulse duration.

In some embodiments, the control circuitry is configured to determine the position of the plunger without measuring a current. Some embodiments further comprise: a gain stage coupled between the resistive load and the sampling circuitry, wherein the gain stage is configured to amplify the one or more voltage measurements increasing a dynamic range of the sampling circuitry allowing a utilization of a greater number of bits to digitally represent the sampled one or more voltage measurements. In some implementations, the irrigation apparatus further comprises: boost circuitry coupled with a multi-wire path comprising at least two wires, wherein the multi-wire path delivers power; and boost control circuitry configured to determine whether a voltage level on the multi-wire path is below a plunger drive signal threshold and activates the boost circuitry; wherein the boost circuitry is configured to enhance a voltage of the plunger drive signal applied to the solenoid to induce the movement of the plunger to change positions between the open and closed positions. The boost control circuitry, in response to determining that the voltage level on the multi-wire path is below the plunger drive signal threshold, is further configured, in some embodiments, to generate a pulse width modulated (PWM) signal applied to the boost circuitry; wherein the boost circuitry is configured to generate an increased voltage and charge one or more charge storage circuitry, over a period of time, to a voltage at least equal to the plunger drive signal threshold in response to the PWM signal.

In some embodiments, the control circuitry is further configured to evaluate the one or more voltage measurements relative to a third threshold, and to determine whether the plunger is removed from a position cooperated with the solenoid as a result of a relationship between the one or more voltage measurements and the third threshold. Additionally, the sampling circuitry, in some embodiments, in measuring the one or more voltage measurements is configured to take multiple measurements over time of the voltage across the resistive load in response to the application of the input stimulus. Further, the sampling circuitry can be configured to take multiple voltage measurements following the application of the input stimulus; wherein the control circuitry is configured to receive the multiple voltage measurements, to cooperate the multiple voltage measurements calculating a cooperative measurement; and wherein the control circuitry is configured, when determining the current passing through the resistive load, is configured to calculate the current passing through the resistive load as a function of the cooperative measurement.

Some embodiments further comprise: temperature sensing circuitry coupled with the control circuitry, wherein the temperature sensing circuitry is configured to provide an indication of a current temperature of an environment in which the solenoid is positioned; and wherein the control circuitry, in determining the current passing through the resistive load as the function of the one or more voltage measurements, is further configured to adapt the one or more voltage measurements as a function of the indication of the current temperature. In some implementations, the control circuitry is configured to activate the plunger activation circuitry to generate the plunger drive signal that is applied to the solenoid and intended to force the plunger to an intended one of the open position and the closed position, and to determine whether the plunger is in a stuck condition by determining whether the plunger is in the intended one of the open position and the closed position after the applying the plunger drive signal to the solenoid. Further, in some embodiments, the control circuitry, when determining whether the plunger is in one of the open and closed positions, is further configured to determine one of a level of how open and a level of how closed, wherein the level of how open and the level of how closed are defined by an estimated proportional position of the plunger relative to a range of motion of the plunger and at least one of a fully open position at a first limit of the range of motion and a fully closed position at a second limit of the range of motion.

Some embodiments provide irrigation valve control apparatuses comprising: a solenoid configured to cooperate with a plunger and to receive a plunger drive signal from plunger activation circuitry wherein the plunger drive signal is configured to induce a magnetic field relative to the solenoid that causes the plunger to change positions between open and closed positions resulting in opening or closing a valve such that water is allowed to pass through the valve when the plunger is in the open position and water is prevented from passing the valve when the plunger is in the closed position; control circuitry cooperated with the solenoid and configured to direct the plunger drive signal into the solenoid to induce movement of the plunger; an input stimulus source cooperated with the solenoid and configured to apply an input stimulus into the solenoid at a time while the plunger drive signal is not being applied to the solenoid, wherein the input stimulus that is sufficiently small that the input stimulus does not cause the plunger to move from a current position; and a resonant circuit comprising the solenoid, wherein the resonant circuit is coupled with the input stimulus source and configured to be excited by the input stimulus to generate a resonant response that resonates when the plunger is in one of the open position and the closed position; wherein the control circuitry is configured to determine whether the resonant response is generated in response to the input stimulus, and to determine whether the plunger is in one of the open and closed positions in response to whether the resonant response is generated.

The apparatus, in some embodiments, further comprises: the plunger positioned relative to the solenoid, wherein the plunger is configured to be movable between the open and closed positions in response to the magnetic field generated by the solenoid in response to the plunger drive signal applied to the solenoid by the plunger activation circuitry. Further, in some embodiments, the control circuitry is configured to determine a voltage amplitude of a response generated by the resonant circuit in response to the input stimulus; and wherein the control circuitry in determining whether the resonant response is generated is configured to compare peak voltage to a voltage threshold, and to determine whether the resonant response is generated based on a determined relationship between the peak voltage and the voltage threshold. Some embodiments further comprise: sampling circuitry configured to measure one or more voltage measurements corresponding to one or more voltages across the solenoid, wherein the one or more voltage measurements are dependent upon the current position of the plunger relative to the solenoid in response to the input stimulus applied to the solenoid, wherein the control circuitry is further configured to evaluate the one or more voltage measurements relative to a second threshold, and determine whether the plunger is in one of the open position and the closed position as a function of a second relationship between the one or more voltage measurements and the second threshold.

Additionally, in some embodiments, the control circuitry is further configured to identify that the plunger is in an unknown position as the result of the determined relationship between the peak voltage and the voltage threshold and the second relationship between the one or more voltage measurements and the second threshold. In some implementations, the input stimulus source is further configured to apply an alternate input stimulus into the solenoid; wherein the control circuitry is configured to determine whether the resonant response is generated in response to the alternate input stimulus, and to determine whether the plunger is removed from a position cooperated with the solenoid in response to whether the resonant response is generated based on the alternate input stimulus. Some apparatus, in accordance with some embodiments, further comprise: sampling circuitry configured to take multiple voltage measurement over time of the voltage across the solenoid in response the application of the input stimulus to the resonant circuit; wherein the control circuitry, in determining whether the resonant response is generated in response to the input stimulus, is configured to evaluate the multiple voltage measurements. The sampling circuitry, in some embodiments, is coupled with the solenoid to take the multiple voltage measurements across the solenoid. Further, in some embodiments the input stimulus comprises a single square pulse signal. In other embodiments, the input stimulus comprises a sine wave signal. In yet other embodiments, the input stimulus comprises a periodic square wave signal.

Some embodiments further comprise: sampling circuitry configured to measure one or more voltage measurements corresponding to one or more voltages across the solenoid, wherein the one or more voltage measurements are dependent upon the current position of the plunger relative to the solenoid in response to the input stimulus applied to the solenoid, wherein the control circuitry is further configured to evaluate the one or more voltage measurements in determining whether the resonant response is generated in response to the input stimulus; wherein the sampling circuitry in taking each of the one or more voltage measurements is configured to take the one or more voltage measurements after a predefined period of time following the input stimulus being applied to the solenoid. Additionally or alternatively, some embodiments further comprise: a gain stage coupled between the solenoid and a sampling circuitry, wherein the gain stage is configured to amplify, prior to taking one or more voltage measurements, the response induced by the resonant circuit producing an amplified response corresponding to voltage across the solenoid; and wherein the sampling circuitry in measuring one or more voltage measurements is configured to measure the one or more voltage measurements of the amplified response corresponding to the voltage across the solenoid with a resulting increased dynamic range of the sampling circuitry allowing the utilization of a greater number of bits to digitally represent the sampled signal than available without the gain stage. Some embodiments further comprise sampling circuitry configured to take multiple voltage measurements following the application of the input stimulus; wherein the control circuitry is configured to receive the multiple voltage measurements, to cooperate the multiple voltage measurements calculating a cooperative measurement; and wherein the control circuitry is configured, when determining whether the resonant response is generated, to evaluate the cooperative measurement relative to a first threshold, and determine whether the resonant response is generated as a result of a relationship between the cooperative measurement and the first threshold.

In some implementations, an apparatus further comprises: boost circuitry coupled with a multi-wire path that delivers power; and boost control circuitry configured to determine whether a voltage level on the multi-wire path is below a plunger drive signal threshold and activates the boost circuitry; wherein the boost circuitry is configured to increase a voltage of the plunger drive signal applied to the solenoid to induce the movement of the plunger to change positions between the open and closed positions. Further, in some embodiments, the boost control circuitry, in response to determining that the voltage level on the multi-wire path is below the plunger drive signal threshold, is further configured to generate a pulse width modulated (PWM) signal applied to the boost circuitry; wherein the boost circuitry is configured to generate an increased voltage and charge one or more charge storage circuitry, over a period of time, to a voltage at least equal to the plunger drive signal threshold in response to the PWM signal.

Some embodiments further comprise: temperature sensing circuitry coupled with the control circuitry, wherein the temperature sensing circuitry is configured to provide an indication of a current temperature of an environment in which the solenoid is positioned; and wherein the control circuitry in determining whether the resonant response is generated is further configured to adapt one or more voltage measurements, which are dependent upon the position of the plunger relative to the solenoid, as a function of the indication of the current temperature. The control circuitry, in some embodiments, is configured to activate the plunger activation circuitry to generate the plunger drive signal that is applied to the solenoid and intended to force the plunger to an intended one of the closed position and the open position, and to determine whether the plunger is in a stuck condition by determining whether the plunger is in the intended one of the open position and the closed position after the applying the plunger drive signal to the solenoid. Further, in some implementations, the control circuitry is configured to identify that the plunger is in one of the open and closed positions in response to determining that the resonant response is not detected and to identify that the plunger is in the other of the open and closed position when the resonant response is detected. Additionally or alternatively, in some embodiments the control circuitry, when determining whether the plunger is in one of the open and closed positions, is further configured to determine one of a level of how open and a level of how closed, wherein the level of how open and the level of how closed are defined by an estimated proportional position of the plunger relative to a range of motion of the plunger and at least one of a fully open position at a first limit of the range of motion and a fully closed position at a second limit of the range of motion.

Some embodiments provide irrigation control apparatuses comprising: a first charge storage circuitry electrically coupled with a multi-wire path, wherein the first charge storage circuitry is configured to be charged by a voltage on the multi-wire path; control circuitry configured to determine the voltage on the multi-wire path; boost circuitry controlled by the control circuitry, wherein the control circuitry in response to determining that the voltage on the multi-wire path is below a threshold activates the boost circuitry to increase a voltage stored by the first charge storage circuitry; a solenoid configured to cooperate with a plunger and to receive a plunger drive signal produced through a discharge of at least the first charge storage circuitry; and plunger position detection circuitry configured to apply an input stimulus into the solenoid and to determine whether the plunger is in one of an open position and a closed position in response to applying the input stimulus.

While the invention herein disclosed has been described by means of specific embodiments, examples and applications thereof, numerous modifications and variations could be made thereto by those skilled in the art without departing from the scope of the invention set forth in the claims.

What is claimed is:

1. An irrigation valve control apparatus comprising:
   multiple terminals coupled with a multi-wire path;
   a first charge storage circuitry electrically coupled with at least one of the multiple terminals, wherein the first charge storage circuitry is configured to be charged by a voltage on the multi-wire path;
   a control circuitry configured to determine the voltage on the multi-wire path; and
   a boost circuitry controlled by the control circuitry, wherein the control circuitry in response to determining that the voltage on the multi-wire path is below a threshold activates the boost circuitry to increase a voltage stored by the first charge storage circuitry, wherein the boost circuitry comprises:
   a power inductor coupled with the first charge storage circuitry; and
   switching circuitry cooperated with the power inductor;
   wherein the control circuitry is configured to sequentially trigger the switching circuitry to induce a change in current over time through the power inductor producing a boost voltage applied to the first charge storage circuitry.

2. The apparatus of claim 1, further comprising:
   a solenoid;
   a plunger positioned relative to the solenoid such that the plunger changes positions between open and closed positions in response to a magnetic field generated by the solenoid;
   wherein the control circuitry is configured to discharge the first charge storage circuitry into the solenoid to induce movement of the plunger causing the plunger to change positions resulting in opening or closing a valve such that water is allowed to pass through the valve when the plunger is in the open position and water is prevented from passing the valve when the plunger is in the closed position.

3. The apparatus of claim 2, wherein the control circuitry, in determining the voltage on the multi-wire path, is configured to monitor voltage across the first charge storage circuitry as a function of the voltage on the multi-wire path, and to activate the boost circuitry to increase the voltage stored by the first charge storage circuitry when the voltage across the first charge storage circuitry is less than a voltage threshold corresponding to a voltage to cause the plunger to change to the closed position.

4. The apparatus of claim 3, wherein the boost circuitry further comprises a second charge storage circuitry electrically coupled with at least one of the multiple terminals, wherein the second charge storage circuitry is configured to be charged by the voltage one the multi-wire path; and wherein the boost circuitry is configured to charge both the first charge storage circuitry and the second charge storage circuitry increasing the voltage stored.

5. The apparatus of claim 1, wherein the control circuitry is further configured to generate a pulse width modulated (PWM) signal that is applied to the switching circuitry to implement the sequential triggering of the switching circuitry in response to the PWM signal to induce the change in current over time through the power inductor corresponding to a frequency of the PWM signal.

6. The apparatus of claim 5, wherein the control circuitry, in generating the pulse width modulated signal, is configured to generate the PWM signal as a fixed PWM signal without monitoring the PWM signal and without adjusting the PWM signal.

7. The apparatus of claim 5, further comprising:
   emission protection circuitry cooperated with the switching circuitry and configured to dictate a rate at which a current is drawn through the switching circuitry and controlling electromagnetic interference (EMI).

8. The apparatus of claim 1, further comprising:
   a solenoid configured to cooperate with a plunger and to receive a plunger drive signal produced through a discharge of at least the first charge storage circuitry; and
   plunger position detection circuitry configured to determine whether the plunger is in one of an open position and a closed position.

9. The apparatus of claim 1, further comprising:
   a solenoid configured to cooperate with a plunger and to receive a plunger drive signal produced through a discharge of at least the first charge storage circuitry, wherein the plunger drive signal is configured to induce a magnetic field relative to the solenoid that causes the plunger to change positions between an open position and a closed position;
   an input stimulus source coupled with the solenoid and configured to apply an input stimulus into the solenoid at a time while the plunger drive signal is not being applied to the solenoid, wherein the input stimulus is sufficiently small that the input stimulus applied to the solenoid does not cause the plunger to move from a current position; and
   sampling circuitry configured to measure one or more voltage measurements corresponding to one or more voltages across the solenoid, wherein the one or more voltage measurements are dependent upon the current position of the plunger relative to the solenoid in response to applying the input stimulus to the solenoid;
   wherein the control circuitry is cooperated with the sampling circuitry to receive the one or more voltage measurements from the sampling circuitry, wherein the control circuitry is configured to determine whether the plunger is in one of the open position and the closed position based on the one or more voltage measurements.

10. The apparatus of claim 1, further comprising:
    a solenoid configured to cooperate with a plunger and to receive a plunger drive signal produced through a discharge of at least the first charge storage circuitry wherein the plunger drive signal is configured to induce a magnetic field relative to the solenoid that causes the plunger to change positions between open and closed positions causing an opening and closing of an irrigation valve;
    first switching circuitry cooperated with the solenoid, wherein the first switching circuitry is configured, upon activation, to dictate a direction of electrical current flow through the solenoid, wherein the direction of current flow while the plunger drive signal is applied controls a direction of movement of the plunger in response to the application of the plunger drive signal;

an input stimulus source cooperated with the solenoid, wherein the input stimulus source is configured to generate an input stimulus that is applied to a first terminal of the solenoid at a time while the plunger drive signal is not being applied to the solenoid, and wherein the input stimulus does not cause the plunger to change from a current position;

a resistive load cooperated with a second terminal of the solenoid;

sampling circuitry coupled with the resistive load, wherein the sampling circuitry is configured to measure one or more voltage measurements across the resistive load in response to the input stimulus; and control circuitry coupled with the sampling circuitry, wherein the control circuitry is configured to receive the one or more voltage measurements, determine a current passing through the resistive load as a function of the one or more voltage measurements, calculate an estimated inductance of the solenoid as a function of the determined current and a timing of the input stimulus, and determine whether the plunger is in one of the open position and the closed positions as a function of the estimated inductance of the solenoid.

11. The apparatus of claim 1, further comprising:

a solenoid configured to cooperate with a plunger and to receive a plunger drive signal from plunger activation circuitry wherein the plunger drive signal is configured to induce a magnetic field relative to the solenoid that causes the plunger to change positions between open and closed positions resulting in opening or closing a valve such that water is allowed to pass through the valve when the plunger is in the open position and water is prevented from passing the valve when the plunger is in the closed position;

control circuitry cooperated with the solenoid and configured to direct the plunger drive signal into the solenoid to induce movement of the plunger;

an input stimulus source cooperated with the solenoid and configured to apply an input stimulus into the solenoid at a time while the plunger drive signal is not being applied to the solenoid, wherein the input stimulus that is sufficiently small that the input stimulus does not cause the plunger to move from a current position; and a resonant circuit comprising the solenoid, wherein the resonant circuit is coupled with the input stimulus source and configured to be excited by the input stimulus to generate a resonant response that resonates when the plunger is in one of the open position and the closed position;

wherein the control circuitry is configured to determine whether the resonant response is generated in response to the input stimulus, and to determine whether the plunger is in one of the open and closed positions in response to whether the resonant response is generated.

12. A method of controlling irrigation valves, the method comprising:

determining, at an irrigation valve control circuitry, whether a voltage on a multi-wire path is less than a first threshold, wherein the irrigation valve control circuitry is coupled with the multi-wire path obtains power from the multi-wire path to open and close an irrigation valve;

activating a boost circuitry in response to determining that the voltage on the multi-wire path is less than the first threshold;

generating a boost voltage, through the boost circuitry, that is greater than the voltage on the multi-wire path when the voltage on the multi-wire path is less than the first threshold;

charging, through the boost voltage, a first charge storage circuitry to a first voltage that is greater than the voltage on the multi-wire path in response to the boost voltage; and discharging the first charge storage circuitry to drive a current through a solenoid controlling movement of a plunger to change positions to one of the open and closed position, wherein moving the plunger controls the irrigation valve such that water is allowed to pass through the valve when the plunger is in an open position and water is prevented from passing the valve when the plunger is in a closed position.

13. The method of claim 12, further comprising:

discharge the first charge storage circuitry into a solenoid to induce movement of a plunger causing the plunger to change positions resulting in opening or closing a valve such that water is allowed to pass through the valve when the plunger is in an open position and water is prevented from passing the valve when the plunger is in a closed position.

14. The method of claim 13, wherein the determining whether the voltage on the multi-wire path is less than a first threshold further comprises monitoring voltage across the first charge storage circuitry as a function of the voltage on the multi-wire path, and to activate the boost circuitry to increase the voltage stored by the first charge storage circuitry when the voltage across the first charge storage circuitry is less than a voltage threshold corresponding to a voltage to cause the plunger to change to the closed position.

15. The method of claim 12, wherein the activating the boost circuitry comprises:

sequentially triggering a switching circuitry coupled with a power inductor coupled with the first charge storage circuitry, inducing a change in current over time through the power inductor coupled with the first charge storage circuitry, and producing a boost voltage applied to the first charge storage circuitry.

16. The method of claim 15, further comprising:

generating a pulse width modulated (PWM) signal that is applied to the switching circuitry to implement the sequential triggering of the switching circuitry in response to the PWM signal to induce the change in current over time through the power inductor corresponding to a frequency of the PWM signal.

17. The method of claim 16, wherein the generating the pulse width modulated signal comprises generating the PWM signal as a fixed PWM signal without monitoring the PWM signal and without adjusting the PWM signal.

18. The method of claim 16, further comprising:

detecting, through an emission protection circuitry cooperated with the switching circuitry, a rate at which a current is drawn through the switching circuitry and controlling electromagnetic interference (EMI).

19. The method of claim 12, further comprising:

causing an input stimulus to be applied to a solenoid at a time while a plunger drive signal is not being applied to the solenoid, wherein the solenoid is configured to cooperate with a plunger and to receive the plunger drive signal that induces a magnetic field relative to the solenoid that causes the plunger to change positions between open and closed positions, and wherein the input stimulus does not cause the plunger to change a position;

taking one or more voltage measurements across the solenoid in response to the input stimulus being applied to the solenoid, wherein the voltage of the one or more voltage measurements are dependent upon the position of the plunger relative to the solenoid in response to the input stimulus applied to the solenoid;

evaluating the one or more voltage measurements; and determining whether the plunger is in one of the open and closed positions based on the one or more voltage measurements.

20. An irrigation control apparatus comprising:

charge storage circuitry electrically coupled with a multi-wire path, wherein the charge storage circuitry is configured to be charged by a voltage on the multi-wire path;

boost circuitry coupled to the charge storage circuitry and configured to increase a voltage stored by the charge storage circuitry when the voltage on the multi-wire path is below a threshold;

a solenoid configured to cooperate with a plunger and to receive a plunger drive signal produced through a discharge of at least the charge storage circuitry; and plunger position detection circuitry configured to determine whether the plunger is in one of an open position and a closed position.

21. The irrigation control apparatus of claim 20 further comprising:

control circuitry configured to determine the voltage on the multi-wire path and activate the boost circuitry to increase the voltage stored by the charge storage circuitry when the voltage on the multi-wire path is below the threshold.

22. The irrigation control apparatus of claim 20 wherein the plunger position detection circuitry is configured to apply an input stimulus into the solenoid and to determine whether the plunger is in one of the open position and the closed position in response to applying the input stimulus.

* * * * *